(12) United States Patent
Perdomo

(10) Patent No.: US 10,602,424 B2
(45) Date of Patent: Mar. 24, 2020

(54) SYSTEM AND METHOD FOR DIGITAL COMMUNICATION BETWEEN COMPUTING DEVICES

(71) Applicant: goTenna Inc., Brooklyn, NY (US)

(72) Inventor: Jorge Perdomo, New York, NY (US)

(73) Assignee: goTenna Inc., Brooklyn, NY (US)

( * ) Notice: Subject to any disclaimer, the term of this patent is extended or adjusted under 35 U.S.C. 154(b) by 217 days.

(21) Appl. No.: 15/694,369

(22) Filed: Sep. 1, 2017

(65) Prior Publication Data

US 2018/0014241 A1    Jan. 11, 2018

Related U.S. Application Data

(63) Continuation of application No. 14/659,067, filed on Mar. 16, 2015, now Pat. No. 9,756,549.

(Continued)

(51) Int. Cl.
*H04W 40/12* (2009.01)
*H04W 12/08* (2009.01)
(Continued)

(52) U.S. Cl.
CPC .............. *H04W 40/12* (2013.01); *H04L 5/00* (2013.01); *H04L 5/0007* (2013.01);
(Continued)

(58) Field of Classification Search
CPC ....... H04L 45/745; H04L 5/00; H04L 5/0007; H04L 67/04; H04L 67/10; H04L 67/125;
(Continued)

(56) References Cited

U.S. PATENT DOCUMENTS

| | | |
|---|---|---|
| 5,412,654 A | 5/1995 | Perkins |
| 6,304,556 B1 | 10/2001 | Haas |

(Continued)

FOREIGN PATENT DOCUMENTS

| | | |
|---|---|---|
| WO | WO2012078565 | 6/2012 |
| WO | WO2012116489 | 9/2012 |

*Primary Examiner* — Un C Cho
*Assistant Examiner* — Shah M Rahman
(74) *Attorney, Agent, or Firm* — Tully Rinckey PLLC; Steven M. Hoffberg

(57) ABSTRACT

A wireless communication device, comprising radio frequency transceivers which transmit outbound messages to targeted receivers, and receive the inbound messages addressed to the respective transceiver; each having a processor which controls the transceiver to establish communication sessions according to a protocol, and processes targeting and address information. The transceiver communicates with a telephone device having a telephone address book containing information which defines the targets and address for a telephone network and perhaps other networks. The address book entries are human editable through a human machine user interface. The address book entries are intended for centrally controlled switch networks having hierarchically formatted address information, but since these are at least quasi-unique, they are used as address labels in an unswitched peer-to-peer network formed of the transceivers. This permits a common address scheme across the peer-to-peer network and switched network of the telephone device.

20 Claims, 16 Drawing Sheets

Related U.S. Application Data

(60) Provisional application No. 61/952,999, filed on Mar. 14, 2014.

(51) Int. Cl.

| | | |
|---|---|---|
| *H04L 29/08* | (2006.01) | |
| *H04L 5/00* | (2006.01) | |
| *H04L 12/741* | (2013.01) | |
| *H04W 4/021* | (2018.01) | |
| *H04W 40/20* | (2009.01) | |

(52) U.S. Cl.
CPC ............ *H04L 45/745* (2013.01); *H04L 67/04* (2013.01); *H04L 67/10* (2013.01); *H04L 67/125* (2013.01); *H04L 67/18* (2013.01); *H04W 4/021* (2013.01); *H04W 12/08* (2013.01); *H04W 40/20* (2013.01)

(58) Field of Classification Search
CPC ...... H04L 67/18; H04W 12/08; H04W 40/12; H04W 40/20; H04W 4/021
See application file for complete search history.

(56) References Cited

U.S. PATENT DOCUMENTS

| | | |
|---|---|---|
| 6,415,158 B1 | 7/2002 | King et al. |
| 6,584,080 B1 | 6/2003 | Ganz et al. |
| 6,604,140 B1 | 8/2003 | Beck et al. |
| 6,625,135 B1 | 9/2003 | Johnson et al. |
| 6,628,620 B1 | 9/2003 | Cain |
| 6,647,426 B2 | 11/2003 | Mohammed |
| 6,708,107 B2 | 3/2004 | Impson et al. |
| 6,718,394 B2 | 4/2004 | Cain |
| 6,754,192 B2 | 6/2004 | Kennedy |
| 6,763,013 B2 | 7/2004 | Kennedy |
| 6,763,014 B2 | 7/2004 | Kennedy |
| 6,807,165 B2 | 10/2004 | Belcea |
| 6,816,460 B1 | 11/2004 | Ahmed et al. |
| 6,829,288 B2 | 12/2004 | Orava |
| 6,836,463 B2 | 12/2004 | Garcia-Luna-Aceves et al. |
| 6,845,084 B2 | 1/2005 | Rangnekar et al. |
| 6,862,737 B1 | 3/2005 | Iwamura et al. |
| 6,870,846 B2 | 3/2005 | Cain |
| 6,873,839 B2 | 3/2005 | Stanforth |
| 6,894,985 B2 | 5/2005 | Billhartz |
| 6,898,529 B2 | 5/2005 | Gao et al. |
| 6,904,275 B2 | 6/2005 | Stanforth |
| 6,906,741 B2 | 6/2005 | Canova, Jr. et al. |
| 6,907,257 B1 | 6/2005 | Mizutani et al. |
| 6,917,985 B2 | 7/2005 | Madruga et al. |
| 6,940,832 B2 | 9/2005 | Saadawi et al. |
| 6,954,435 B2 | 10/2005 | Billhartz et al. |
| 6,961,310 B2 | 11/2005 | Cain |
| 6,975,614 B2 | 12/2005 | Kennedy |
| 6,977,608 B1 | 12/2005 | Anderson et al. |
| 6,977,938 B2 | 12/2005 | Alriksson et al. |
| 6,980,524 B1 | 12/2005 | Lu et al. |
| 6,980,537 B1 | 12/2005 | Liu |
| 6,985,476 B1 | 1/2006 | Elliott et al. |
| 6,986,161 B2 | 1/2006 | Billhartz |
| 6,990,075 B2 | 1/2006 | Krishnamurthy et al. |
| 7,002,949 B2 | 2/2006 | Garcia-Luna-Aceves et al. |
| 7,006,453 B1 | 2/2006 | Ahmed et al. |
| 7,007,102 B2 | 2/2006 | Billhartz et al. |
| 7,015,809 B1 | 3/2006 | Sayers et al. |
| 7,024,363 B1 | 4/2006 | Comerford et al. |
| 7,027,409 B2 | 4/2006 | Cain |
| 7,027,426 B2 | 4/2006 | Billhartz |
| 7,028,687 B1 | 4/2006 | Silver et al. |
| 7,035,227 B2 | 4/2006 | Garcia-Luna-Aceves et al. |
| 7,042,394 B2 | 5/2006 | Sayers |
| 7,058,419 B2 | 6/2006 | Kotzin et al. |
| 7,061,924 B1 | 6/2006 | Durrant et al. |
| 7,061,925 B2 | 6/2006 | Joshi |
| 7,068,600 B2 | 6/2006 | Cain |
| 7,068,605 B2 | 6/2006 | Cain et al. |
| 7,075,919 B1 | 7/2006 | Wendt et al. |
| 7,079,509 B2 | 7/2006 | Belcea |
| 7,079,552 B2 | 7/2006 | Cain et al. |
| 7,082,117 B2 | 7/2006 | Billhartz |
| 7,085,290 B2 | 8/2006 | Cain et al. |
| 7,092,391 B2 | 8/2006 | Umeda |
| 7,096,037 B2 | 8/2006 | Canova, Jr. et al. |
| 7,099,296 B2 | 8/2006 | Belcea |
| 7,113,788 B1 | 9/2006 | Chiou et al. |
| 7,113,796 B2 | 9/2006 | Zhang et al. |
| 7,127,250 B2 | 10/2006 | Gallagher et al. |
| 7,133,391 B2 | 11/2006 | Belcea |
| 7,142,866 B2 | 11/2006 | Windham et al. |
| 7,151,769 B2 | 12/2006 | Stanforth et al. |
| 7,159,035 B2 | 1/2007 | Garcia-Luna-Aceves et al. |
| 7,170,425 B2 | 1/2007 | Christopher et al. |
| 7,176,807 B2 | 2/2007 | Scoggins et al. |
| 7,177,594 B2 | 2/2007 | Burr |
| 7,181,228 B2 | 2/2007 | Boesch |
| 7,184,421 B1 | 2/2007 | Liu et al. |
| 7,197,016 B2 | 3/2007 | Belcea |
| 7,212,504 B2 | 5/2007 | Belcea |
| 7,216,282 B2 | 5/2007 | Cain |
| 7,221,268 B2 | 5/2007 | Sayers et al. |
| 7,224,642 B1 | 5/2007 | Tran |
| 7,224,954 B2 | 5/2007 | Okajima et al. |
| 7,231,180 B2 | 6/2007 | Benson et al. |
| 7,239,867 B2 | 7/2007 | Kotzin et al. |
| 7,251,238 B2 | 7/2007 | Joshi et al. |
| 7,266,085 B2 | 9/2007 | Stine |
| 7,266,104 B2 | 9/2007 | Belcea |
| 7,269,155 B2 | 9/2007 | Joshi |
| 7,280,073 B2 | 10/2007 | Sayers |
| 7,281,057 B2 | 10/2007 | Cain |
| 7,295,544 B2 | 11/2007 | Allen et al. |
| 7,299,038 B2 | 11/2007 | Kennedy et al. |
| 7,299,042 B2 | 11/2007 | Moore et al. |
| 7,308,369 B2 | 12/2007 | Rudran et al. |
| 7,308,370 B2 | 12/2007 | Mason, Jr. et al. |
| 7,310,335 B1 | 12/2007 | Garcia-Luna-Aceves et al. |
| 7,310,664 B1 | 12/2007 | Merchant et al. |
| 7,315,548 B2 | 1/2008 | Joshi |
| 7,317,898 B2 | 1/2008 | Tegreene |
| 7,321,331 B2 | 1/2008 | Andric et al. |
| 7,327,998 B2 | 2/2008 | Kumar et al. |
| 7,330,694 B2 | 2/2008 | Lee et al. |
| 7,336,614 B2 | 2/2008 | Motegi et al. |
| 7,339,897 B2 | 3/2008 | Larsson et al. |
| 7,346,167 B2 | 3/2008 | Billhartz et al. |
| 7,348,895 B2 | 3/2008 | Lagassey |
| 7,349,360 B2 | 3/2008 | Gutierrez et al. |
| 7,349,362 B2 | 3/2008 | Belcea |
| 7,352,750 B2 | 4/2008 | Igarashi et al. |
| 7,353,013 B2 | 4/2008 | Qi et al. |
| 7,356,001 B1 | 4/2008 | Jones et al. |
| 7,356,329 B2 | 4/2008 | Willey et al. |
| 7,362,711 B2 | 4/2008 | Golle et al. |
| 7,366,111 B2 | 4/2008 | Thubert et al. |
| 7,366,544 B2 | 4/2008 | Tegreene |
| 7,369,524 B2 | 5/2008 | Taubenheim et al. |
| 7,379,447 B2 | 5/2008 | Dunagan et al. |
| 7,382,740 B2 | 6/2008 | Joshi |
| 7,382,759 B2 | 6/2008 | Joshi et al. |
| 7,382,765 B2 | 6/2008 | Kennedy et al. |
| 7,389,295 B2 | 6/2008 | Jung et al. |
| 7,392,053 B1 | 6/2008 | Conner et al. |
| 7,394,798 B2 | 7/2008 | Naghian |
| 7,394,826 B2 | 7/2008 | Cain et al. |
| 7,400,903 B2 | 7/2008 | Shoemake et al. |
| 7,401,217 B2 | 7/2008 | Huang et al. |
| 7,403,492 B2 | 7/2008 | Zeng et al. |
| 7,403,496 B2 | 7/2008 | Bonta |
| 7,406,500 B2 | 7/2008 | Bantz et al. |
| 7,408,911 B2 | 8/2008 | Joshi |
| 7,414,977 B2 | 8/2008 | Orlik et al. |
| 7,415,019 B2 | 8/2008 | Duggi |
| 7,418,238 B2 | 8/2008 | Tegreene |

(56) References Cited

U.S. PATENT DOCUMENTS

| | | |
|---|---|---|
| 7,420,944 B2 | 9/2008 | Norris et al. |
| 7,420,954 B2 | 9/2008 | Elbatt et al. |
| 7,427,927 B2 | 9/2008 | Borleske et al. |
| 7,428,221 B2 | 9/2008 | Thubert et al. |
| 7,436,789 B2 | 10/2008 | Caliskan et al. |
| 7,443,822 B2 | 10/2008 | Lindskog et al. |
| 7,450,517 B2 | 11/2008 | Cho |
| 7,453,864 B2 | 11/2008 | Kennedy et al. |
| 7,457,273 B2 | 11/2008 | Nakanishi et al. |
| 7,457,834 B2 | 11/2008 | Jung et al. |
| 7,460,532 B2 | 12/2008 | Shin et al. |
| 7,468,954 B2 | 12/2008 | Sherman |
| 7,480,248 B2 | 1/2009 | Duggi et al. |
| 7,489,653 B2 | 2/2009 | Zhang et al. |
| 7,495,578 B2 | 2/2009 | Borleske |
| 7,502,360 B2 | 3/2009 | Liu et al. |
| 7,512,074 B2 | 3/2009 | Strutt et al. |
| 7,512,079 B2 | 3/2009 | Labrador et al. |
| 7,512,094 B1 | 3/2009 | Linebarger et al. |
| 7,512,105 B2 | 3/2009 | Suzuki et al. |
| 7,522,537 B2 | 4/2009 | Joshi |
| 7,522,547 B2 | 4/2009 | Lee et al. |
| 7,522,549 B2 | 4/2009 | Karaoguz et al. |
| 7,529,561 B2 | 5/2009 | Heinonen et al. |
| 7,535,883 B2 | 5/2009 | Kim et al. |
| 7,536,388 B2 | 5/2009 | Jung et al. |
| 7,539,759 B2 | 5/2009 | Narayanan et al. |
| 7,545,285 B2 | 6/2009 | Shuey et al. |
| 7,554,982 B2 | 6/2009 | Nakamura et al. |
| 7,561,891 B2 | 7/2009 | Cormier et al. |
| 7,562,148 B2 | 7/2009 | Metke et al. |
| 7,567,547 B2 | 7/2009 | Mosko et al. |
| 7,567,577 B2 | 7/2009 | Thubert et al. |
| 7,570,602 B2 | 8/2009 | Delattre et al. |
| 7,570,623 B2 | 8/2009 | Huang et al. |
| 7,580,730 B2 | 8/2009 | Tegreene |
| 7,580,782 B2 | 8/2009 | Breed et al. |
| 7,581,095 B2 | 8/2009 | Billhartz |
| 7,586,894 B2 | 9/2009 | Aoki et al. |
| 7,587,001 B2 | 9/2009 | Hazani et al. |
| 7,590,589 B2 | 9/2009 | Hoffberg |
| 7,593,376 B2 | 9/2009 | D'Amico et al. |
| 7,599,696 B2 | 10/2009 | Jung et al. |
| 7,602,738 B2 | 10/2009 | Preguica |
| 7,606,176 B2 | 10/2009 | Joshi et al. |
| 7,609,641 B2 | 10/2009 | Strutt et al. |
| 7,609,644 B2 | 10/2009 | Tateson |
| 7,616,961 B2 | 11/2009 | Billhartz |
| 7,619,998 B2 | 11/2009 | Takeda et al. |
| 7,620,404 B2 | 11/2009 | Chesnais et al. |
| 7,626,967 B2 | 12/2009 | Yarvis et al. |
| 7,634,230 B2 | 12/2009 | Ji et al. |
| 7,639,652 B1 | 12/2009 | Amis et al. |
| 7,639,663 B1 | 12/2009 | Nerses et al. |
| 7,656,851 B1 | 2/2010 | Ghanadan et al. |
| 7,656,901 B2 | 2/2010 | Strutt et al. |
| 7,657,354 B2 | 2/2010 | Breed et al. |
| 7,660,287 B2 | 2/2010 | Axelsson et al. |
| 7,660,318 B2 | 2/2010 | Rahman et al. |
| 7,660,950 B2 | 2/2010 | Miller et al. |
| 7,664,032 B2 | 2/2010 | Nakamura et al. |
| 7,664,081 B2 | 2/2010 | Luoma et al. |
| 7,664,236 B2 | 2/2010 | Radziewicz et al. |
| 7,664,538 B2 | 2/2010 | Watanabe et al. |
| 7,668,173 B2 | 2/2010 | Zhao |
| 7,672,307 B2 | 3/2010 | Duggi et al. |
| 7,678,068 B2 | 3/2010 | Levine et al. |
| 7,693,051 B2 | 4/2010 | Ozer et al. |
| 7,693,484 B2 | 4/2010 | Ting et al. |
| 7,693,535 B2 | 4/2010 | Dunko |
| 7,695,446 B2 | 4/2010 | Levine et al. |
| 7,697,450 B2 | 4/2010 | D'Amico et al. |
| 7,697,459 B2 | 4/2010 | Conner et al. |
| 7,702,594 B2 | 4/2010 | Scoggins et al. |
| 7,702,813 B2 | 4/2010 | Andreasson et al. |
| 7,706,282 B2 | 4/2010 | Huang |
| 7,706,390 B2 | 4/2010 | Alapuranen |
| 7,706,842 B2 | 4/2010 | Tegreene |
| 7,710,932 B2 | 5/2010 | Muthuswamy et al. |
| 7,715,352 B2 | 5/2010 | Huang et al. |
| 7,719,987 B2 | 5/2010 | Kobayashi et al. |
| 7,719,988 B1 | 5/2010 | Ruiz et al. |
| 7,719,989 B2 | 5/2010 | Yau |
| 7,720,000 B2 | 5/2010 | Yoshida et al. |
| 7,720,458 B2 | 5/2010 | Impson et al. |
| 7,720,909 B2 | 5/2010 | Bantz et al. |
| 7,725,080 B2 | 5/2010 | Tegreene |
| 7,729,336 B2 | 6/2010 | Pun et al. |
| 7,730,216 B1 | 6/2010 | Issa et al. |
| 7,738,402 B2 | 6/2010 | Feldman et al. |
| 7,742,399 B2 | 6/2010 | Pun |
| 7,742,430 B2 | 6/2010 | Scoggins et al. |
| 7,743,094 B2 | 6/2010 | Metke et al. |
| 7,746,794 B2 | 6/2010 | Sink |
| 7,753,795 B2 | 7/2010 | Harris et al. |
| 7,756,041 B2 | 7/2010 | Whitehill et al. |
| 7,756,538 B2 | 7/2010 | Bonta et al. |
| 7,764,617 B2 | 7/2010 | Cain et al. |
| 7,769,155 B2 | 8/2010 | Radziewicz et al. |
| 7,773,575 B2 | 8/2010 | Rudnick |
| 7,774,334 B2 | 8/2010 | Thorn |
| 7,778,235 B2 | 8/2010 | Thubert et al. |
| 7,782,835 B2 | 8/2010 | Gossain et al. |
| 7,783,256 B2 | 8/2010 | Bocking et al. |
| 7,787,865 B2 | 8/2010 | Willey et al. |
| 7,788,387 B2 | 8/2010 | Kumar et al. |
| 7,792,050 B2 | 9/2010 | Metke et al. |
| 7,792,773 B2 | 9/2010 | McCord et al. |
| 7,796,573 B2 | 9/2010 | Belcea |
| 7,796,633 B2 | 9/2010 | Birchler et al. |
| 7,808,960 B1 | 10/2010 | Chan et al. |
| 7,808,985 B2 | 10/2010 | Romero et al. |
| 7,813,326 B1 | 10/2010 | Kelm et al. |
| 7,813,451 B2 | 10/2010 | Binder et al. |
| 7,814,322 B2 | 10/2010 | Gurevich et al. |
| 7,817,623 B2 | 10/2010 | Dawson et al. |
| 7,819,025 B2 | 10/2010 | Coffland |
| 7,830,820 B2 | 11/2010 | Duke et al. |
| 7,831,206 B2 | 11/2010 | Dupcinov et al. |
| 7,836,155 B2 | 11/2010 | Kang et al. |
| 7,840,903 B1 | 11/2010 | Amidon et al. |
| 7,843,833 B2 | 11/2010 | Krishnakumar et al. |
| 7,843,861 B2 | 11/2010 | Dawson et al. |
| 7,847,734 B2 | 12/2010 | Wu |
| 7,848,275 B2 | 12/2010 | Suzuki et al. |
| 7,849,139 B2 | 12/2010 | Wolfson et al. |
| 7,852,764 B2 | 12/2010 | Yamaguchi et al. |
| 7,852,826 B2 | 12/2010 | Kitchin |
| 7,859,465 B2 | 12/2010 | Wu |
| 7,860,025 B2 | 12/2010 | Thubert et al. |
| 7,860,081 B2 | 12/2010 | Dawson et al. |
| 7,860,968 B2 | 12/2010 | Bornhoevd et al. |
| 7,864,682 B2 | 1/2011 | Appaji et al. |
| 7,873,019 B2 | 1/2011 | Dawson et al. |
| 7,873,148 B2 | 1/2011 | Radziewicz et al. |
| 7,876,216 B2 | 1/2011 | Coffland et al. |
| 7,881,212 B2 | 2/2011 | Kutschenreuter et al. |
| 7,881,474 B2 | 2/2011 | Sun |
| 7,881,667 B2 | 2/2011 | Ji et al. |
| 7,881,744 B2 | 2/2011 | Lazaridis |
| 7,885,197 B2 | 2/2011 | Metzler |
| 7,886,075 B2 | 2/2011 | Molteni et al. |
| 7,890,112 B2 | 2/2011 | Ito et al. |
| 7,894,408 B2 | 2/2011 | Zeng et al. |
| 7,894,416 B2 | 2/2011 | Rudnick et al. |
| 7,894,828 B2 | 2/2011 | Dawson et al. |
| 7,898,979 B2 | 3/2011 | Isozu |
| 7,898,993 B2 | 3/2011 | Dawson et al. |
| 7,902,973 B2 | 3/2011 | Thubert et al. |
| 7,903,690 B2 | 3/2011 | Wakid |
| 7,905,640 B2 | 3/2011 | Gergets et al. |
| 7,912,435 B2 | 3/2011 | Qi et al. |
| 7,912,503 B2 | 3/2011 | Chang et al. |
| 7,912,645 B2 | 3/2011 | Breed et al. |

(56) References Cited

U.S. PATENT DOCUMENTS

| | | | |
|---|---|---|---|
| 7,920,535 B2 | 4/2011 | Zaks | |
| 7,920,689 B2 | 4/2011 | Radziewicz et al. | |
| 7,924,722 B2 | 4/2011 | Thubert et al. | |
| 7,924,796 B2 | 4/2011 | Vu Duong et al. | |
| 7,929,914 B2 | 4/2011 | Tegreene | |
| 7,936,732 B2 | 5/2011 | Ho et al. | |
| 7,940,778 B2 | 5/2011 | Ding et al. | |
| 7,941,188 B2 | 5/2011 | Jung et al. | |
| 7,944,878 B2 | 5/2011 | Dawson et al. | |
| 7,944,899 B2 | 5/2011 | Nordmark et al. | |
| 7,948,891 B2 | 5/2011 | Takeda et al. | |
| 7,953,211 B2 | 5/2011 | Radziewicz et al. | |
| 7,953,798 B2 | 5/2011 | Labelle et al. | |
| 7,957,301 B2 | 6/2011 | Bhatti et al. | |
| 7,957,355 B1 | 6/2011 | Heiferling et al. | |
| 7,961,626 B2 | 6/2011 | Reeve | |
| 7,961,650 B2 | 6/2011 | Davies | |
| 7,961,659 B2 | 6/2011 | Zaks | |
| 7,962,101 B2 | 6/2011 | Vaswani et al. | |
| 7,962,154 B2 | 6/2011 | Nakakita et al. | |
| 7,969,914 B1 | 6/2011 | Gerber et al. | |
| 7,970,418 B2 | 6/2011 | Schmidt et al. | |
| 7,974,402 B2 | 7/2011 | Pun | |
| 7,978,062 B2 | 7/2011 | LaLonde et al. | |
| 7,978,612 B2 | 7/2011 | Retana et al. | |
| 7,979,311 B2 | 7/2011 | Dawson et al. | |
| 7,983,712 B2 | 7/2011 | Mayer et al. | |
| 7,983,835 B2 | 7/2011 | Lagassey | |
| 7,990,947 B2 | 8/2011 | Twitchell, Jr. et al. | |
| 7,996,558 B2 | 8/2011 | Hsu et al. | |
| 8,000,314 B2 | 8/2011 | Brownrigg et al. | |
| 8,000,315 B2 | 8/2011 | Doi et al. | |
| 8,005,054 B2 | 8/2011 | Isozu | |
| 8,006,189 B2 | 8/2011 | Dachs | |
| 8,009,615 B2 | 8/2011 | Krishnakumar et al. | |
| 8,013,732 B2 | 9/2011 | Petite et al. | |
| 8,014,329 B2 | 9/2011 | Gong | |
| 8,023,423 B2 | 9/2011 | Chiang et al. | |
| 8,027,259 B2 | 9/2011 | Westphal | |
| 8,027,810 B2 | 9/2011 | Tateson | |
| 8,031,605 B2 | 10/2011 | Oyman et al. | |
| 8,031,650 B2 | 10/2011 | Petite et al. | |
| 8,031,720 B2 | 10/2011 | Yagyu et al. | |
| 8,032,746 B2 | 10/2011 | Boppana et al. | |
| 8,035,479 B2 | 10/2011 | Tran | |
| 8,036,144 B2 | 10/2011 | Kim | |
| 8,036,224 B2 | 10/2011 | Axelsson et al. | |
| 8,040,863 B2 | 10/2011 | Dawson et al. | |
| 8,041,369 B2 | 10/2011 | Smith et al. | |
| 8,041,377 B2 | 10/2011 | Itaya et al. | |
| 8,042,048 B2 | 10/2011 | Wilson et al. | |
| 8,050,196 B2 | 11/2011 | Yoon | |
| 8,059,578 B2 | 11/2011 | Rudnick | |
| 8,059,620 B2 | 11/2011 | Moon | |
| 8,060,013 B1 | 11/2011 | Burr | |
| 8,060,017 B2 | 11/2011 | Schlicht et al. | |
| 8,060,308 B2 | 11/2011 | Breed | |
| 8,060,649 B2 | 11/2011 | Chen et al. | |
| 8,064,412 B2 | 11/2011 | Petite | |
| 8,064,416 B2 | 11/2011 | Liu | |
| 8,064,879 B2 | 11/2011 | Willey et al. | |
| 8,065,166 B2 | 11/2011 | Maresh et al. | |
| 8,065,411 B2 | 11/2011 | Spiess et al. | |
| 8,072,906 B2 | 12/2011 | Naghian | |
| 8,073,384 B2 | 12/2011 | Shuey et al. | |
| 8,085,667 B2 | 12/2011 | Yamaguchi et al. | |
| 8,086,842 B2 | 12/2011 | Sidhu et al. | |
| 8,090,596 B2 | 1/2012 | Maresh et al. | |
| 8,096,477 B2 | 1/2012 | Brown et al. | |
| 8,099,108 B2 | 1/2012 | Camp, Jr. et al. | |
| 8,099,307 B2 | 1/2012 | Maresh et al. | |
| 8,102,775 B2 | 1/2012 | Thubert | |
| 8,102,794 B2 | 1/2012 | Shin et al. | |
| 8,103,247 B2 | 1/2012 | Ananthanarayanan et al. | |
| 8,108,228 B2 | 1/2012 | Maresh et al. | |
| 8,108,429 B2 | 1/2012 | Sim-Tang et al. | |
| 8,108,796 B2 | 1/2012 | Jobling et al. | |
| 8,111,675 B2 | 2/2012 | Kim et al. | |
| 8,112,082 B2 | 2/2012 | Nylander et al. | |
| 8,115,617 B2 | 2/2012 | Thubert et al. | |
| 8,121,267 B2 | 2/2012 | Radziewicz et al. | |
| 8,121,628 B2 | 2/2012 | Mauti, Jr. | |
| 8,121,629 B2 | 2/2012 | Davis et al. | |
| 8,121,870 B2 | 2/2012 | Maresh et al. | |
| 8,125,964 B2 | 2/2012 | Ling et al. | |
| 8,126,473 B1 | 2/2012 | Kim et al. | |
| 8,130,708 B2 | 3/2012 | Singh | |
| 8,131,300 B2 | 3/2012 | Sartori et al. | |
| 8,131,569 B2 | 3/2012 | Maresh et al. | |
| 8,131,838 B2 | 3/2012 | Bornhoevd et al. | |
| 8,134,950 B2 | 3/2012 | Pun | |
| 8,135,021 B2 | 3/2012 | Westphal | |
| 8,135,362 B2 | 3/2012 | LaDue | |
| 8,135,413 B2 | 3/2012 | Dupray | |
| 8,138,934 B2 | 3/2012 | Veillette et al. | |
| 8,139,504 B2 | 3/2012 | Mankins et al. | |
| 8,144,596 B2 | 3/2012 | Veillette | |
| 8,144,619 B2 | 3/2012 | Hoffberg | |
| 8,149,717 B2 | 4/2012 | Gossain et al. | |
| 8,149,801 B2 | 4/2012 | Hall | |
| 8,151,140 B2 | 4/2012 | Sim-Tang | |
| 8,155,004 B2 | 4/2012 | Lee et al. | |
| 8,159,938 B2 | 4/2012 | Van Der Wateren | |
| 8,159,985 B2 | 4/2012 | Karaoguz et al. | |
| 8,160,041 B2 | 4/2012 | Nakashima | |
| 8,161,097 B2 | 4/2012 | Jung et al. | |
| 8,165,040 B2 | 4/2012 | Yang et al. | |
| 8,165,585 B2 | 4/2012 | Gallagher et al. | |
| 8,170,577 B2 | 5/2012 | Singh | |
| 8,170,957 B2 | 5/2012 | Richard | |
| 8,171,136 B2 | 5/2012 | Petite | |
| 8,171,364 B2 | 5/2012 | Veillette | |
| 8,174,381 B2 | 5/2012 | Imes et al. | |
| 8,180,294 B2 | 5/2012 | Ting et al. | |
| 8,180,352 B2 | 5/2012 | Nordmark et al. | |
| 8,184,681 B2 | 5/2012 | Binder et al. | |
| 8,185,155 B2 | 5/2012 | Chang et al. | |
| 8,185,653 B2 | 5/2012 | Yau et al. | |
| 8,193,930 B2 | 6/2012 | Petite et al. | |
| 8,194,541 B2 | 6/2012 | Leppanen et al. | |
| 8,194,677 B2 | 6/2012 | Ahn | |
| 8,194,986 B2 | 6/2012 | Conwell | |
| 8,195,130 B2 | 6/2012 | Hao et al. | |
| 8,195,483 B2 | 6/2012 | Maresh et al. | |
| 8,195,628 B2 | 6/2012 | Sim-Tang | |
| 8,199,664 B2 | 6/2012 | Nakamura et al. | |
| 8,199,677 B1 | 6/2012 | Amis et al. | |
| 8,199,701 B2 | 6/2012 | Kobayashi | |
| 8,200,246 B2 | 6/2012 | Khosravy et al. | |
| 8,203,463 B2 | 6/2012 | Bragg et al. | |
| 8,203,464 B2 | 6/2012 | Billhartz et al. | |
| 8,203,971 B2 | 6/2012 | Niranjan et al. | |
| 8,203,990 B2 | 6/2012 | Watanabe et al. | |
| 8,204,034 B2 | 6/2012 | Ahuja et al. | |
| 8,208,373 B2 | 6/2012 | Bonta et al. | |
| 8,212,667 B2 | 7/2012 | Petite et al. | |
| 8,213,319 B2 | 7/2012 | Spott et al. | |
| 8,213,409 B2 | 7/2012 | Rudnick et al. | |
| 8,213,895 B2 | 7/2012 | Hurwitz et al. | |
| 8,217,805 B2 | 7/2012 | Billhartz et al. | |
| 8,218,463 B2 | 7/2012 | Hall | |
| 8,218,550 B2 | 7/2012 | Axelsson et al. | |
| 8,223,010 B2 | 7/2012 | Petite et al. | |
| 8,223,710 B2 | 7/2012 | Ito | |
| 8,233,471 B2 | 7/2012 | Brownrigg et al. | |
| 8,234,272 B2 | 7/2012 | Kretz et al. | |
| 8,238,319 B2 | 8/2012 | Kadowaki et al. | |
| 8,239,169 B2 | 8/2012 | Gregory et al. | |
| 8,243,603 B2 | 8/2012 | Gossain et al. | |
| 8,244,295 B2 | 8/2012 | Lazaridis | |
| 8,245,315 B2 | 8/2012 | Cassett et al. | |
| 8,248,947 B2 | 8/2012 | Li et al. | |
| 8,249,101 B2 | 8/2012 | Crain, Jr. et al. | |
| 8,249,984 B2 | 8/2012 | Dawson et al. | |

(56) References Cited

U.S. PATENT DOCUMENTS

| | | |
|---|---|---|
| 8,254,266 B2 | 8/2012 | Kutschenreuter |
| 8,255,469 B2 | 8/2012 | Leppanen et al. |
| 8,256,681 B2 | 9/2012 | Wang |
| 8,265,617 B2 | 9/2012 | Lazaridis et al. |
| 8,265,669 B2 | 9/2012 | Alward |
| 8,266,551 B2 | 9/2012 | Boldyrev et al. |
| 8,266,657 B2 | 9/2012 | Margulis |
| 8,270,302 B2 | 9/2012 | Chu et al. |
| 8,270,577 B2 | 9/2012 | Hao et al. |
| 8,271,433 B2 | 9/2012 | Boldyrev et al. |
| 8,271,449 B2 | 9/2012 | Jung et al. |
| 8,275,824 B2 | 9/2012 | Jung et al. |
| 8,284,671 B2 | 10/2012 | Yamaguchi et al. |
| 8,284,748 B2 | 10/2012 | Borghei |
| 8,285,317 B2 | 10/2012 | Wenger |
| 8,285,839 B2 | 10/2012 | Butterfield et al. |
| 8,289,182 B2 | 10/2012 | Vogel et al. |
| 8,289,186 B2 | 10/2012 | Osafune |
| 8,289,883 B2 | 10/2012 | Zhu et al. |
| 8,294,571 B2 | 10/2012 | Coffland et al. |
| 8,300,615 B2 | 10/2012 | Copeland et al. |
| 8,306,013 B2 | 11/2012 | Chiang |
| 8,311,533 B1 | 11/2012 | Alcorn |
| 8,311,658 B2 | 11/2012 | Coffland et al. |
| 8,314,717 B2 | 11/2012 | Billhartz et al. |
| 8,315,231 B2 | 11/2012 | Pirzada et al. |
| 8,319,658 B2 | 11/2012 | Conant et al. |
| 8,319,833 B2 | 11/2012 | Weinstein et al. |
| 8,320,288 B2 | 11/2012 | Sakoda |
| 8,320,302 B2 | 11/2012 | Richeson et al. |
| 8,320,414 B2 | 11/2012 | Dawson et al. |
| 8,320,879 B2 | 11/2012 | Willey et al. |
| 8,321,561 B2 | 11/2012 | Fujita et al. |
| 8,323,189 B2 | 12/2012 | Tran et al. |
| 8,325,612 B1 | 12/2012 | Ruiz et al. |
| 8,330,649 B2 | 12/2012 | Menouar et al. |
| 8,331,239 B2 | 12/2012 | Yamada |
| 8,331,262 B2 | 12/2012 | Hu et al. |
| 8,332,055 B2 | 12/2012 | Veillette |
| 8,334,787 B2 | 12/2012 | Bushman et al. |
| 8,335,164 B2 | 12/2012 | Liu |
| 8,335,207 B2 | 12/2012 | Singh et al. |
| 8,335,304 B2 | 12/2012 | Petite |
| 8,335,814 B2 | 12/2012 | Jung et al. |
| 8,335,989 B2 | 12/2012 | Barraclough et al. |
| 8,340,690 B2 | 12/2012 | Wong et al. |
| 8,341,279 B2 | 12/2012 | Thubert et al. |
| 8,341,289 B2 | 12/2012 | Hellhake et al. |
| 8,345,098 B2 | 1/2013 | Grigsby et al. |
| 8,345,837 B2 | 1/2013 | Chavez et al. |
| 8,346,846 B2 | 1/2013 | Jung et al. |
| 8,346,915 B2 | 1/2013 | Kies et al. |
| 8,351,339 B2 | 1/2013 | Zhen et al. |
| 8,352,420 B2 | 1/2013 | Jung et al. |
| 8,355,410 B2 | 1/2013 | Hall |
| 8,359,643 B2 | 1/2013 | Low et al. |
| 8,363,565 B2 | 1/2013 | Fujita et al. |
| 8,363,662 B2 | 1/2013 | Thubert et al. |
| 8,364,082 B2 | 1/2013 | Bocking et al. |
| 8,364,648 B1 | 1/2013 | Sim-Tang |
| 8,369,507 B2 | 2/2013 | Radziewicz et al. |
| 8,369,880 B2 | 2/2013 | Citrano, III et al. |
| 8,370,697 B2 | 2/2013 | Veillette |
| 8,370,863 B2 | 2/2013 | Grigoriev et al. |
| 8,373,556 B2 | 2/2013 | LaLonde et al. |
| 8,373,588 B2 | 2/2013 | Kuhn |
| 8,374,165 B2 | 2/2013 | Yang |
| 8,374,352 B2 | 2/2013 | Song et al. |
| 8,379,564 B2 | 2/2013 | Petite et al. |
| 8,385,322 B2 | 2/2013 | Colling et al. |
| 8,385,531 B2 | 2/2013 | Chavez et al. |
| 8,385,550 B2 | 2/2013 | Sun |
| 8,385,971 B2 | 2/2013 | Rhoads et al. |
| 8,386,278 B2 | 2/2013 | Maresh et al. |
| 8,392,541 B2 | 3/2013 | Agarwal et al. |
| 8,392,607 B2 | 3/2013 | Ishii et al. |
| 8,395,498 B2 | 3/2013 | Gaskill et al. |
| 8,396,602 B2 | 3/2013 | Imes et al. |
| 8,400,507 B2 | 3/2013 | Grigsby et al. |
| 8,401,564 B2 | 3/2013 | Singh |
| 8,401,934 B2 | 3/2013 | Boldyrev et al. |
| 8,406,153 B2 | 3/2013 | Vasseur et al. |
| 8,406,239 B2 | 3/2013 | Hurwitz et al. |
| 8,406,252 B1 | 3/2013 | Wuthnow et al. |
| 8,406,386 B2 | 3/2013 | Yin et al. |
| 8,410,931 B2 | 4/2013 | Petite et al. |
| 8,422,497 B2 | 4/2013 | Kang et al. |
| 8,427,957 B2 | 4/2013 | Matsushita et al. |
| 8,428,517 B2 | 4/2013 | Ting et al. |
| 8,432,820 B2 | 4/2013 | Liu et al. |
| 8,441,958 B2 | 5/2013 | Thubert et al. |
| 8,441,994 B2 | 5/2013 | Ito |
| 8,442,265 B1 | 5/2013 | Bosworth et al. |
| 8,442,520 B2 | 5/2013 | Alcorn |
| 8,446,884 B2 | 5/2013 | Petite et al. |
| 8,447,419 B1 | 5/2013 | de Anda Fast |
| 8,447,849 B2 | 5/2013 | Shaffer et al. |
| 8,447,875 B2 | 5/2013 | Liu et al. |
| 8,451,744 B2 | 5/2013 | Vasseur |
| 8,452,803 B2 | 5/2013 | Ghosh |
| 8,452,895 B2 | 5/2013 | Ito |
| 8,457,005 B2 | 6/2013 | Brown, III et al. |
| 8,458,799 B2 | 6/2013 | Fu et al. |
| 8,462,663 B2 | 6/2013 | Dahl |
| 8,462,691 B2 | 6/2013 | Tateson |
| 8,463,238 B2 | 6/2013 | Forstall et al. |
| 8,463,253 B2 | 6/2013 | Chipalkatti et al. |
| 8,467,297 B2 | 6/2013 | Liu et al. |
| 8,467,991 B2 | 6/2013 | Khosravy et al. |
| 8,472,348 B2 | 6/2013 | Hui et al. |
| 8,473,350 B1 | 6/2013 | Bouret et al. |
| 8,473,989 B2 | 6/2013 | Bahl et al. |
| 8,474,017 B2 | 6/2013 | Schultz et al. |
| 8,475,368 B2 | 7/2013 | Tran et al. |
| 8,477,687 B2 | 7/2013 | Iwasa |
| 8,478,229 B2 | 7/2013 | Velusamy et al. |
| 8,479,107 B2 | 7/2013 | Vainio et al. |
| 8,483,192 B2 | 7/2013 | Chu et al. |
| 8,483,616 B1 | 7/2013 | Hall |
| 8,483,652 B2 | 7/2013 | Hall |
| 8,484,344 B2 | 7/2013 | Butterfield et al. |
| 8,488,589 B2 | 7/2013 | Rudnick et al. |
| 8,489,063 B2 | 7/2013 | Petite |
| 8,489,701 B2 | 7/2013 | Manion et al. |
| 8,489,765 B2 | 7/2013 | Vasseur et al. |
| 8,490,075 B2 | 7/2013 | Waris et al. |
| 8,494,146 B2 | 7/2013 | Radziewicz et al. |
| 8,494,458 B2 | 7/2013 | Tucker et al. |
| 8,495,244 B2 | 7/2013 | Bonar et al. |
| 8,496,181 B2 | 7/2013 | Wang |
| 8,502,148 B2 | 8/2013 | Wagner et al. |
| 8,502,640 B2 | 8/2013 | Veillette |
| 8,503,309 B2 | 8/2013 | Vasseur et al. |
| 8,503,791 B2 | 8/2013 | Conwell |
| 8,503,934 B2 | 8/2013 | Beghini et al. |
| 8,503,959 B2 | 8/2013 | Qi et al. |
| 8,504,921 B2 | 8/2013 | Wilson et al. |
| 8,509,394 B2 | 8/2013 | Radziewicz et al. |
| 8,509,762 B2 | 8/2013 | Li et al. |
| 8,509,765 B2 | 8/2013 | Alcorn |
| 8,514,915 B2 | 8/2013 | Binder et al. |
| 8,515,391 B2 | 8/2013 | Cormier et al. |
| 8,515,547 B2 | 8/2013 | Mass et al. |
| 8,520,535 B2 | 8/2013 | Dawson et al. |
| 8,520,676 B2 | 8/2013 | Shaffer et al. |
| 8,520,979 B2 | 8/2013 | Conwell |
| 8,521,156 B2 | 8/2013 | Alcorn |
| 8,521,220 B2 | 8/2013 | Lazaridis |
| 8,525,692 B2 | 9/2013 | Mason, Jr. et al. |
| 8,526,911 B2 | 9/2013 | Li et al. |
| 8,527,554 B2 | 9/2013 | Gubitz et al. |
| 8,527,622 B2 | 9/2013 | Moreira Sa de Souza |
| 8,532,020 B2 | 9/2013 | Aust et al. |
| 8,533,069 B2 | 9/2013 | Sanguinetti |

(56) References Cited

U.S. PATENT DOCUMENTS

| | | |
|---|---|---|
| 8,533,758 B2 | 9/2013 | Ruiz-Velasco |
| 8,538,458 B2 | 9/2013 | Haney |
| 8,544,023 B2 | 9/2013 | Sim-Tang et al. |
| 8,547,868 B2 | 10/2013 | Ding et al. |
| 8,547,875 B2 | 10/2013 | Adams et al. |
| 8,548,607 B1 | 10/2013 | Belz et al. |
| 8,553,560 B2 | 10/2013 | Axelsson et al. |
| 8,553,688 B2 | 10/2013 | Vasseur et al. |
| 8,559,293 B2 | 10/2013 | Lin et al. |
| 8,559,442 B2 | 10/2013 | Vasseur et al. |
| 8,560,274 B2 | 10/2013 | Gregory et al. |
| 8,565,201 B2 | 10/2013 | Jeong et al. |
| 8,571,046 B2 | 10/2013 | Romero et al. |
| 8,571,474 B2 | 10/2013 | Chavez et al. |
| 8,571,518 B2 | 10/2013 | Imes et al. |
| RE44,606 E | 11/2013 | Herz et al. |
| 8,576,831 B2 | 11/2013 | Zhang et al. |
| 8,577,004 B2 | 11/2013 | Hans et al. |
| 8,577,391 B2 | 11/2013 | Parker et al. |
| 8,578,015 B2 | 11/2013 | Billhartz |
| 8,578,054 B2 | 11/2013 | Thubert et al. |
| 8,583,671 B2 | 11/2013 | Martin et al. |
| 8,583,978 B2 | 11/2013 | Shaffer et al. |
| 8,587,427 B2 | 11/2013 | LaLonde et al. |
| 8,588,108 B2 | 11/2013 | Vasseur et al. |
| 8,588,126 B2 | 11/2013 | Blair et al. |
| 8,593,419 B2 | 11/2013 | Thorn |
| 8,593,986 B2 | 11/2013 | Vasseur et al. |
| 8,595,359 B2 | 11/2013 | Shaffer et al. |
| 8,599,014 B2 | 12/2013 | Prykari et al. |
| 8,600,830 B2 | 12/2013 | Hoffberg |
| 8,605,657 B2 | 12/2013 | Hwang et al. |
| 8,606,021 B2 | 12/2013 | Conwell |
| 8,611,275 B2 | 12/2013 | Yarvis et al. |
| 8,611,894 B2 | 12/2013 | Ben-Shaul et al. |
| 8,612,583 B2 | 12/2013 | Hui et al. |
| 8,612,752 B2 | 12/2013 | Batta |
| 8,615,257 B2 | 12/2013 | Khosravy et al. |
| 8,619,576 B2 | 12/2013 | Vasseur et al. |
| 8,619,789 B2 | 12/2013 | Hui et al. |
| 8,620,772 B2 | 12/2013 | Owen |
| 8,620,784 B2 | 12/2013 | Dawson et al. |
| 8,621,577 B2 | 12/2013 | Choi et al. |
| 8,621,656 B2 | 12/2013 | Miettinen et al. |
| 8,622,837 B2 | 1/2014 | Harris et al. |
| 8,624,771 B2 | 1/2014 | Kuhn |
| 8,625,496 B2 | 1/2014 | Brownrigg et al. |
| 8,625,515 B2 | 1/2014 | Liu et al. |
| 8,625,785 B2 | 1/2014 | Nagaraja |
| 8,626,344 B2 | 1/2014 | Imes et al. |
| 8,626,844 B2 | 1/2014 | Schulzrinne et al. |
| 8,630,177 B2 | 1/2014 | Vasseur et al. |
| 8,630,275 B2 | 1/2014 | Ji et al. |
| 8,630,291 B2 | 1/2014 | Shaffer et al. |
| 8,630,314 B2 | 1/2014 | York |
| 8,631,084 B2 | 1/2014 | Garcia |
| 8,631,101 B2 | 1/2014 | Shaffer et al. |
| 8,635,317 B2 | 1/2014 | Ylinen et al. |
| 8,636,395 B2 | 1/2014 | Gergets et al. |
| 8,638,667 B2 | 1/2014 | Shaffer et al. |
| 8,638,690 B2 | 1/2014 | Javaid et al. |
| 8,638,763 B2 | 1/2014 | Comstock et al. |
| 8,639,756 B2 | 1/2014 | Bostrom et al. |
| 8,644,165 B2 | 2/2014 | Saarimaki et al. |
| 8,645,383 B2 | 2/2014 | Brown et al. |
| 8,649,732 B2 | 2/2014 | Hidaka |
| 8,652,038 B2 | 2/2014 | Tran et al. |
| 8,654,627 B2 | 2/2014 | Datz et al. |
| 8,654,649 B2 | 2/2014 | Vasseur et al. |
| 8,654,698 B2 | 2/2014 | Koskela et al. |
| 8,654,782 B2 | 2/2014 | Meil et al. |
| 8,655,369 B2 | 2/2014 | Chen |
| 8,655,395 B2 | 2/2014 | Gaal et al. |
| 8,660,047 B2 | 2/2014 | Jerbi et al. |
| 8,660,139 B2 | 2/2014 | Ruckart |
| 8,660,493 B2 | 2/2014 | Bocking et al. |
| 8,661,081 B2 | 2/2014 | Rahnama et al. |
| 8,661,144 B2 | 2/2014 | Schultz et al. |
| 8,661,500 B2 | 2/2014 | Boldyrev et al. |
| 8,665,890 B2 | 3/2014 | Yousefi'zadeh et al. |
| 8,666,357 B2 | 3/2014 | Petite |
| 8,667,084 B2 | 3/2014 | Vasseur et al. |
| 8,670,416 B2 | 3/2014 | Ree et al. |
| 8,675,678 B2 | 3/2014 | Farrag et al. |
| 8,676,623 B2 | 3/2014 | Gale et al. |
| 8,682,982 B2 | 3/2014 | Jung et al. |
| 8,688,041 B2 | 4/2014 | Ji et al. |
| 8,693,322 B2 | 4/2014 | Zhang |
| 8,695,078 B2 | 4/2014 | Low et al. |
| 8,699,333 B2 | 4/2014 | Vasseur et al. |
| 8,699,368 B2 | 4/2014 | Hui et al. |
| 8,699,377 B2 | 4/2014 | Veillette |
| 8,700,301 B2 | 4/2014 | Khosravy et al. |
| 8,700,302 B2 | 4/2014 | Khosravy et al. |
| 8,700,536 B2 | 4/2014 | Richard |
| 8,700,708 B2 | 4/2014 | Richter et al. |
| 8,702,506 B2 | 4/2014 | Hall |
| 8,707,785 B2 | 4/2014 | Goodman et al. |
| 8,710,983 B2 | 4/2014 | Malkowski |
| 8,712,056 B2 | 4/2014 | Hall |
| 8,712,444 B2 | 4/2014 | Dahl et al. |
| 8,712,711 B2 | 4/2014 | Nayar et al. |
| 8,715,072 B2 | 5/2014 | Harris et al. |
| 8,718,055 B2 | 5/2014 | Vasseur et al. |
| 8,718,797 B1 | 5/2014 | Addepalli et al. |
| 8,719,341 B2 | 5/2014 | Issa et al. |
| 8,719,368 B2 | 5/2014 | Tseng |
| 8,719,563 B2 | 5/2014 | Kojima et al. |
| 8,724,508 B2 | 5/2014 | Chiang et al. |
| 8,725,274 B2 | 5/2014 | Veillette |
| 8,727,978 B2 | 5/2014 | Tran et al. |
| 8,730,047 B2 | 5/2014 | Ridder et al. |
| 8,730,844 B2 | 5/2014 | Johnson et al. |
| 8,730,875 B2 | 5/2014 | Noda |
| 8,730,974 B2 | 5/2014 | Karaoguz et al. |
| 8,732,338 B2 | 5/2014 | Hutchison et al. |
| 8,732,454 B2 | 5/2014 | Furukawa et al. |
| 8,737,206 B2 | 5/2014 | Li et al. |
| 8,738,944 B2 | 5/2014 | Addepalli et al. |
| 8,739,271 B2 | 5/2014 | Schultz et al. |
| 8,743,750 B2 | 6/2014 | Tourolle et al. |
| 8,743,768 B2 | 6/2014 | Vasseur et al. |
| 8,743,866 B2 | 6/2014 | Vasseur |
| 8,744,419 B2 | 6/2014 | Hall et al. |
| 8,744,516 B2 | 6/2014 | Gurevich |
| 8,745,121 B2 | 6/2014 | Boldyrev et al. |
| 8,747,313 B2 | 6/2014 | Tran et al. |
| 8,750,242 B2 | 6/2014 | Forte et al. |
| 8,751,063 B2 | 6/2014 | Bernstein et al. |
| 8,751,159 B2 | 6/2014 | Hall |
| 8,751,644 B2 | 6/2014 | Bornhoevd et al. |
| 8,755,294 B2 | 6/2014 | Isozu |
| 8,755,336 B2 | 6/2014 | Kondo et al. |
| 8,755,763 B2 | 6/2014 | Qureshey et al. |
| 8,755,837 B2 | 6/2014 | Rhoads et al. |
| 8,756,449 B2 | 6/2014 | Shaffer et al. |
| 8,760,339 B2 | 6/2014 | Kuhn |
| 8,761,175 B2 | 6/2014 | Guha et al. |
| 8,761,285 B2 | 6/2014 | Addepalli et al. |
| 8,762,852 B2 | 6/2014 | Davis et al. |
| 8,768,313 B2 | 7/2014 | Rodriguez |
| 8,769,442 B2 | 7/2014 | Khosravy et al. |
| 8,774,050 B2 | 7/2014 | Vasseur et al. |
| 8,774,051 B2 | 7/2014 | Yamamoto et al. |
| 8,774,094 B2 | 7/2014 | Chen |
| 8,774,192 B2 | 7/2014 | Das et al. |
| 8,774,374 B2 | 7/2014 | Hao et al. |
| 8,774,946 B2 | 7/2014 | Nrusimhan N.V. et al. |
| 8,777,752 B2 | 7/2014 | Hall |
| 8,780,201 B1 | 7/2014 | Scalisi et al. |
| 8,780,953 B2 | 7/2014 | Shaffer et al. |
| 8,781,084 B2 | 7/2014 | Reyes et al. |
| 8,781,462 B2 | 7/2014 | Osterloh et al. |
| 8,787,246 B2 | 7/2014 | Brownrigg |

(56) References Cited

U.S. PATENT DOCUMENTS

| | | |
|---|---|---|
| 8,787,257 B2 | 7/2014 | Fujita |
| 8,787,375 B2 | 7/2014 | Liu et al. |
| 8,787,392 B2 | 7/2014 | Vasseur et al. |
| 8,787,944 B2 | 7/2014 | Smith |
| 8,788,516 B1 | 7/2014 | Jakubik |
| 8,789,133 B2 | 7/2014 | Kuhlke et al. |
| 8,792,421 B2 | 7/2014 | Zaks |
| 8,792,850 B2 | 7/2014 | Qureshey et al. |
| 8,792,860 B2 | 7/2014 | Willey et al. |
| 8,792,880 B2 | 7/2014 | Alcorn |
| 8,797,878 B1 | 8/2014 | Ruiz et al. |
| 8,797,916 B2 | 8/2014 | Sadok et al. |
| 8,798,034 B2 | 8/2014 | Aggarwal et al. |
| 8,798,094 B2 | 8/2014 | Wuthnow et al. |
| 8,798,648 B2 | 8/2014 | Bhat |
| 8,799,220 B2 | 8/2014 | O'Malley |
| 8,799,374 B2 | 8/2014 | Sharma |
| 8,799,510 B2 | 8/2014 | Vasseur et al. |
| 8,800,010 B2 | 8/2014 | Hui et al. |
| 8,804,517 B2 | 8/2014 | Oerton |
| 8,804,603 B2 | 8/2014 | Powell, III et al. |
| 8,804,613 B2 | 8/2014 | Iwasa |
| 8,805,110 B2 | 8/2014 | Rhoads et al. |
| 8,806,633 B2 | 8/2014 | Shaffer et al. |
| 8,810,368 B2 | 8/2014 | Sovio et al. |
| 8,810,684 B2 | 8/2014 | Chang |
| 8,811,234 B2 | 8/2014 | Gossain et al. |
| 8,811,357 B2 | 8/2014 | Kim |
| 8,811,379 B2 | 8/2014 | Yoshiuchi et al. |
| 8,812,419 B1 | 8/2014 | Teller et al. |
| 8,812,499 B2 | 8/2014 | Sathish et al. |
| 8,812,688 B2 | 8/2014 | Luukkala et al. |
| 8,813,134 B2 | 8/2014 | Goodman et al. |
| 8,817,665 B2 | 8/2014 | Thubert et al. |
| 8,818,405 B2 | 8/2014 | Sheilendra |
| 8,818,522 B2 | 8/2014 | Mass et al. |
| 8,819,172 B2 | 8/2014 | Davis et al. |
| 8,819,191 B2 | 8/2014 | Hui et al. |
| 8,821,293 B2 | 9/2014 | Hall |
| 8,823,795 B1 | 9/2014 | Scalisi et al. |
| 8,824,471 B2 | 9/2014 | Hui et al. |
| 8,825,103 B2 | 9/2014 | Yamamoto et al. |
| 8,830,837 B2 | 9/2014 | Vasseur et al. |
| 8,831,279 B2 | 9/2014 | Rodriguez et al. |
| 8,831,869 B2 | 9/2014 | Bai et al. |
| 8,832,302 B1 | 9/2014 | Bradford et al. |
| 8,832,428 B2 | 9/2014 | Ota et al. |
| 8,837,277 B2 | 9/2014 | Vasseur et al. |
| 8,837,738 B2 | 9/2014 | Huang et al. |
| 8,839,347 B2 | 9/2014 | Boldyrev et al. |
| 8,839,397 B2 | 9/2014 | Schultz et al. |
| 8,842,180 B1 | 9/2014 | Kasmir et al. |
| 8,842,630 B2 | 9/2014 | Shaffer et al. |
| 8,843,127 B2 | 9/2014 | Boldyrev et al. |
| 8,843,156 B2 | 9/2014 | Prince et al. |
| 8,844,051 B2 | 9/2014 | Arrasvuori et al. |
| 8,848,579 B1 * | 9/2014 | Reeves ............... H04M 15/00 370/271 |
| 8,848,970 B2 | 9/2014 | Aller et al. |
| 8,849,259 B2 | 9/2014 | Rhoads et al. |
| 8,851,380 B2 | 10/2014 | Brown et al. |
| 8,855,372 B2 | 10/2014 | Rodriguez et al. |
| 8,855,600 B2 | 10/2014 | Velusamy |
| 8,855,712 B2 | 10/2014 | Lord et al. |
| 8,855,794 B2 | 10/2014 | Imes et al. |
| 8,855,830 B2 | 10/2014 | Imes et al. |
| 8,856,227 B2 | 10/2014 | Choi et al. |
| 8,856,252 B2 | 10/2014 | Leppanen et al. |
| 8,856,323 B2 | 10/2014 | Enns et al. |
| 8,856,882 B2 | 10/2014 | Maximilien et al. |
| 8,861,390 B2 | 10/2014 | Hui et al. |
| 8,861,398 B2 | 10/2014 | Bhatti et al. |
| 8,862,129 B2 | 10/2014 | Moshir et al. |
| 8,862,774 B2 | 10/2014 | Vasseur et al. |
| 8,867,329 B2 | 10/2014 | Hui et al. |
| 8,868,027 B2 | 10/2014 | Hall |
| 8,868,374 B2 | 10/2014 | Khosravy et al. |
| 8,868,445 B2 | 10/2014 | Bouret et al. |
| 8,868,713 B2 | 10/2014 | Aziz |
| 8,872,379 B2 | 10/2014 | Ruiz et al. |
| 8,872,767 B2 | 10/2014 | Khosravy et al. |
| 8,872,915 B1 | 10/2014 | Scalisi et al. |
| 8,873,391 B2 | 10/2014 | Brown et al. |
| 8,873,526 B2 | 10/2014 | Shaffer et al. |
| 8,873,580 B2 | 10/2014 | Chandramouli et al. |
| 8,873,853 B2 | 10/2014 | Rodriguez |
| 8,874,477 B2 | 10/2014 | Hoffberg |
| 8,874,788 B2 | 10/2014 | Vasseur et al. |
| 8,879,604 B2 | 11/2014 | Woo et al. |
| 8,879,613 B1 | 11/2014 | Hui et al. |
| 8,880,060 B2 | 11/2014 | Alcorn |
| 8,880,555 B2 | 11/2014 | Tseng |
| 8,880,663 B2 | 11/2014 | Miettinen |
| 8,885,501 B2 | 11/2014 | Vasseur et al. |
| 8,885,630 B2 | 11/2014 | Pun et al. |
| 8,886,206 B2 | 11/2014 | Lord et al. |
| 8,886,227 B2 | 11/2014 | Schmidt et al. |
| 8,886,782 B2 | 11/2014 | Lucero et al. |
| 8,891,419 B2 | 11/2014 | Smadi |
| 8,891,534 B2 | 11/2014 | Vasseur et al. |
| 8,891,588 B1 | 11/2014 | Hui et al. |
| 8,892,271 B2 | 11/2014 | Breed |
| 8,897,263 B2 | 11/2014 | Chiang |
| 8,898,567 B2 | 11/2014 | Arrasvuori et al. |
| 8,898,793 B2 | 11/2014 | Miettinen et al. |
| 8,908,516 B2 | 12/2014 | Tzamaloukas et al. |
| 8,908,536 B2 | 12/2014 | Hui et al. |
| 8,908,621 B2 | 12/2014 | Vasseur et al. |
| 8,908,626 B2 | 12/2014 | Hui et al. |
| 8,910,035 B2 | 12/2014 | Zhu et al. |
| 8,914,024 B2 | 12/2014 | Alharayeri |
| 8,914,442 B2 | 12/2014 | Tseng |
| 8,918,072 B2 | 12/2014 | Qi et al. |
| 8,918,480 B2 | 12/2014 | Qureshey et al. |
| 8,923,186 B1 | 12/2014 | daCosta |
| 8,923,285 B2 | 12/2014 | Wentink |
| 8,923,422 B2 | 12/2014 | Hui et al. |
| 8,924,587 B2 | 12/2014 | Petite |
| 8,924,588 B2 | 12/2014 | Petite |
| 8,929,375 B2 | 1/2015 | Iwao et al. |
| 8,929,877 B2 | 1/2015 | Rhoads et al. |
| 8,930,361 B2 | 1/2015 | Heinonen et al. |
| 8,930,374 B2 | 1/2015 | Boldyrev et al. |
| 8,930,571 B2 | 1/2015 | Petite |
| 8,930,837 B2 | 1/2015 | Walkin et al. |
| 8,934,366 B2 | 1/2015 | Hui et al. |
| 8,934,496 B2 | 1/2015 | Vasseur |
| 8,935,237 B2 | 1/2015 | Andersson et al. |
| 8,937,886 B2 | 1/2015 | Shaffer et al. |
| 8,938,270 B2 | 1/2015 | Singh |
| 8,938,690 B1 | 1/2015 | Khouri et al. |
| 8,942,197 B2 | 1/2015 | Rudnick et al. |
| 8,942,301 B2 | 1/2015 | Hui et al. |
| 8,942,638 B2 | 1/2015 | Le Thierry D'ennequin et al. |
| 8,942,718 B2 | 1/2015 | Svendsen |
| 8,948,046 B2 | 2/2015 | Kang et al. |
| 8,948,229 B2 | 2/2015 | Hui et al. |
| 8,949,959 B2 | 2/2015 | Mahamuni et al. |
| 8,952,983 B2 | 2/2015 | Uusitalo et al. |
| 8,954,582 B2 | 2/2015 | Vasseur et al. |
| 8,954,863 B2 | 2/2015 | Khouri et al. |
| 8,958,417 B2 | 2/2015 | Zhao et al. |
| 8,959,539 B2 | 2/2015 | Adimatyam et al. |
| 8,964,629 B2 | 2/2015 | Blair et al. |
| 8,964,708 B2 | 2/2015 | Petite |
| 8,964,762 B2 | 2/2015 | Hui et al. |
| 8,964,773 B2 | 2/2015 | Brown, III et al. |
| 8,964,787 B2 | 2/2015 | McMullin et al. |
| 8,965,288 B2 | 2/2015 | Barnes et al. |
| 8,966,046 B2 | 2/2015 | Preden et al. |
| 8,970,392 B2 | 3/2015 | LaLonde et al. |
| 8,970,394 B2 | 3/2015 | Veillette |
| 8,970,540 B1 | 3/2015 | Hebenstreit et al. |
| 8,971,188 B2 | 3/2015 | Vasseur et al. |

(56) References Cited

U.S. PATENT DOCUMENTS

| | | |
|---|---|---|
| 8,971,318 B2 | 3/2015 | Yamada et al. |
| 8,972,159 B2 | 3/2015 | Ferreira et al. |
| 8,976,007 B2 | 3/2015 | Dugan et al. |
| 8,976,105 B2 | 3/2015 | Toksvig et al. |
| 8,977,267 B2 | 3/2015 | Aoyama et al. |
| 8,977,285 B2 | 3/2015 | Bansal et al. |
| 8,977,304 B2 | 3/2015 | Ramanujam et al. |
| 8,977,785 B2 | 3/2015 | Polehn |
| 8,981,946 B2 | 3/2015 | Runge et al. |
| 8,982,856 B2 | 3/2015 | Brownrigg |
| 8,983,991 B2 | 3/2015 | Sankar et al. |
| 8,984,277 B2 | 3/2015 | Dasgupta et al. |
| 8,989,706 B2 | 3/2015 | Ananthanarayanan et al. |
| 8,989,709 B2 | 3/2015 | Cormier et al. |
| 8,996,688 B2 | 3/2015 | Arrasvuori |
| 9,001,645 B2 | 4/2015 | Hellhake et al. |
| 9,001,669 B2 | 4/2015 | Vasseur et al. |
| 9,001,676 B2 | 4/2015 | Hui et al. |
| 9,001,787 B1 | 4/2015 | Conant et al. |
| 9,007,050 B2 | 4/2015 | Hill |
| 9,008,089 B2 | 4/2015 | Liu et al. |
| 9,008,090 B2 | 4/2015 | Matsushita et al. |
| 9,008,092 B2 | 4/2015 | Thubert et al. |
| 9,008,649 B2 | 4/2015 | Hidaka |
| 9,008,693 B2 | 4/2015 | Boldyrev et al. |
| 9,008,724 B2 | 4/2015 | Lord |
| 9,013,173 B2 | 4/2015 | Veillette |
| 9,013,983 B2 | 4/2015 | Vasseur et al. |
| 9,019,846 B2 | 4/2015 | Shaffer et al. |
| 9,020,008 B2 | 4/2015 | Hui et al. |
| 9,020,966 B2 | 4/2015 | Erol et al. |
| 9,026,905 B2 | 5/2015 | Tseng et al. |
| 9,027,076 B2 | 5/2015 | Roach et al. |
| 9,030,939 B2 | 5/2015 | Hui et al. |
| 9,031,082 B2 | 5/2015 | Saffre |
| 9,036,509 B1 | 5/2015 | Addepalli et al. |
| 9,036,560 B2 | 5/2015 | Chen |
| 9,036,605 B2 | 5/2015 | Forte et al. |
| 9,037,653 B2 | 5/2015 | Wiseman et al. |
| 9,037,896 B2 | 5/2015 | Addepalli et al. |
| 9,041,349 B2 | 5/2015 | Bemmel et al. |
| 9,042,267 B2 | 5/2015 | Bill |
| 9,049,260 B2 | 6/2015 | Sidhu et al. |
| 9,055,020 B2 | 6/2015 | Miettinen et al. |
| 9,055,152 B2 | 6/2015 | Hao et al. |
| 9,055,521 B2 | 6/2015 | Iwasa |
| 9,058,103 B2 | 6/2015 | St. Clair |
| 9,058,104 B2 | 6/2015 | St. Clair |
| 9,059,929 B2 | 6/2015 | Sudhaakar et al. |
| 9,064,374 B2 | 6/2015 | Jabara et al. |
| 9,071,451 B2 | 6/2015 | Hall |
| 9,071,533 B2 | 6/2015 | Hui et al. |
| 9,072,100 B2 | 6/2015 | Vasseur et al. |
| 9,076,009 B2 | 7/2015 | Sathish et al. |
| 9,077,577 B1 | 7/2015 | Ashrafi et al. |
| 9,077,772 B2 | 7/2015 | Hui et al. |
| 9,080,890 B2 | 7/2015 | Svendsen et al. |
| 9,081,567 B1 | 7/2015 | Mahamuni et al. |
| 9,081,779 B2 | 7/2015 | Gupta |
| 9,084,120 B2 | 7/2015 | Frei |
| 9,088,983 B2 | 7/2015 | Hui et al. |
| 9,092,476 B2 | 7/2015 | Ghosh |
| 9,094,324 B2 | 7/2015 | Vasseur et al. |
| 9,094,503 B2 | 7/2015 | Hans et al. |
| 9,098,802 B2 | 8/2015 | Deng et al. |
| 9,100,103 B2 | 8/2015 | Okada |
| 9,100,305 B2 | 8/2015 | Hui et al. |
| 9,100,907 B2 | 8/2015 | Liu |
| 9,104,915 B2 | 8/2015 | Conwell |
| 9,105,053 B2 | 8/2015 | Cao et al. |
| 9,106,555 B2 | 8/2015 | Agarwal et al. |
| 9,110,685 B2 | 8/2015 | Suryanarayana et al. |
| 9,110,992 B2 | 8/2015 | Johnson et al. |
| 9,111,240 B2 | 8/2015 | Petite |
| 9,112,805 B2 | 8/2015 | Hui et al. |
| 9,116,971 B2 | 8/2015 | Nicklin |
| 9,118,428 B2 | 8/2015 | Hall |
| 9,118,539 B2 | 8/2015 | Vasseur et al. |
| 9,119,130 B2 | 8/2015 | Hui et al. |
| 9,123,078 B2 | 9/2015 | Ugur et al. |
| 9,124,482 B2 | 9/2015 | Vasseur et al. |
| 9,125,009 B2 | 9/2015 | Felt |
| 9,128,689 B2 | 9/2015 | Shaffer et al. |
| 9,129,333 B2 | 9/2015 | Hardie et al. |
| 9,129,497 B2 | 9/2015 | Petite |
| 9,130,863 B2 | 9/2015 | Vasseur et al. |
| 9,135,664 B2 | 9/2015 | Grassel et al. |
| 9,141,698 B2 | 9/2015 | Brown et al. |
| 9,143,456 B2 | 9/2015 | Shaffer et al. |
| 9,143,601 B2 | 9/2015 | Padmanabhan et al. |
| 9,154,370 B2 | 10/2015 | Hui et al. |
| 9,154,407 B2 | 10/2015 | Hui et al. |
| 9,154,575 B2 | 10/2015 | Harik et al. |
| 9,158,801 B2 | 10/2015 | Lassen et al. |
| 9,160,760 B2 | 10/2015 | Vasseur et al. |
| 9,161,158 B2 | 10/2015 | Hall |
| 9,166,845 B2 | 10/2015 | Hui et al. |
| 9,167,516 B2 | 10/2015 | Rendas |
| 9,170,784 B1 | 10/2015 | Friedman |
| 9,172,613 B2 | 10/2015 | Hui et al. |
| 9,172,636 B2 | 10/2015 | Agarwal et al. |
| 9,172,812 B2 | 10/2015 | Katpelly et al. |
| 9,173,168 B2 | 10/2015 | Rodriguez et al. |
| 9,176,832 B2 | 11/2015 | Vasseur et al. |
| 9,178,699 B2 | 11/2015 | Lambert et al. |
| 9,178,772 B2 | 11/2015 | Dasgupta et al. |
| 9,179,494 B2 | 11/2015 | Arkko et al. |
| 9,183,573 B2 | 11/2015 | Tseng |
| 9,185,070 B2 | 11/2015 | McPhee |
| 9,185,521 B2 | 11/2015 | Leppanen et al. |
| 9,189,822 B2 | 11/2015 | Conant et al. |
| 9,197,380 B2 | 11/2015 | Shetty et al. |
| 9,198,203 B2 | 11/2015 | Shaffer et al. |
| 9,201,701 B2 | 12/2015 | Boldyrev et al. |
| 9,204,038 B2 | 12/2015 | Lord et al. |
| 9,207,832 B1 | 12/2015 | Khouri et al. |
| 9,208,384 B2 | 12/2015 | Conwell et al. |
| 9,210,045 B2 | 12/2015 | Shaffer et al. |
| 9,210,232 B2 | 12/2015 | Strandell et al. |
| 9,210,589 B2 | 12/2015 | Panta et al. |
| 9,210,647 B2 | 12/2015 | Ikemoto et al. |
| 9,210,721 B2 | 12/2015 | Ueda et al. |
| 9,215,716 B2 | 12/2015 | Mie et al. |
| 9,218,216 B2 | 12/2015 | Vasseur et al. |
| 9,218,503 B2 | 12/2015 | Counterman |
| 9,219,682 B2 | 12/2015 | Vasseur et al. |
| 9,223,783 B2 | 12/2015 | Doyle |
| 9,223,859 B2 | 12/2015 | Manera et al. |
| 9,225,589 B2 | 12/2015 | Hui et al. |
| 9,225,616 B2 | 12/2015 | Vasseur et al. |
| 9,225,688 B2 | 12/2015 | Biswas et al. |
| 9,225,760 B2 | 12/2015 | Ralston et al. |
| 9,226,182 B2 | 12/2015 | Das et al. |
| 9,226,331 B2 | 12/2015 | Hidaka |
| 9,226,339 B2 | 12/2015 | Soliman |
| 9,230,104 B2 | 1/2016 | Vasseur et al. |
| 9,231,850 B2 | 1/2016 | Agarwal et al. |
| 9,231,965 B1 | 1/2016 | Vasseur et al. |
| 9,232,050 B2 | 1/2016 | Ren |
| 9,232,458 B2 | 1/2016 | Vasseur et al. |
| 9,235,268 B2 | 1/2016 | Arrasvuori et al. |
| 9,236,904 B2 | 1/2016 | Hui et al. |
| 9,236,999 B2 | 1/2016 | Alapuranen |
| 9,237,505 B2 | 1/2016 | Munari et al. |
| 9,240,913 B2 | 1/2016 | Hui et al. |
| 9,245,408 B2 | 1/2016 | Jabara et al. |
| 9,246,554 B2 | 1/2016 | Maguire |
| 9,246,862 B2 | 1/2016 | Papakipos et al. |
| 9,246,961 B2 | 1/2016 | Walkin et al. |
| 9,251,297 B2 | 2/2016 | Brown et al. |
| 9,252,986 B2 | 2/2016 | Ashrafi et al. |
| 9,253,015 B2 | 2/2016 | Girard |
| 9,253,021 B2 | 2/2016 | Vasseur et al. |
| 9,253,282 B2 | 2/2016 | O'Donoghue et al. |

(56) References Cited

U.S. PATENT DOCUMENTS

| | | |
|---|---|---|
| 9,756,549 B2 | 9/2017 | Perdomo |
| 2002/0039357 A1 | 4/2002 | Lipasti et al. |
| 2002/0071160 A1 | 6/2002 | Pavelchek |
| 2002/0071477 A1 | 6/2002 | Orava |
| 2002/0083316 A1 | 6/2002 | Platenberg et al. |
| 2002/0122410 A1 | 9/2002 | Kulikov et al. |
| 2002/0161476 A1 | 10/2002 | Panofsky et al. |
| 2003/0045272 A1 | 3/2003 | Burr |
| 2003/0045296 A1 | 3/2003 | Burr |
| 2003/0202468 A1 | 10/2003 | Cain et al. |
| 2003/0202469 A1 | 10/2003 | Cain |
| 2003/0202476 A1 | 10/2003 | Billhartz et al. |
| 2003/0202512 A1 | 10/2003 | Kennedy |
| 2003/0204587 A1 | 10/2003 | Billhartz |
| 2003/0204616 A1 | 10/2003 | Billhartz et al. |
| 2004/0022223 A1 | 2/2004 | Billhartz |
| 2004/0022224 A1 | 2/2004 | Billhartz |
| 2004/0028000 A1 | 2/2004 | Billhartz |
| 2004/0028016 A1 | 2/2004 | Billhartz |
| 2004/0029553 A1 | 2/2004 | Cain |
| 2004/0042417 A1 | 3/2004 | Kennedy |
| 2004/0042434 A1 | 3/2004 | Kennedy |
| 2004/0057409 A1 | 3/2004 | Kennedy |
| 2004/0083195 A1 | 4/2004 | McCord et al. |
| 2004/0160943 A1 | 8/2004 | Cain |
| 2004/0174900 A1 | 9/2004 | Volpi et al. |
| 2004/0181517 A1 | 9/2004 | Jung et al. |
| 2004/0181540 A1 | 9/2004 | Jung et al. |
| 2004/0190529 A1 | 9/2004 | Hara |
| 2004/0198386 A1 | 10/2004 | Dupray |
| 2004/0203381 A1 | 10/2004 | Cahn et al. |
| 2004/0203385 A1 | 10/2004 | Narayanan et al. |
| 2004/0203617 A1 | 10/2004 | Knauerhase et al. |
| 2004/0203797 A1 | 10/2004 | Burr |
| 2004/0203820 A1 | 10/2004 | Billhartz |
| 2004/0210657 A1 | 10/2004 | Narayanan et al. |
| 2004/0214609 A1 | 10/2004 | Sagi et al. |
| 2004/0218548 A1 | 11/2004 | Kennedy et al. |
| 2004/0218582 A1 | 11/2004 | Kennedy et al. |
| 2004/0219909 A1 | 11/2004 | Kennedy et al. |
| 2004/0223497 A1 | 11/2004 | Sanderson et al. |
| 2004/0223498 A1 | 11/2004 | Sanderson et al. |
| 2004/0223499 A1 | 11/2004 | Sanderson et al. |
| 2004/0223500 A1 | 11/2004 | Sanderson et al. |
| 2004/0228343 A1 | 11/2004 | Molteni et al. |
| 2004/0236818 A1 | 11/2004 | Bantz et al. |
| 2004/0264466 A1 | 12/2004 | Huang |
| 2005/0025181 A1 | 2/2005 | Nazari |
| 2005/0025182 A1 | 2/2005 | Nazari |
| 2005/0041591 A1 | 2/2005 | Duggi et al. |
| 2005/0053003 A1 | 3/2005 | Cain et al. |
| 2005/0053004 A1 | 3/2005 | Cain et al. |
| 2005/0053005 A1 | 3/2005 | Cain et al. |
| 2005/0053007 A1 | 3/2005 | Bernhardt et al. |
| 2005/0053094 A1 | 3/2005 | Cain et al. |
| 2005/0054346 A1 | 3/2005 | Windham et al. |
| 2005/0107129 A1 | 5/2005 | Kaewell et al. |
| 2005/0114869 A1 | 5/2005 | Iwamura et al. |
| 2005/0141706 A1 | 6/2005 | Regli et al. |
| 2005/0143096 A1 | 6/2005 | Boesch |
| 2005/0157661 A1 | 7/2005 | Cho |
| 2005/0220046 A1 | 10/2005 | Falck et al. |
| 2005/0232242 A1 | 10/2005 | Karaoguz et al. |
| 2005/0232247 A1 | 10/2005 | Whitley et al. |
| 2005/0254473 A1 | 11/2005 | Preguica et al. |
| 2005/0259588 A1 | 11/2005 | Preguica |
| 2005/0259595 A1 | 11/2005 | Preguica |
| 2005/0265259 A1 | 12/2005 | Thubert et al. |
| 2005/0276608 A1 | 12/2005 | Pavelchek |
| 2006/0002324 A1* | 1/2006 | Babbar ............ H04L 29/1232 370/325 |
| 2006/0002328 A1 | 1/2006 | Naghian |
| 2006/0007863 A1 | 1/2006 | Naghian |
| 2006/0023632 A1 | 2/2006 | Ozer et al. |
| 2006/0030318 A1 | 2/2006 | Moore et al. |
| 2006/0035676 A1 | 2/2006 | Sayers et al. |
| 2006/0040622 A1 | 2/2006 | Qi et al. |
| 2006/0053207 A1 | 3/2006 | Labelle et al. |
| 2006/0058013 A1 | 3/2006 | Bocking et al. |
| 2006/0066484 A1 | 3/2006 | Sayers |
| 2006/0071794 A1 | 4/2006 | Sayers et al. |
| 2006/0071853 A1 | 4/2006 | Sayers |
| 2006/0088042 A1 | 4/2006 | Shoham et al. |
| 2006/0092043 A1 | 5/2006 | Lagassey |
| 2006/0095199 A1 | 5/2006 | Lagassey |
| 2006/0126535 A1 | 6/2006 | Sherman |
| 2006/0167784 A1 | 7/2006 | Hoffberg |
| 2006/0176829 A1 | 8/2006 | McLaughlin et al. |
| 2006/0218153 A1 | 9/2006 | Voon et al. |
| 2006/0218225 A1 | 9/2006 | Hee Voon et al. |
| 2006/0227724 A1 | 10/2006 | Thubert et al. |
| 2006/0229090 A1 | 10/2006 | LaDue |
| 2006/0233328 A1 | 10/2006 | Radziewicz et al. |
| 2006/0245451 A1 | 11/2006 | Wakid |
| 2006/0251115 A1 | 11/2006 | Haque et al. |
| 2006/0265508 A1 | 11/2006 | Angel et al. |
| 2006/0280138 A1 | 12/2006 | Nanda et al. |
| 2006/0285532 A1 | 12/2006 | Radziewicz et al. |
| 2006/0285675 A1 | 12/2006 | Radziewicz et al. |
| 2006/0291404 A1 | 12/2006 | Thubert et al. |
| 2006/0291485 A1 | 12/2006 | Thubert et al. |
| 2006/0291638 A1 | 12/2006 | Radziewicz et al. |
| 2006/0291639 A1 | 12/2006 | Radziewicz et al. |
| 2006/0291864 A1 | 12/2006 | Pavelchek |
| 2007/0003040 A1 | 1/2007 | Radziewicz et al. |
| 2007/0011231 A1 | 1/2007 | Manion et al. |
| 2007/0038743 A1 | 2/2007 | Hellhake et al. |
| 2007/0087756 A1 | 4/2007 | Hoffberg |
| 2007/0087758 A1 | 4/2007 | Norris et al. |
| 2007/0110024 A1 | 5/2007 | Meier |
| 2007/0139163 A1* | 6/2007 | Powell ............ G06K 7/10356 340/10.2 |
| 2007/0150444 A1 | 6/2007 | Chesnais et al. |
| 2007/0150479 A1 | 6/2007 | Issa et al. |
| 2007/0153737 A1 | 7/2007 | Singh et al. |
| 2007/0153764 A1 | 7/2007 | Thubert et al. |
| 2007/0192740 A1 | 8/2007 | Jobling et al. |
| 2007/0214046 A1 | 9/2007 | Falchuk et al. |
| 2007/0217382 A1 | 9/2007 | Minamizawa |
| 2007/0223436 A1 | 9/2007 | Lenardi et al. |
| 2007/0229231 A1 | 10/2007 | Hurwitz et al. |
| 2007/0274270 A1 | 11/2007 | Jones et al. |
| 2007/0274271 A1 | 11/2007 | Jones et al. |
| 2007/0280174 A1 | 12/2007 | Pun |
| 2007/0286097 A1 | 12/2007 | Davies |
| 2007/0287473 A1* | 12/2007 | Dupray ............ H04W 4/029 455/456.1 |
| 2007/0293143 A1 | 12/2007 | Harris |
| 2007/0297808 A1 | 12/2007 | Pavelchek |
| 2008/0010601 A1 | 1/2008 | Dachs |
| 2008/0032738 A1 | 2/2008 | Boyer et al. |
| 2008/0040507 A1 | 2/2008 | Hsu et al. |
| 2008/0051036 A1 | 2/2008 | Vaswani et al. |
| 2008/0051099 A1 | 2/2008 | Moore et al. |
| 2008/0059455 A1 | 3/2008 | Canoy et al. |
| 2008/0072261 A1 | 3/2008 | Ralston et al. |
| 2008/0076385 A1 | 3/2008 | Mayer et al. |
| 2008/0117896 A1 | 5/2008 | Romero et al. |
| 2008/0123609 A1 | 5/2008 | Qi et al. |
| 2008/0126436 A1 | 5/2008 | Thorn |
| 2008/0130640 A1 | 6/2008 | Hurwitz et al. |
| 2008/0147730 A1 | 6/2008 | Lee et al. |
| 2008/0154959 A1 | 6/2008 | Dunko |
| 2008/0155429 A1 | 6/2008 | Frank et al. |
| 2008/0159151 A1 | 7/2008 | Datz et al. |
| 2008/0159358 A1 | 7/2008 | Ruiz et al. |
| 2008/0170551 A1 | 7/2008 | Zaks |
| 2008/0170552 A1 | 7/2008 | Zaks |
| 2008/0181154 A1 | 7/2008 | Sherman |
| 2008/0181155 A1 | 7/2008 | Sherman et al. |
| 2008/0183853 A1 | 7/2008 | Manion et al. |
| 2008/0200165 A1 | 8/2008 | Sharma et al. |
| 2008/0232382 A1* | 9/2008 | Iwama ............ H04L 12/4641 370/401 |

(56) References Cited

U.S. PATENT DOCUMENTS

| | | |
|---|---|---|
| 2008/0240050 A1 | 10/2008 | Pun |
| 2008/0247353 A1 | 10/2008 | Pun |
| 2008/0252485 A1 | 10/2008 | Lagassey |
| 2008/0254751 A1 | 10/2008 | Lazaridis |
| 2008/0254785 A1 | 10/2008 | Lazaridis et al. |
| 2008/0256259 A1 | 10/2008 | Bantz et al. |
| 2008/0262893 A1 | 10/2008 | Hoffberg |
| 2008/0267116 A1 | 10/2008 | Kang et al. |
| 2008/0273487 A1 | 11/2008 | Naghian |
| 2008/0275846 A1 | 11/2008 | Almas |
| 2008/0275865 A1 | 11/2008 | Kretz et al. |
| 2008/0285520 A1 | 11/2008 | Forte et al. |
| 2008/0291843 A1 | 11/2008 | Sonnenberg et al. |
| 2008/0291846 A1 | 11/2008 | Lu |
| 2008/0294655 A1 | 11/2008 | Picault et al. |
| 2008/0307112 A1 | 12/2008 | Andreasson et al. |
| 2008/0310390 A1 | 12/2008 | Pun et al. |
| 2008/0318616 A1 | 12/2008 | Chipalkatti et al. |
| 2009/0005005 A1 | 1/2009 | Forstall et al. |
| 2009/0005167 A1 | 1/2009 | Arrasvuori et al. |
| 2009/0006489 A1 | 1/2009 | Ramasubramanian et al. |
| 2009/0016255 A1 | 1/2009 | Park |
| 2009/0016524 A1 | 1/2009 | Park et al. |
| 2009/0023475 A1 | 1/2009 | Chang et al. |
| 2009/0040985 A1 | 2/2009 | Barnawi et al. |
| 2009/0043789 A1 | 2/2009 | Gupta |
| 2009/0046688 A1 | 2/2009 | Volpi et al. |
| 2009/0061835 A1 | 3/2009 | Schmidt et al. |
| 2009/0062887 A1 | 3/2009 | Mass et al. |
| 2009/0081951 A1 | 3/2009 | Erdmann et al. |
| 2009/0086663 A1 | 4/2009 | Ho et al. |
| 2009/0091425 A1 | 4/2009 | Sharpe |
| 2009/0097490 A1 | 4/2009 | Sanderson et al. |
| 2009/0100050 A1 | 4/2009 | Erol et al. |
| 2009/0109898 A1 | 4/2009 | Adams et al. |
| 2009/0112359 A1 | 4/2009 | Sanguinetti |
| 2009/0132641 A1 | 5/2009 | Sanguinetti et al. |
| 2009/0144341 A1 | 6/2009 | Hauck et al. |
| 2009/0149200 A1 | 6/2009 | Jayasinghe et al. |
| 2009/0154667 A1 | 6/2009 | Hao et al. |
| 2009/0154668 A1 | 6/2009 | Hao et al. |
| 2009/0157595 A1 | 6/2009 | Gubitz |
| 2009/0158423 A1 | 6/2009 | Orlassino et al. |
| 2009/0181653 A1 | 7/2009 | Alharayeri |
| 2009/0185508 A1 | 7/2009 | Duke et al. |
| 2009/0193345 A1 | 7/2009 | Wensley et al. |
| 2009/0210495 A1 | 8/2009 | Wolfson et al. |
| 2009/0215388 A1 | 8/2009 | Karaoguz et al. |
| 2009/0215411 A1 | 8/2009 | Tucker et al. |
| 2009/0219194 A1 | 9/2009 | Menouar et al. |
| 2009/0228575 A1 | 9/2009 | Thubert et al. |
| 2009/0233548 A1 | 9/2009 | Andersson et al. |
| 2009/0248883 A1 | 10/2009 | Suryanarayana et al. |
| 2009/0271409 A1 | 10/2009 | Ghosh |
| 2009/0279680 A1 | 11/2009 | Chavez et al. |
| 2009/0286531 A1 | 11/2009 | Bhatt et al. |
| 2009/0287930 A1 | 11/2009 | Nagaraja |
| 2009/0294538 A1 | 12/2009 | Wihlborg et al. |
| 2009/0299817 A1 | 12/2009 | Fok et al. |
| 2009/0323519 A1 | 12/2009 | Pun |
| 2009/0323655 A1 | 12/2009 | Cardona et al. |
| 2010/0014444 A1 | 1/2010 | Ghanadan et al. |
| 2010/0017045 A1 | 1/2010 | Nesler et al. |
| 2010/0020746 A1 | 1/2010 | Zaks |
| 2010/0029216 A1 | 2/2010 | Jovicic et al. |
| 2010/0046842 A1 | 2/2010 | Conwell |
| 2010/0048242 A1 | 2/2010 | Rhoads et al. |
| 2010/0058440 A1 | 3/2010 | Yiu et al. |
| 2010/0064379 A1 | 3/2010 | Cassett et al. |
| 2010/0070758 A1 | 3/2010 | Low et al. |
| 2010/0076777 A1 | 3/2010 | Paretti et al. |
| 2010/0077484 A1 | 3/2010 | Paretti et al. |
| 2010/0097957 A1 | 4/2010 | Pirzada et al. |
| 2010/0110949 A1 | 5/2010 | Lundsgaard |
| 2010/0123572 A1 | 5/2010 | Thubert et al. |
| 2010/0124196 A1 | 5/2010 | Bonar et al. |
| 2010/0125671 A1 | 5/2010 | Thubert et al. |
| 2010/0137021 A1 | 6/2010 | Sharret et al. |
| 2010/0150322 A1 | 6/2010 | Yin et al. |
| 2010/0151831 A1 | 6/2010 | Hao et al. |
| 2010/0152619 A1 | 6/2010 | Kalpaxis et al. |
| 2010/0153488 A1 | 6/2010 | Mittal et al. |
| 2010/0162284 A1* | 6/2010 | Robbins ............ H04N 7/163 725/10 |
| 2010/0187832 A1 | 7/2010 | Holland et al. |
| 2010/0190503 A1 | 7/2010 | Chiang |
| 2010/0191772 A1 | 7/2010 | Brown et al. |
| 2010/0195665 A1 | 8/2010 | Jackson |
| 2010/0203878 A1 | 8/2010 | Kim et al. |
| 2010/0211637 A1 | 8/2010 | Borzsei et al. |
| 2010/0217794 A1 | 8/2010 | Strandell et al. |
| 2010/0222084 A1 | 9/2010 | Butterfield et al. |
| 2010/0234071 A1 | 9/2010 | Shabtay et al. |
| 2010/0235285 A1 | 9/2010 | Hoffberg |
| 2010/0254309 A1 | 10/2010 | Mankins et al. |
| 2010/0272016 A1* | 10/2010 | Ko .................... H04W 76/12 370/328 |
| 2010/0278324 A1 | 11/2010 | Radziewicz et al. |
| 2010/0279776 A1 | 11/2010 | Hall |
| 2010/0281113 A1 | 11/2010 | Laine et al. |
| 2010/0281156 A1 | 11/2010 | Kies et al. |
| 2010/0287256 A1 | 11/2010 | Neilio |
| 2010/0306057 A1 | 12/2010 | Haumont et al. |
| 2010/0311347 A1 | 12/2010 | Le Thierry D'Ennequin et al. |
| 2010/0317290 A1 | 12/2010 | Bocking et al. |
| 2010/0317420 A1 | 12/2010 | Hoffberg |
| 2010/0323667 A1 | 12/2010 | Oschwald et al. |
| 2010/0325211 A1 | 12/2010 | Ylinen et al. |
| 2010/0329274 A1 | 12/2010 | Romero et al. |
| 2010/0332332 A1 | 12/2010 | Lammintaus et al. |
| 2010/0332507 A1 | 12/2010 | Saadat |
| 2010/0332834 A1 | 12/2010 | Fu et al. |
| 2010/0333019 A1 | 12/2010 | Oschwald et al. |
| 2011/0004513 A1 | 1/2011 | Hoffberg |
| 2011/0034167 A1 | 2/2011 | Ben-Shaul et al. |
| 2011/0034176 A1 | 2/2011 | Lord et al. |
| 2011/0035455 A1 | 2/2011 | Sharma |
| 2011/0047557 A1 | 2/2011 | Koskimies |
| 2011/0054647 A1 | 3/2011 | Chipchase et al. |
| 2011/0055234 A1 | 3/2011 | Miettinen |
| 2011/0061100 A1 | 3/2011 | Mattila et al. |
| 2011/0061108 A1 | 3/2011 | Arrasvuori et al. |
| 2011/0070901 A1 | 3/2011 | Alward |
| 2011/0072378 A1 | 3/2011 | Nurminen et al. |
| 2011/0078461 A1 | 3/2011 | Hellhake et al. |
| 2011/0080853 A1 | 4/2011 | Thubert et al. |
| 2011/0081973 A1 | 4/2011 | Hall |
| 2011/0085530 A1 | 4/2011 | Hellhake et al. |
| 2011/0092230 A1 | 4/2011 | Wenger |
| 2011/0099040 A1 | 4/2011 | Felt et al. |
| 2011/0099153 A1 | 4/2011 | Barraclough et al. |
| 2011/0099189 A1 | 4/2011 | Barraclough et al. |
| 2011/0099490 A1 | 4/2011 | Barraclough et al. |
| 2011/0112895 A1 | 5/2011 | Snyder |
| 2011/0117864 A1 | 5/2011 | Lazaridis |
| 2011/0117880 A1 | 5/2011 | Li et al. |
| 2011/0126185 A1 | 5/2011 | Warts et al. |
| 2011/0130114 A1 | 6/2011 | Boudville |
| 2011/0133924 A1 | 6/2011 | Thubert et al. |
| 2011/0134832 A1 | 6/2011 | Soliman |
| 2011/0136541 A1 | 6/2011 | Chang et al. |
| 2011/0143811 A1 | 6/2011 | Rodriguez |
| 2011/0149935 A1 | 6/2011 | Qi et al. |
| 2011/0151829 A1 | 6/2011 | Velusamy et al. |
| 2011/0151835 A1 | 6/2011 | Velusamy |
| 2011/0154259 A1 | 6/2011 | Kennedy et al. |
| 2011/0158216 A1 | 6/2011 | Zaks |
| 2011/0161285 A1 | 6/2011 | Boldyrev et al. |
| 2011/0161852 A1 | 6/2011 | Vainio et al. |
| 2011/0161883 A1 | 6/2011 | Kennedy et al. |
| 2011/0179272 A1 | 7/2011 | Klos et al. |
| 2011/0182251 A1* | 7/2011 | Madan ............ H04W 72/1226 370/329 |
| 2011/0187511 A1 | 8/2011 | Boldyrev et al. |

(56) References Cited

U.S. PATENT DOCUMENTS

| | | |
|---|---|---|
| 2011/0187527 A1* | 8/2011 | Goodwill .............. G08B 1/08 340/539.13 |
| 2011/0194682 A1 | 8/2011 | Hans et al. |
| 2011/0196868 A1 | 8/2011 | Hans et al. |
| 2011/0202864 A1 | 8/2011 | Hirsch et al. |
| 2011/0202975 A1 | 8/2011 | Maximilien et al. |
| 2011/0204720 A1 | 8/2011 | Ruiz et al. |
| 2011/0208801 A1 | 8/2011 | Thorkelsson et al. |
| 2011/0208814 A1 | 8/2011 | Bostrom et al. |
| 2011/0211534 A1 | 9/2011 | Schmidt et al. |
| 2011/0212717 A1 | 9/2011 | Rhoads et al. |
| 2011/0228696 A1 | 9/2011 | Agarwal et al. |
| 2011/0228788 A1 | 9/2011 | Thubert et al. |
| 2011/0231573 A1 | 9/2011 | Vasseur et al. |
| 2011/0235550 A1 | 9/2011 | Adams et al. |
| 2011/0235792 A1 | 9/2011 | Foster et al. |
| 2011/0235796 A1 | 9/2011 | Radziewicz et al. |
| 2011/0238626 A1 | 9/2011 | Hao et al. |
| 2011/0239142 A1 | 9/2011 | Steeves et al. |
| 2011/0239158 A1 | 9/2011 | Barraclough et al. |
| 2011/0239270 A1 | 9/2011 | Sovio et al. |
| 2011/0243317 A1 | 10/2011 | Radziewicz et al. |
| 2011/0249024 A1 | 10/2011 | Arrasvuori et al. |
| 2011/0249144 A1 | 10/2011 | Chang |
| 2011/0249621 A1 | 10/2011 | Harris et al. |
| 2011/0252320 A1 | 10/2011 | Arrasvuori et al. |
| 2011/0254687 A1 | 10/2011 | Arponen et al. |
| 2011/0267981 A1 | 11/2011 | Davies |
| 2011/0268085 A1* | 11/2011 | Barany .............. H04W 36/0033 370/331 |
| 2011/0273568 A1 | 11/2011 | Lagassey |
| 2011/0279445 A1 | 11/2011 | Murphy et al. |
| 2011/0279453 A1 | 11/2011 | Murphy et al. |
| 2011/0280447 A1 | 11/2011 | Conwell |
| 2011/0289520 A1 | 11/2011 | Grigoriev et al. |
| 2011/0294502 A1 | 12/2011 | Oerton |
| 2011/0307841 A1 | 12/2011 | Boldyrev et al. |
| 2011/0313874 A1 | 12/2011 | Hardie et al. |
| 2011/0314075 A1 | 12/2011 | Boldyrev et al. |
| 2011/0314388 A1 | 12/2011 | Wheatley |
| 2011/0314504 A1 | 12/2011 | Ruiz-Velasco |
| 2011/0320516 A1 | 12/2011 | Boldyrev et al. |
| 2012/0005041 A1 | 1/2012 | Mehta et al. |
| 2012/0005050 A1 | 1/2012 | Boldyrev et al. |
| 2012/0005586 A1 | 1/2012 | Uola et al. |
| 2012/0008526 A1 | 1/2012 | Borghei |
| 2012/0011559 A1 | 1/2012 | Miettinen et al. |
| 2012/0023171 A1 | 1/2012 | Redmond |
| 2012/0023556 A1 | 1/2012 | Schultz et al. |
| 2012/0036132 A1 | 2/2012 | Doyle |
| 2012/0039186 A1 | 2/2012 | Vasseur |
| 2012/0039190 A1 | 2/2012 | Vasseur |
| 2012/0042390 A1 | 2/2012 | Iwuchukwu |
| 2012/0042392 A1 | 2/2012 | Wu |
| 2012/0054355 A1 | 3/2012 | Arrasvuori et al. |
| 2012/0054847 A1 | 3/2012 | Schultz et al. |
| 2012/0062576 A1 | 3/2012 | Rosenthal et al. |
| 2012/0064881 A1 | 3/2012 | Svendsen |
| 2012/0064921 A1 | 3/2012 | Hernoud et al. |
| 2012/0072917 A1 | 3/2012 | Boldyrev et al. |
| 2012/0075338 A1 | 3/2012 | Curtis et al. |
| 2012/0077521 A1 | 3/2012 | Boldyrev et al. |
| 2012/0077546 A1 | 3/2012 | Kawa et al. |
| 2012/0078595 A1 | 3/2012 | Balandin et al. |
| 2012/0078684 A1 | 3/2012 | Maciocci et al. |
| 2012/0078882 A1 | 3/2012 | Boldyrev et al. |
| 2012/0079019 A1 | 3/2012 | Miettinen et al. |
| 2012/0079086 A1 | 3/2012 | Miettinen |
| 2012/0079111 A1 | 3/2012 | Luukkala et al. |
| 2012/0079570 A1 | 3/2012 | Fu et al. |
| 2012/0089698 A1 | 4/2012 | Tseng |
| 2012/0094721 A1 | 4/2012 | Brondmo et al. |
| 2012/0094770 A1 | 4/2012 | Hall |
| 2012/0096523 A1 | 4/2012 | Ollila et al. |
| 2012/0106429 A1 | 5/2012 | Hong et al. |
| 2012/0108326 A1 | 5/2012 | Hall |
| 2012/0110473 A1 | 5/2012 | Tseng |
| 2012/0110642 A1 | 5/2012 | Grassel et al. |
| 2012/0110680 A1 | 5/2012 | Oliver et al. |
| 2012/0111936 A1 | 5/2012 | Brown et al. |
| 2012/0112908 A1 | 5/2012 | Prykari et al. |
| 2012/0113138 A1 | 5/2012 | Uusitalo et al. |
| 2012/0113807 A1 | 5/2012 | Vasseur et al. |
| 2012/0113863 A1 | 5/2012 | Vasseur et al. |
| 2012/0113986 A1 | 5/2012 | Shaffer et al. |
| 2012/0114249 A1 | 5/2012 | Conwell |
| 2012/0116559 A1 | 5/2012 | Davis et al. |
| 2012/0117067 A1 | 5/2012 | Yakubovich et al. |
| 2012/0117208 A1 | 5/2012 | Shaffer et al. |
| 2012/0117213 A1 | 5/2012 | Shaffer et al. |
| 2012/0117232 A1 | 5/2012 | Brown et al. |
| 2012/0117268 A1 | 5/2012 | Shaffer et al. |
| 2012/0117438 A1 | 5/2012 | Shaffer et al. |
| 2012/0117456 A1 | 5/2012 | Koskimies |
| 2012/0122397 A1 | 5/2012 | Brown et al. |
| 2012/0130762 A1 | 5/2012 | Gale et al. |
| 2012/0134548 A1 | 5/2012 | Rhoads et al. |
| 2012/0136804 A1 | 5/2012 | Lucia, Sr. et al. |
| 2012/0137044 A1 | 5/2012 | Boldyrev et al. |
| 2012/0149405 A1 | 6/2012 | Bhat |
| 2012/0149463 A1 | 6/2012 | Jabara et al. |
| 2012/0150955 A1 | 6/2012 | Tseng |
| 2012/0154633 A1 | 6/2012 | Rodriguez |
| 2012/0155260 A1 | 6/2012 | Vasseur et al. |
| 2012/0155276 A1 | 6/2012 | Vasseur et al. |
| 2012/0155284 A1 | 6/2012 | Shaffer et al. |
| 2012/0155329 A1 | 6/2012 | Shaffer et al. |
| 2012/0155397 A1 | 6/2012 | Shaffer et al. |
| 2012/0155463 A1 | 6/2012 | Vasseur et al. |
| 2012/0155475 A1 | 6/2012 | Vasseur et al. |
| 2012/0155511 A1 | 6/2012 | Shaffer et al. |
| 2012/0157210 A1 | 6/2012 | Hall |
| 2012/0158751 A1 | 6/2012 | Tseng |
| 2012/0158933 A1 | 6/2012 | Shetty et al. |
| 2012/0159308 A1 | 6/2012 | Tseng et al. |
| 2012/0165047 A1 | 6/2012 | Dolenc |
| 2012/0166261 A1 | 6/2012 | Velusamy et al. |
| 2012/0166964 A1 | 6/2012 | Tseng |
| 2012/0173980 A1 | 7/2012 | Dachs |
| 2012/0182867 A1 | 7/2012 | Farrag et al. |
| 2012/0185910 A1 | 7/2012 | Miettinen et al. |
| 2012/0188968 A1 | 7/2012 | Mie et al. |
| 2012/0190404 A1 | 7/2012 | Rhoads |
| 2012/0196581 A1 | 8/2012 | Papakipos et al. |
| 2012/0198347 A1 | 8/2012 | Hirvonen et al. |
| 2012/0206319 A1 | 8/2012 | Lucero et al. |
| 2012/0207294 A1 | 8/2012 | Katpelly et al. |
| 2012/0208559 A1 | 8/2012 | Svendsen et al. |
| 2012/0208592 A1 | 8/2012 | Davis et al. |
| 2012/0209910 A1 | 8/2012 | Svendsen et al. |
| 2012/0210233 A1 | 8/2012 | Davis et al. |
| 2012/0210247 A1 | 8/2012 | Khouri et al. |
| 2012/0213124 A1 | 8/2012 | Vasseur et al. |
| 2012/0218296 A1 | 8/2012 | Belimpasakis et al. |
| 2012/0221659 A1 | 8/2012 | Brown et al. |
| 2012/0224743 A1 | 9/2012 | Rodriguez et al. |
| 2012/0230204 A1 | 9/2012 | Vasseur et al. |
| 2012/0230222 A1 | 9/2012 | Shaffer et al. |
| 2012/0230280 A1 | 9/2012 | Chandra et al. |
| 2012/0230370 A1 | 9/2012 | Shaffer et al. |
| 2012/0233326 A1 | 9/2012 | Shaffer et al. |
| 2012/0233485 A1 | 9/2012 | Shaffer et al. |
| 2012/0233565 A1 | 9/2012 | Grant |
| 2012/0242501 A1 | 9/2012 | Tran et al. |
| 2012/0243621 A1 | 9/2012 | Hurwitz et al. |
| 2012/0249298 A1 | 10/2012 | Sovio et al. |
| 2012/0250517 A1 | 10/2012 | Saarimaki et al. |
| 2012/0250950 A1 | 10/2012 | Papakipos et al. |
| 2012/0252493 A1 | 10/2012 | Siddeley et al. |
| 2012/0254338 A1 | 10/2012 | Agarwal et al. |
| 2012/0258726 A1 | 10/2012 | Bansal et al. |
| 2012/0258776 A1 | 10/2012 | Lord et al. |
| 2012/0271957 A1 | 10/2012 | Carney et al. |
| 2012/0272287 A1 | 10/2012 | Kuhlke et al. |

(56) References Cited

U.S. PATENT DOCUMENTS

| | | |
|---|---|---|
| 2012/0275642 A1 | 11/2012 | Aller et al. |
| 2012/0277893 A1 | 11/2012 | Davis et al. |
| 2012/0278216 A1 | 11/2012 | Evans et al. |
| 2012/0278395 A1 | 11/2012 | Garcia |
| 2012/0280908 A1 | 11/2012 | Rhoads et al. |
| 2012/0282905 A1 | 11/2012 | Owen |
| 2012/0282911 A1 | 11/2012 | Davis et al. |
| 2012/0284012 A1 | 11/2012 | Rodriguez et al. |
| 2012/0284122 A1 | 11/2012 | Brandis |
| 2012/0284339 A1 | 11/2012 | Rodriguez |
| 2012/0284593 A1 | 11/2012 | Rodriguez |
| 2012/0287830 A1 | 11/2012 | Lazaridis |
| 2012/0290289 A1 | 11/2012 | Manera et al. |
| 2012/0303452 A1 | 11/2012 | Xue et al. |
| 2012/0303652 A1 | 11/2012 | Tseng |
| 2012/0303702 A1 | 11/2012 | Richter et al. |
| 2012/0304087 A1 | 11/2012 | Walkin et al. |
| 2012/0304265 A1 | 11/2012 | Richter et al. |
| 2012/0307624 A1 | 12/2012 | Vasseur et al. |
| 2012/0307629 A1 | 12/2012 | Vasseur et al. |
| 2012/0307652 A1 | 12/2012 | Vasseur et al. |
| 2012/0307653 A1 | 12/2012 | Vasseur et al. |
| 2012/0307825 A1 | 12/2012 | Hui et al. |
| 2012/0307833 A1* | 12/2012 | Leu ............... H04L 49/351 370/401 |
| 2012/0310922 A1 | 12/2012 | Johnson et al. |
| 2012/0310927 A1 | 12/2012 | Johnson et al. |
| 2012/0310975 A1 | 12/2012 | Oliver et al. |
| 2012/0311033 A1 | 12/2012 | Tseng |
| 2012/0311131 A1 | 12/2012 | Arrasvuori |
| 2012/0311438 A1 | 12/2012 | Cranfill et al. |
| 2012/0311657 A1 | 12/2012 | Boldyrev et al. |
| 2012/0315993 A1 | 12/2012 | Dumont et al. |
| 2012/0317097 A1 | 12/2012 | Tseng |
| 2012/0320768 A1 | 12/2012 | Shaffer et al. |
| 2012/0320790 A1 | 12/2012 | Shaffer et al. |
| 2012/0320923 A1 | 12/2012 | Vasseur et al. |
| 2012/0324273 A1 | 12/2012 | Shaffer et al. |
| 2012/0329384 A1 | 12/2012 | Boldyrev et al. |
| 2012/0329555 A1 | 12/2012 | Jabara et al. |
| 2012/0331050 A1 | 12/2012 | Wilbur et al. |
| 2012/0331091 A1 | 12/2012 | Tseng |
| 2012/0331137 A1 | 12/2012 | Olsen et al. |
| 2013/0005354 A1 | 1/2013 | Sheilendra |
| 2013/0005362 A1 | 1/2013 | Borghei |
| 2013/0010590 A1 | 1/2013 | Vasseur et al. |
| 2013/0010615 A1 | 1/2013 | Hui et al. |
| 2013/0010798 A1 | 1/2013 | Shaffer et al. |
| 2013/0011062 A1 | 1/2013 | Conwell et al. |
| 2013/0012175 A1 | 1/2013 | Butterfield et al. |
| 2013/0013308 A1 | 1/2013 | Cao et al. |
| 2013/0013806 A1 | 1/2013 | Woo et al. |
| 2013/0013809 A1 | 1/2013 | Vasseur et al. |
| 2013/0016612 A1 | 1/2013 | Vasseur et al. |
| 2013/0016757 A1 | 1/2013 | Hui et al. |
| 2013/0016758 A1 | 1/2013 | Hui et al. |
| 2013/0016759 A1 | 1/2013 | Hui et al. |
| 2013/0018993 A1 | 1/2013 | Hui et al. |
| 2013/0019005 A1 | 1/2013 | Hui et al. |
| 2013/0022042 A1 | 1/2013 | Vasseur et al. |
| 2013/0022046 A1 | 1/2013 | Vasseur et al. |
| 2013/0022053 A1 | 1/2013 | Vasseur et al. |
| 2013/0022083 A1 | 1/2013 | Vasseur et al. |
| 2013/0022084 A1 | 1/2013 | Vasseur et al. |
| 2013/0024149 A1 | 1/2013 | Nayar et al. |
| 2013/0024560 A1 | 1/2013 | Vasseur et al. |
| 2013/0028095 A1 | 1/2013 | Vasseur et al. |
| 2013/0028103 A1 | 1/2013 | Hui et al. |
| 2013/0028104 A1 | 1/2013 | Hui et al. |
| 2013/0028140 A1 | 1/2013 | Hui et al. |
| 2013/0028143 A1 | 1/2013 | Vasseur et al. |
| 2013/0028295 A1 | 1/2013 | Hui et al. |
| 2013/0031253 A1 | 1/2013 | Hui et al. |
| 2013/0039433 A1 | 2/2013 | Ralston et al. |
| 2013/0045739 A1 | 2/2013 | Chiang |
| 2013/0045759 A1 | 2/2013 | Smith |
| 2013/0046831 A1 | 2/2013 | Schultz et al. |
| 2013/0047146 A1 | 2/2013 | Ugur et al. |
| 2013/0051250 A1 | 2/2013 | Shaffer et al. |
| 2013/0055072 A1 | 2/2013 | Arnold et al. |
| 2013/0055099 A1 | 2/2013 | Yao et al. |
| 2013/0055383 A1 | 2/2013 | Shaffer et al. |
| 2013/0063613 A1 | 3/2013 | Conwell |
| 2013/0064072 A1 | 3/2013 | Vasseur et al. |
| 2013/0066853 A1 | 3/2013 | Andersson et al. |
| 2013/0067022 A1 | 3/2013 | Andersson et al. |
| 2013/0067063 A1 | 3/2013 | Vasseur et al. |
| 2013/0067208 A1 | 3/2013 | Brinkman et al. |
| 2013/0067417 A1 | 3/2013 | Andersson et al. |
| 2013/0069780 A1 | 3/2013 | Tran et al. |
| 2013/0079152 A1 | 3/2013 | Hall |
| 2013/0080307 A1 | 3/2013 | Hoffberg |
| 2013/0083658 A1 | 4/2013 | Vasseur et al. |
| 2013/0086601 A1 | 4/2013 | Adimatyam et al. |
| 2013/0088999 A1 | 4/2013 | Thubert et al. |
| 2013/0089011 A1 | 4/2013 | Alapuranen |
| 2013/0094536 A1 | 4/2013 | Hui et al. |
| 2013/0094537 A1 | 4/2013 | Hui et al. |
| 2013/0097303 A1 | 4/2013 | Gichana et al. |
| 2013/0097517 A1 | 4/2013 | Reiss et al. |
| 2013/0101219 A1 | 4/2013 | Bosworth et al. |
| 2013/0103765 A1 | 4/2013 | Papakipos et al. |
| 2013/0104080 A1 | 4/2013 | Bosworth et al. |
| 2013/0104221 A1 | 4/2013 | Low et al. |
| 2013/0109361 A1 | 5/2013 | Felt |
| 2013/0110609 A1 | 5/2013 | Lee et al. |
| 2013/0110642 A1 | 5/2013 | Lee et al. |
| 2013/0111038 A1 | 5/2013 | Girard |
| 2013/0115928 A1 | 5/2013 | Kies et al. |
| 2013/0117365 A1 | 5/2013 | Padmanabhan et al. |
| 2013/0117692 A1 | 5/2013 | Padmanabhan et al. |
| 2013/0121331 A1 | 5/2013 | Vasseur et al. |
| 2013/0122807 A1 | 5/2013 | Tenarvitz et al. |
| 2013/0124463 A1 | 5/2013 | Lee et al. |
| 2013/0124883 A1 | 5/2013 | Addepalli et al. |
| 2013/0125016 A1 | 5/2013 | Pallakoff et al. |
| 2013/0128773 A1 | 5/2013 | Thubert et al. |
| 2013/0130625 A1 | 5/2013 | Bucking et al. |
| 2013/0132489 A1 | 5/2013 | Huang et al. |
| 2013/0136089 A1 | 5/2013 | Gillett et al. |
| 2013/0136245 A1 | 5/2013 | Reyes et al. |
| 2013/0138693 A1 | 5/2013 | Sathish et al. |
| 2013/0151515 A1 | 6/2013 | Davis et al. |
| 2013/0151563 A1 | 6/2013 | Addepalli et al. |
| 2013/0151608 A1 | 6/2013 | Wiseman et al. |
| 2013/0151943 A1 | 6/2013 | Zhu et al. |
| 2013/0160138 A1 | 6/2013 | Schultz et al. |
| 2013/0165234 A1 | 6/2013 | Hall et al. |
| 2013/0166555 A1 | 6/2013 | Pfaff |
| 2013/0169838 A1 | 7/2013 | Rodriguez et al. |
| 2013/0177025 A1 | 7/2013 | Hurwitz et al. |
| 2013/0178718 A1 | 7/2013 | Tran et al. |
| 2013/0183952 A1 | 7/2013 | Davis et al. |
| 2013/0185285 A1 | 7/2013 | Shuman et al. |
| 2013/0185359 A1 | 7/2013 | Liu et al. |
| 2013/0185804 A1 | 7/2013 | Biswas et al. |
| 2013/0188471 A1 | 7/2013 | Bade et al. |
| 2013/0188513 A1 | 7/2013 | Vasseur et al. |
| 2013/0191688 A1 | 7/2013 | Agarwal et al. |
| 2013/0198811 A1 | 8/2013 | Yu et al. |
| 2013/0201891 A1 | 8/2013 | Rodriguez et al. |
| 2013/0215739 A1 | 8/2013 | Zhang |
| 2013/0215942 A1 | 8/2013 | Addepalli et al. |
| 2013/0217440 A1 | 8/2013 | Lord et al. |
| 2013/0218729 A1 | 8/2013 | Cranfill et al. |
| 2013/0218974 A1 | 8/2013 | Cao et al. |
| 2013/0219045 A1 | 8/2013 | Agarwal et al. |
| 2013/0219046 A1 | 8/2013 | Wetterwald et al. |
| 2013/0219269 A1 | 8/2013 | Cranfill et al. |
| 2013/0219270 A1 | 8/2013 | Cranfill et al. |
| 2013/0219321 A1 | 8/2013 | Cranfill et al. |
| 2013/0219322 A1 | 8/2013 | Cranfill et al. |
| 2013/0219465 A1* | 8/2013 | Tse ............... H04L 63/10 726/3 |

(56) References Cited

U.S. PATENT DOCUMENTS

| | | |
|---|---|---|
| 2013/0219478 A1 | 8/2013 | Mahamuni et al. |
| 2013/0222369 A1 | 8/2013 | Huston et al. |
| 2013/0223218 A1 | 8/2013 | Vasseur et al. |
| 2013/0223225 A1 | 8/2013 | Hui et al. |
| 2013/0223229 A1 | 8/2013 | Hui et al. |
| 2013/0223237 A1 | 8/2013 | Hui et al. |
| 2013/0223275 A1 | 8/2013 | Vasseur et al. |
| 2013/0227055 A1 | 8/2013 | Vasseur et al. |
| 2013/0227114 A1 | 8/2013 | Vasseur et al. |
| 2013/0227336 A1 | 8/2013 | Agarwal et al. |
| 2013/0227603 A1 | 8/2013 | Bosworth et al. |
| 2013/0229996 A1* | 9/2013 | Wang ............... H04W 72/0413 370/329 |
| 2013/0231179 A1 | 9/2013 | Sproule et al. |
| 2013/0232409 A1 | 9/2013 | Cranfill et al. |
| 2013/0238540 A1 | 9/2013 | O'Donoghue et al. |
| 2013/0238650 A1 | 9/2013 | Ghosh |
| 2013/0238685 A1 | 9/2013 | Aziz |
| 2013/0238686 A1 | 9/2013 | O'Donoghue et al. |
| 2013/0238697 A1 | 9/2013 | Mehta et al. |
| 2013/0238700 A1 | 9/2013 | Papakipos et al. |
| 2013/0246218 A1 | 9/2013 | Gopalan |
| 2013/0246595 A1 | 9/2013 | O'Donoghue et al. |
| 2013/0250754 A1 | 9/2013 | Vasseur et al. |
| 2013/0250808 A1 | 9/2013 | Hui et al. |
| 2013/0250809 A1 | 9/2013 | Hui et al. |
| 2013/0250811 A1 | 9/2013 | Vasseur et al. |
| 2013/0250866 A1 | 9/2013 | Hui et al. |
| 2013/0250945 A1 | 9/2013 | Hui et al. |
| 2013/0250953 A1 | 9/2013 | Hui et al. |
| 2013/0250969 A1 | 9/2013 | Hui et al. |
| 2013/0251053 A1 | 9/2013 | Hui et al. |
| 2013/0251054 A1 | 9/2013 | Hui et al. |
| 2013/0254529 A1 | 9/2013 | Fu et al. |
| 2013/0254831 A1 | 9/2013 | Roach et al. |
| 2013/0254900 A1 | 9/2013 | Sathish et al. |
| 2013/0259096 A1 | 10/2013 | Romero et al. |
| 2013/0263016 A1 | 10/2013 | Lehtiniemi et al. |
| 2013/0263032 A1 | 10/2013 | Vainio et al. |
| 2013/0267251 A1 | 10/2013 | Khorashadi et al. |
| 2013/0273968 A1 | 10/2013 | Rhoads et al. |
| 2013/0273976 A1 | 10/2013 | Rao et al. |
| 2013/0275513 A1 | 10/2013 | Borovyk et al. |
| 2013/0278957 A1 | 10/2013 | Gubitz et al. |
| 2013/0279365 A1 | 10/2013 | Hui et al. |
| 2013/0279540 A1 | 10/2013 | Hui et al. |
| 2013/0282930 A1 | 10/2013 | Gubitz et al. |
| 2013/0283347 A1 | 10/2013 | Hui et al. |
| 2013/0283360 A1 | 10/2013 | Hui et al. |
| 2013/0286942 A1 | 10/2013 | Bonar et al. |
| 2013/0287183 A1 | 10/2013 | Ren |
| 2013/0288722 A1 | 10/2013 | Ramanujam et al. |
| 2013/0290560 A1 | 10/2013 | Chaki |
| 2013/0293440 A1 | 11/2013 | Qi et al. |
| 2013/0295894 A1 | 11/2013 | Rhoads et al. |
| 2013/0297690 A1 | 11/2013 | Lucero et al. |
| 2013/0304700 A1 | 11/2013 | Nicklin |
| 2013/0308495 A1 | 11/2013 | Tucker et al. |
| 2013/0310896 A1 | 11/2013 | Mass |
| 2013/0311947 A1 | 11/2013 | Tsai et al. |
| 2013/0314448 A1 | 11/2013 | Toksvig et al. |
| 2013/0315131 A1 | 11/2013 | Brown et al. |
| 2013/0332321 A1 | 12/2013 | Sanguinetti |
| 2013/0336156 A1* | 12/2013 | Wei ..................... H04L 5/001 370/252 |
| 2013/0336316 A1 | 12/2013 | Sudhaakar et al. |
| 2013/0344963 A1 | 12/2013 | Gupta et al. |
| 2013/0346208 A1 | 12/2013 | Bouret et al. |
| 2014/0006411 A1 | 1/2014 | Boldyrev et al. |
| 2014/0006616 A1 | 1/2014 | Aad et al. |
| 2014/0006893 A1 | 1/2014 | Shetty et al. |
| 2014/0012918 A1 | 1/2014 | Chin et al. |
| 2014/0016643 A1 | 1/2014 | Vasseur et al. |
| 2014/0022906 A1 | 1/2014 | Vasseur et al. |
| 2014/0028562 A1 | 1/2014 | St. Clair |
| 2014/0028568 A1 | 1/2014 | St. Clair |
| 2014/0028571 A1 | 1/2014 | St. Clair |
| 2014/0028572 A1 | 1/2014 | St. Clair |
| 2014/0029432 A1 | 1/2014 | Vasseur et al. |
| 2014/0029445 A1 | 1/2014 | Hui et al. |
| 2014/0029603 A1 | 1/2014 | Nomura et al. |
| 2014/0029610 A1 | 1/2014 | Vasseur et al. |
| 2014/0029624 A1 | 1/2014 | Vasseur |
| 2014/0032563 A1 | 1/2014 | Lassen et al. |
| 2014/0032587 A1 | 1/2014 | Sankar et al. |
| 2014/0033136 A1 | 1/2014 | St. Clair |
| 2014/0036912 A1 | 2/2014 | Hui et al. |
| 2014/0036925 A1 | 2/2014 | Hui et al. |
| 2014/0038511 A1 | 2/2014 | Hall |
| 2014/0044007 A1 | 2/2014 | Smadi |
| 2014/0055284 A1 | 2/2014 | Tran et al. |
| 2014/0057679 A1 | 2/2014 | Berionne et al. |
| 2014/0059124 A1 | 2/2014 | Song et al. |
| 2014/0064172 A1 | 3/2014 | Hui et al. |
| 2014/0067931 A1 | 3/2014 | Hank et al. |
| 2014/0068105 A1 | 3/2014 | Thubert et al. |
| 2014/0075003 A1 | 3/2014 | Tanaka et al. |
| 2014/0079043 A1 | 3/2014 | Montemurro et al. |
| 2014/0080428 A1 | 3/2014 | Rhoads et al. |
| 2014/0081793 A1 | 3/2014 | Hoffberg |
| 2014/0089313 A1 | 3/2014 | Brown et al. |
| 2014/0091139 A1 | 4/2014 | Brown et al. |
| 2014/0092752 A1 | 4/2014 | Hui et al. |
| 2014/0092753 A1 | 4/2014 | Vasseur et al. |
| 2014/0092769 A1 | 4/2014 | Shaffer et al. |
| 2014/0092905 A1 | 4/2014 | Hui et al. |
| 2014/0095580 A1 | 4/2014 | Sartini et al. |
| 2014/0095864 A1 | 4/2014 | Dasgupta et al. |
| 2014/0096261 A1 | 4/2014 | Boldyrev et al. |
| 2014/0098686 A1 | 4/2014 | Panta et al. |
| 2014/0101275 A1 | 4/2014 | Garcia |
| 2014/0105015 A1 | 4/2014 | Hui et al. |
| 2014/0105027 A1 | 4/2014 | Shaffer et al. |
| 2014/0105033 A1 | 4/2014 | Vasseur et al. |
| 2014/0105211 A1 | 4/2014 | Hui et al. |
| 2014/0108553 A1 | 4/2014 | Bostrom et al. |
| 2014/0108643 A1 | 4/2014 | Hui et al. |
| 2014/0109172 A1* | 4/2014 | Barton ............... H04L 63/0807 726/1 |
| 2014/0113561 A1 | 4/2014 | Maguire |
| 2014/0114554 A1 | 4/2014 | Lagassey |
| 2014/0114555 A1 | 4/2014 | Lagassey |
| 2014/0115170 A1 | 4/2014 | Yang et al. |
| 2014/0115653 A1 | 4/2014 | Ryerson |
| 2014/0121476 A1 | 5/2014 | Tran et al. |
| 2014/0122673 A1 | 5/2014 | Shaffer et al. |
| 2014/0126348 A1 | 5/2014 | Mahamuni et al. |
| 2014/0126354 A1 | 5/2014 | Hui et al. |
| 2014/0126423 A1 | 5/2014 | Vasseur et al. |
| 2014/0126426 A1 | 5/2014 | Vasseur et al. |
| 2014/0126431 A1 | 5/2014 | Hui et al. |
| 2014/0126610 A1 | 5/2014 | Hui et al. |
| 2014/0129734 A1 | 5/2014 | Vasseur et al. |
| 2014/0129876 A1 | 5/2014 | Addepalli et al. |
| 2014/0136615 A1 | 5/2014 | Li |
| 2014/0136735 A1 | 5/2014 | Polehn |
| 2014/0136881 A1 | 5/2014 | Vasseur et al. |
| 2014/0137197 A1 | 5/2014 | Lazaridis et al. |
| 2014/0137264 A1 | 5/2014 | Bilogrevic et al. |
| 2014/0141750 A1 | 5/2014 | Lazaridis et al. |
| 2014/0148132 A1 | 5/2014 | Pelttari et al. |
| 2014/0161006 A1 | 6/2014 | Hall |
| 2014/0169686 A1 | 6/2014 | Conwell et al. |
| 2014/0171129 A1 | 6/2014 | Benzatti et al. |
| 2014/0179295 A1 | 6/2014 | Luebbers et al. |
| 2014/0180983 A1 | 6/2014 | Deng et al. |
| 2014/0181209 A1 | 6/2014 | Tseng |
| 2014/0181886 A1 | 6/2014 | Goodman et al. |
| 2014/0185457 A1 | 7/2014 | Barnes et al. |
| 2014/0187145 A1 | 7/2014 | Barnes et al. |
| 2014/0187161 A1 | 7/2014 | Barnes et al. |
| 2014/0187279 A1 | 7/2014 | Barnes et al. |
| 2014/0188878 A1 | 7/2014 | Issa et al. |
| 2014/0189532 A1 | 7/2014 | Sivaraman et al. |

(56) References Cited

U.S. PATENT DOCUMENTS

| | | |
|---|---|---|
| 2014/0189846 A1 | 7/2014 | Barnes et al. |
| 2014/0193087 A1 | 7/2014 | Conwell |
| 2014/0195668 A1 | 7/2014 | Selvakumar et al. |
| 2014/0207794 A1 | 7/2014 | Du et al. |
| 2014/0214931 A1 | 7/2014 | Sidhu et al. |
| 2014/0219078 A1 | 8/2014 | Dasgupta et al. |
| 2014/0219103 A1 | 8/2014 | Vasseur et al. |
| 2014/0219114 A1 | 8/2014 | Vasseur et al. |
| 2014/0219133 A1 | 8/2014 | Dasgupta et al. |
| 2014/0219566 A1 | 8/2014 | Rodriguez et al. |
| 2014/0222725 A1 | 8/2014 | Vasseur et al. |
| 2014/0222726 A1 | 8/2014 | Mermoud et al. |
| 2014/0222727 A1 | 8/2014 | Vasseur et al. |
| 2014/0222728 A1 | 8/2014 | Vasseur et al. |
| 2014/0222729 A1 | 8/2014 | Dasgupta et al. |
| 2014/0222730 A1 | 8/2014 | Vasseur et al. |
| 2014/0222731 A1 | 8/2014 | Mermoud et al. |
| 2014/0222748 A1 | 8/2014 | Mermoud et al. |
| 2014/0222975 A1 | 8/2014 | Vasseur et al. |
| 2014/0222983 A1 | 8/2014 | Dasgupta et al. |
| 2014/0222996 A1 | 8/2014 | Vasseur et al. |
| 2014/0222997 A1 | 8/2014 | Mermoud et al. |
| 2014/0222998 A1 | 8/2014 | Vasseur et al. |
| 2014/0223155 A1 | 8/2014 | Vasseur et al. |
| 2014/0237015 A1 | 8/2014 | Bruins et al. |
| 2014/0245055 A1 | 8/2014 | Shaffer et al. |
| 2014/0247726 A1 | 9/2014 | Vasseur |
| 2014/0247804 A1 | 9/2014 | Wermuth et al. |
| 2014/0248959 A1 | 9/2014 | Jabara et al. |
| 2014/0250184 A1 | 9/2014 | Brown et al. |
| 2014/0254462 A1 | 9/2014 | Forte et al. |
| 2014/0254540 A1 | 9/2014 | Kim et al. |
| 2014/0258401 A1 | 9/2014 | Tseng |
| 2014/0258405 A1 | 9/2014 | Perkin |
| 2014/0267441 A1 | 9/2014 | Matas et al. |
| 2014/0269402 A1 | 9/2014 | Vasseur et al. |
| 2014/0269413 A1 | 9/2014 | Hui et al. |
| 2014/0269441 A1 | 9/2014 | Hyde et al. |
| 2014/0269442 A1 | 9/2014 | Hyde et al. |
| 2014/0269443 A1 | 9/2014 | Hyde et al. |
| 2014/0269592 A1 | 9/2014 | Addepalli et al. |
| 2014/0269759 A1 | 9/2014 | Thubert et al. |
| 2014/0273920 A1 | 9/2014 | Smith |
| 2014/0273924 A1 | 9/2014 | Hyde et al. |
| 2014/0273934 A1 | 9/2014 | Hyde et al. |
| 2014/0273935 A1 | 9/2014 | Hyde et al. |
| 2014/0273937 A1 | 9/2014 | Hyde et al. |
| 2014/0273939 A1 | 9/2014 | Hyde et al. |
| 2014/0273940 A1 | 9/2014 | Hyde et al. |
| 2014/0273947 A1 | 9/2014 | Hyde et al. |
| 2014/0274056 A1 | 9/2014 | Hyde et al. |
| 2014/0274078 A1 | 9/2014 | Hyde et al. |
| 2014/0274179 A1 | 9/2014 | Zhu et al. |
| 2014/0280941 A1 | 9/2014 | Maguire |
| 2014/0281670 A1 | 9/2014 | Vasseur et al. |
| 2014/0286377 A1 | 9/2014 | Shaffer et al. |
| 2014/0293928 A1 | 10/2014 | Boldyrev et al. |
| 2014/0294164 A1 | 10/2014 | Hao et al. |
| 2014/0295830 A1 | 10/2014 | Oerton |
| 2014/0297206 A1 | 10/2014 | Silverman |
| 2014/0298217 A1 | 10/2014 | Lehtiniemi et al. |
| 2014/0302774 A1 | 10/2014 | Burke et al. |
| 2014/0303807 A1 | 10/2014 | Addepalli et al. |
| 2014/0304085 A1 | 10/2014 | Liu et al. |
| 2014/0304427 A1 | 10/2014 | Vasseur et al. |
| 2014/0307614 A1 | 10/2014 | Ruiz et al. |
| 2014/0309804 A1 | 10/2014 | Ricci |
| 2014/0309865 A1 | 10/2014 | Ricci |
| 2014/0309866 A1 | 10/2014 | Ricci |
| 2014/0309867 A1 | 10/2014 | Ricci |
| 2014/0310277 A1 | 10/2014 | Ricci |
| 2014/0310349 A1 | 10/2014 | Rainisto |
| 2014/0314096 A1 | 10/2014 | Hui et al. |
| 2014/0317007 A1 | 10/2014 | Sanguinetti |
| 2014/0320021 A1 | 10/2014 | Conwell |
| 2014/0323226 A1 | 10/2014 | Agrawal |
| 2014/0324596 A1 | 10/2014 | Rodriguez |
| 2014/0324833 A1 | 10/2014 | Davis et al. |
| 2014/0328346 A1 | 11/2014 | Hui et al. |
| 2014/0330947 A1 | 11/2014 | Hui et al. |
| 2014/0335952 A1 | 11/2014 | Hall |
| 2014/0337173 A1 | 11/2014 | Hardie et al. |
| 2014/0337590 A1 | 11/2014 | Lemus et al. |
| 2014/0344674 A1 | 11/2014 | Zhu et al. |
| 2014/0351717 A1 | 11/2014 | Pryor et al. |
| 2014/0355425 A1 | 12/2014 | Vasseur et al. |
| 2014/0357295 A1 | 12/2014 | Skomra et al. |
| 2014/0357312 A1 | 12/2014 | Davis et al. |
| 2014/0359143 A1 | 12/2014 | Luukkala et al. |
| 2014/0369550 A1 | 12/2014 | Davis et al. |
| 2014/0372577 A1 | 12/2014 | Hui et al. |
| 2014/0372585 A1 | 12/2014 | Hui et al. |
| 2014/0376361 A1 | 12/2014 | Hui et al. |
| 2014/0376427 A1 | 12/2014 | Hui et al. |
| 2014/0379813 A1 | 12/2014 | Charania et al. |
| 2014/0379896 A1 | 12/2014 | Vasseur et al. |
| 2014/0379900 A1 | 12/2014 | Dasgupta et al. |
| 2014/0380420 A1 | 12/2014 | Wang et al. |
| 2015/0002336 A1 | 1/2015 | Thubert et al. |
| 2015/0003251 A1 | 1/2015 | Shaffer et al. |
| 2015/0003428 A1 | 1/2015 | Woo et al. |
| 2015/0005010 A1 | 1/2015 | Zhang et al. |
| 2015/0011194 A1 | 1/2015 | Rodriguez |
| 2015/0012501 A1 | 1/2015 | Xing et al. |
| 2015/0016688 A1 | 1/2015 | Aller |
| 2015/0019360 A1 | 1/2015 | Sanguinetti |
| 2015/0019483 A1 | 1/2015 | Tseng |
| 2015/0022675 A1 | 1/2015 | Lord et al. |
| 2015/0023174 A1 | 1/2015 | Dasgupta et al. |
| 2015/0023363 A1 | 1/2015 | Hui et al. |
| 2015/0023369 A1 | 1/2015 | Hui et al. |
| 2015/0026268 A1 | 1/2015 | Hui et al. |
| 2015/0030033 A1 | 1/2015 | Vasseur et al. |
| 2015/0033330 A1 | 1/2015 | Counterman |
| 2015/0036514 A1 | 2/2015 | Zhu et al. |
| 2015/0039441 A1 | 2/2015 | Bouret et al. |
| 2015/0043384 A1 | 2/2015 | Hui et al. |
| 2015/0043519 A1 | 2/2015 | Hui et al. |
| 2015/0046554 A1 | 2/2015 | Papakipos et al. |
| 2015/0046838 A1 | 2/2015 | Sano et al. |
| 2015/0050891 A1 | 2/2015 | Chiang |
| 2015/0055650 A1 | 2/2015 | Bhat et al. |
| 2015/0058226 A1* | 2/2015 | Gupta .................. G06Q 20/367 705/67 |
| 2015/0058424 A1 | 2/2015 | Tseng |
| 2015/0062178 A1 | 3/2015 | Matas et al. |
| 2015/0062179 A1 | 3/2015 | Matas et al. |
| 2015/0063365 A1 | 3/2015 | Hui et al. |
| 2015/0066962 A1 | 3/2015 | Cortes |
| 2015/0071295 A1 | 3/2015 | Hui et al. |
| 2015/0072728 A1 | 3/2015 | Rodriguez et al. |
| 2015/0074091 A1 | 3/2015 | Walkin et al. |
| 2015/0074802 A1 | 3/2015 | Sanjeev et al. |
| 2015/0078296 A1 | 3/2015 | Son et al. |
| 2015/0094118 A1 | 4/2015 | Rodolico |
| 2015/0095014 A1 | 4/2015 | Marimuthu |
| 2015/0099550 A1 | 4/2015 | Alharayeri |
| 2015/0106312 A1 | 4/2015 | Chen et al. |
| 2015/0113094 A1 | 4/2015 | Williams et al. |
| 2015/0118995 A1 | 4/2015 | Aksu et al. |
| 2015/0119002 A1 | 4/2015 | Chen et al. |
| 2015/0120499 A1 | 4/2015 | Lawrenson et al. |
| 2015/0124961 A1 | 5/2015 | Lambert et al. |
| 2015/0128205 A1 | 5/2015 | Mahaffey et al. |
| 2015/0130869 A1 | 5/2015 | Toksvig et al. |
| 2015/0131536 A1* | 5/2015 | Kaur ................ H04L 5/001 370/329 |
| 2015/0134481 A1 | 5/2015 | Glickfield et al. |
| 2015/0138230 A1 | 5/2015 | Uusitalo et al. |
| 2015/0141066 A1 | 5/2015 | Ramanujam et al. |
| 2015/0142790 A1 | 5/2015 | Sankar et al. |
| 2015/0148104 A1* | 5/2015 | Friedl .................. G06Q 20/145 455/561 |
| 2015/0149927 A1 | 5/2015 | Walkin et al. |

(56) References Cited

U.S. PATENT DOCUMENTS

| | | |
|---|---|---|
| 2015/0149930 A1 | 5/2015 | Walkin et al. |
| 2015/0154156 A1 | 6/2015 | Meyers, Jr. et al. |
| 2015/0154239 A1 | 6/2015 | Boldyrev et al. |
| 2015/0154357 A1 | 6/2015 | Biswas et al. |
| 2015/0156171 A1 | 6/2015 | Biswas et al. |
| 2015/0163187 A1 | 6/2015 | Nasir et al. |
| 2015/0172404 A1 | 6/2015 | Sathish |
| 2015/0199547 A1 | 7/2015 | Fraccaroli |
| 2015/0200904 A1 | 7/2015 | Khanna et al. |
| 2015/0207912 A1 | 7/2015 | Gulliksson et al. |
| 2015/0208304 A1 | 7/2015 | Forte et al. |
| 2015/0212990 A1 | 7/2015 | Tseng et al. |
| 2015/0215263 A1 | 7/2015 | Wiseman et al. |
| 2015/0215387 A1 | 7/2015 | Sidhu et al. |
| 2015/0222499 A1 | 8/2015 | Son et al. |
| 2015/0230078 A1 | 8/2015 | Kandangath et al. |
| 2015/0234593 A1 | 8/2015 | St. Clair |
| 2015/0248416 A1 | 9/2015 | Johnson et al. |
| 2015/0256569 A1 | 9/2015 | Sathish et al. |
| 2015/0264626 A1 | 9/2015 | Perdomo |
| 2015/0264627 A1 | 9/2015 | Perdomo |
| 2015/0269361 A1 | 9/2015 | Grassel et al. |
| 2015/0281910 A1* | 10/2015 | Choudhury ............ G01S 5/021 455/456.1 |
| 2015/0283463 A1 | 10/2015 | Marat et al. |
| 2015/0287241 A1 | 10/2015 | Huston et al. |
| 2015/0287246 A1 | 10/2015 | Huston et al. |
| 2015/0301729 A1 | 10/2015 | Wang et al. |
| 2015/0301903 A1 | 10/2015 | Mutha et al. |
| 2015/0304123 A1 | 10/2015 | Hall |
| 2015/0304797 A1 | 10/2015 | Rhoads et al. |
| 2015/0310339 A1 | 10/2015 | Deng et al. |
| 2015/0312731 A1 | 10/2015 | Bendi et al. |
| 2015/0317409 A1 | 11/2015 | Lassen et al. |
| 2015/0341290 A1 | 11/2015 | Cherifi et al. |
| 2015/0346993 A1 | 12/2015 | Suryanarayana et al. |
| 2015/0347086 A1 | 12/2015 | Liedholm et al. |
| 2015/0347116 A1 | 12/2015 | Ugur et al. |
| 2015/0348078 A1 | 12/2015 | Alsina et al. |
| 2015/0356030 A1 | 12/2015 | Zahand et al. |
| 2015/0358525 A1 | 12/2015 | Lord |
| 2015/0379130 A1 | 12/2015 | Harik et al. |
| 2015/0379602 A1 | 12/2015 | Gupta et al. |
| 2015/0381750 A1 | 12/2015 | Tseng |
| 2015/0382167 A1 | 12/2015 | Padmanabhan et al. |

\* cited by examiner

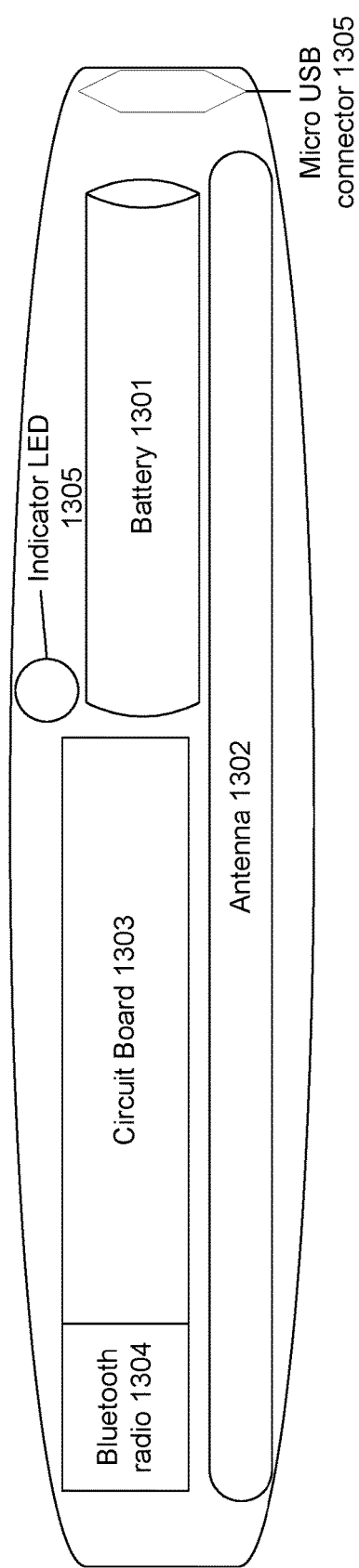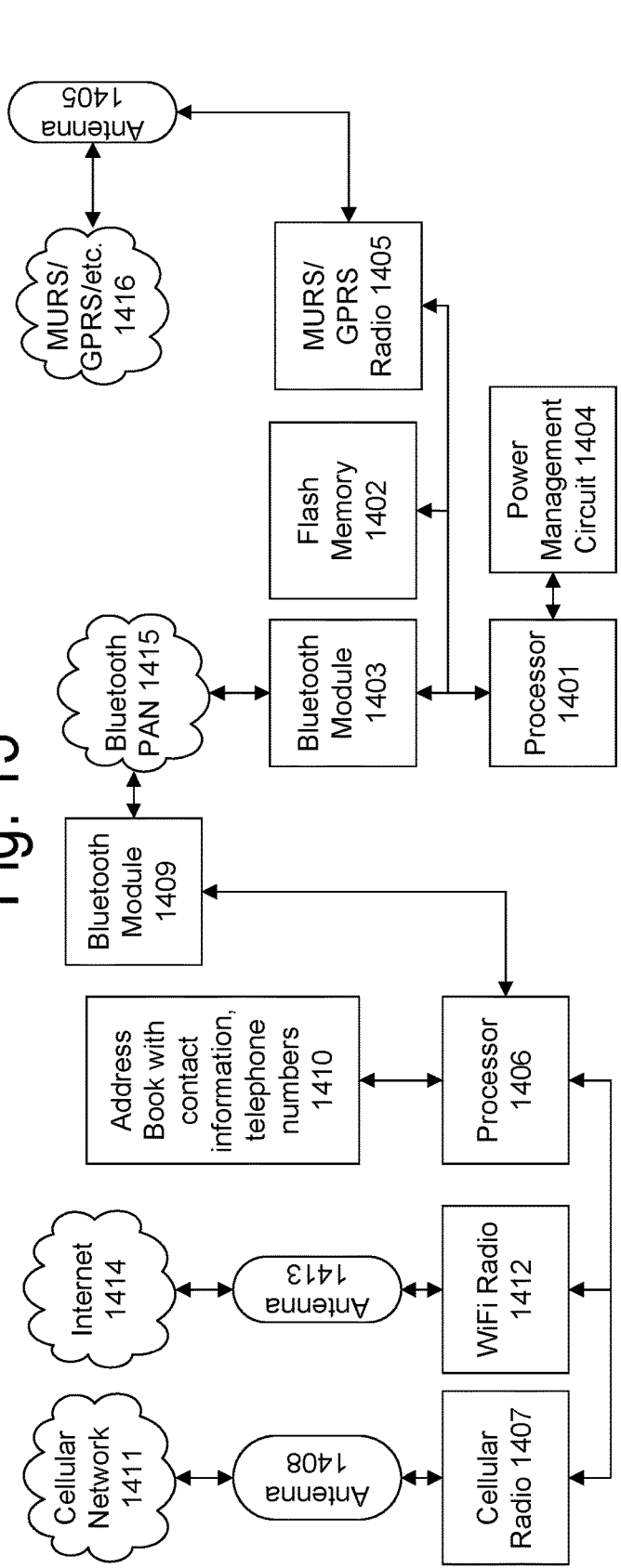

Provide at least one automated processor, operating according to updatable firmware, a reprogrammable memory configured to persistently store firmware, and a communication port configured to receive first digital data and transmission targeting information in a first mode of operation, to transmit second digital data in a second mode of operation, and to receive a firmware update in a third mode of operation, through a communication link adapted to communicate with an automated programmable device    1601

Provide a digital radio frequency communication system configured to wirelessly transmit messages comprising the first digital data addressed based on the targeting information in the first mode of operation    1602 control the communication port to:
receive the first digital data and targeting information in the first mode of operation;
transmit the second digital data in a second mode of operation;
receive the firmware update in the third mode of operation;    1603 control the digital radio frequency communication system (transmit mode) to:
(I)    communicate according to a communication protocol defined by the firmware stored in the reprogrammable memory,
(II)    to transmit information over a shared control channel to establish a first communication session, and
(III)    to transmit the first digital data addressed based on the targeting information over a first data communication channel distinct from the shared control channel, to transmit the first digital data    1605 control the digital radio frequency communication system (receive mode) to:
(I)    communicate according to the communication protocol defined by the firmware stored in the reprogrammable memory,
(II)    receive information over the shared control channel, to establish a second communication session,
(III)    receive the second digital data over a second data communication channel distinct from the shared control channel, wherein the first and second data communication channels may be the same or different, and
(IV)    persistently store a plurality of received second data in the reprogrammable memory    1606

Communication Device

Fig. 16A

Automated
Programmable Device

SYSTEM AND METHOD FOR DIGITAL COMMUNICATION BETWEEN COMPUTING DEVICES

CROSS REFERENCE TO RELATED APPLICATION

The present application is a Continuation of U.S. patent application Ser. No. 14/659,067, filed Mar. 16, 2015, now U.S. Pat. No. 9,756,549, issued Sep. 5, 2017, and U.S. patent application Ser. No. 14/659,151, filed Mar. 16, 2015, now pending, which are each a non-provisional of, and claims benefit of priority under 35 U.S.C. § 119(e) to U.S. Provisional Patent Application No. 61/952,999, filed Mar. 14, 2014, the entirety of which are expressly incorporated herein by reference.

FIELD OF THE INVENTION

The present disclosure is related to systems and methods for communication between computing devices. More particularly, the present disclosure is directed to automatic data communications through narrowband channels especially as an alternate to cellular infrastructure or communications in the 900 MHz, 2.4 GHz or 5.8 GHz Industrial Scientific and Medical bands.

BACKGROUND OF THE INVENTION

People are dependent on Internet-connected computers and mobile phones, which in turn are reliant on central infrastructure in the form of the internet (e.g., domain name servers) and cell towers, respectively to operate. If any kind of scenario arises where that central infrastructure is unavailable or suffering degraded performance, the computers and mobile phones are not able to communicate with other computers and mobile phones.

Smartphones integrate a broad range of communication functions with general purpose computational capabilities. Further, smartphones can also route and bridge communications between different communication bands and protocols, and thus can provide Internet connectivity and service to other devices.

Two distinct types of ubiquitous wireless data communication networks have developed: cellular telephone networks having a maximum range of about 20-50 miles line of sight or 3 miles in hilly terrain, and short-range local-area computer networks (wireless local-area networks or WLANs) having a maximum range of about 0.2 miles (~1000 feet IEEE-802.11n 2.4 GHz) outdoors line of sight. First, the cellular infrastructure for wireless telephony involves long-distance communication between mobile phones and central basestations, where the basestations are typically linked to tall cell towers, connecting to the public switched telephone network and the Internet. The radio band for these long-range wireless networks is typically a regulated, licensed band, and the network is managed to combine both broad bandwidth (~5-20 MHz) and many simultaneous users. This should be contrasted with a short-range wireless computer network, which may link multiple users to a central router or hub, which router may itself have a wired connection to the Internet. A key example is Wi-Fi, which is managed according to the IEEE-802.11x communications standards, with a data rate theoretically over 1 gigabit per second (802.11ac) and a range that is typically much less than 100 m. Other known standard examples are known by the terms Bluetooth and ZigBee. The radio band for a WLAN is typically an unlicensed band, such as one of the ISM bands (industrial, scientific, and medical), or more recently, a whitespace band formerly occupied by terrestrial analog television (WSLAN). One implication of such an unlicensed band is the unpredictable presence of significant interference due to other classes of users, which tends to limit either the range, or the bandwidth, or both. For such local area networks, a short range (low power and high modulation rates) becomes advantageous for high rates of spatial band reuse and acceptable levels of interference.

Ad hoc networks or mesh networks are also known. These protocols permit peer-to-peer communications between devices over a variety of frequency bands, and a range of capabilities. In a multihop network, communications are passed from one node to another in series between the source and destination. Because of various risks, as the number of hops grows, the reliability of a communication successfully reaching its destination decreases, such that hop counts of more than 10 or 20 in a mobility permissive network are rarely considered feasible. A typical mesh network protocol maintains a routing table at each node, which is then used to control the communication. This routing table may be established proactively or reactively. In proactive routing, the network state information is pushed to the various nodes, often appended to other communications, such that when a communication is to be established, the nodes rely on the then-current routing information to control the communication. This paradigm suffers from the possibility of stale or incorrect routing information or overly burdensome administrative overhead, or both. Reactive routing seeks to determine the network state at the time of, and for the purpose of, a single communication, and therefore may require significant communications possibly far exceeding the amount of data to be communicated in order to establish a link. Because the network state is requested at the time of communication, there is less opportunity to piggyback the administrative information on other communications. There are also various hybrid ad hoc network routing protocols, which seek to compromise between these two strategies, and other paradigms as well. See, e.g., U.S. Pat. Nos. and Pub. Patent Appl. Nos. 6,584,080; 6,625,135; 6,628,620; 6,718,394; 6,754,192; 6,763,013; 6,763,014; 6,870,846; 6,894,985; 6,898,529; 6,906,741; 6,954,435; 6,961,310; 6,975,614; 6,977,608; 6,986,161; 7,007,102; 7,027,426; 7,028,687; 7,068,600; 7,068,605; 7,075,919; 7,079,552; 7,082,117; 7,085,290; 7,096,037; 7,142,866; 7,170,425; 7,176,807; 7,216,282; 7,251,238; 7,266,085; 7,281,057; 7,299,038; 7,299,042; 7,308,369; 7,308,370; 7,317,898; 7,327,998; 7,346,167; 7,348,895; 7,356,001; 7,362,711; 7,366,111; 7,366,544; 7,382,765; 7,389,295; 7,394,798; 7,394,826; 7,418,238; 7,420,944; 7,427,927; 7,428,221; 7,450,517; 7,453,864; 7,457,834; 7,468,954; 7,480,248; 7,495,578; 7,529,561; 7,535,883; 7,536,388; 7,539,759; 7,545,285; 7,567,577; 7,580,730; 7,580,782; 7,581,095; 7,587,001; 7,590,589; 7,599,696; 7,602,738; 7,616,961; 7,656,851; 7,657,354; 7,660,318; 7,660,950; 7,678,068; 7,693,484; 7,695,446; 7,702,594; 7,706,282; 7,706,842; 7,710,932; 7,719,988; 7,725,080; 7,729,336; 7,742,399; 7,742,430; 7,746,794; 7,753,795; 7,764,617; 7,778,235; 7,788,387; 7,808,985; 7,813,451; 7,817,623; 7,830,820; 7,843,861; 7,849,139; 7,852,826; 7,860,025; 7,860,081; 7,860,968; 7,873,019; 7,881,474; 7,886,075; 7,894,828; 7,898,993; 7,902,973; 7,905,640; 7,912,645; 7,924,796; 7,929,914; 7,936,732; 7,941,188; 7,944,878; 7,957,355; 7,961,650; 7,962,101; 7,962,154; 7,969,914; 7,970,418; 7,974,402; 7,978,062; 7,979,311; 7,983,835; 7,990,947; 7,996,558; 8,035,479; 8,040,863; 8,042,048; 8,059,620; 8,060, 017; 8,060,308; 8,065,166; 8,065,411; 8,072,906; 8,073,384; 8,090,596; 8,099,108; 8,099,307; 8,108,228; 8,108,429; 8,115,617; 8,121,628; 8,121,870; 8,130,708; 8,131,569; 8,131,838; 8,134,950; 8,135,362; 8,138,934; 8,139,504; 8,144,596; 8,144,619; 8,151,140; 8,161,097; 8,170,577; 8,170,957; 8,171,364; 8,174,381; 8,180,294; 8,184,681; 8,195,483; 8,195,628; 8,200,246; 8,203,463; 8,213,895; 8,239,169; 8,249,984; 8,256,681; 8,266,657; 8,271,449; 8,275,824; 8,289,182; 8,289,186; 8,300,615; 8,311,533; 8,315,231; 8,319,658; 8,319,833; 8,320,302; 8,320,414; 8,323,189; 8,325,612; 8,330,649; 8,332,055; 8,334,787; 8,335,207; 8,335,814; 8,341,279; 8,341,289; 8,345,098; 8,346,846; 8,352,420; 8,359,643; 8,363,662; 8,364,648; 8,369,880; 8,370,697; 8,373,556; 8,373,588; 8,374,352; 8,385,550; 8,386,278; 8,392,541; 8,395,498; 8,396,602; 8,400,507; 8,401,564; 8,406,153; 8,406,239; 8,406,252; 8,428,517; 8,441,958; 8,442,520; 8,447,419; 8,447,849; 8,451,744; 8,463,238; 8,467,991; 8,472,348; 8,473,989; 8,475,368; 8,489,765; 8,494,458; 8,495,244; 8,496,181; 8,502,148; 8,502,640; 8,503,309; 8,504,921; 8,509,762; 8,509,765; 8,514,915; 8,515,547; 8,520,535; 8,520,676; 8,521,156; 8,525,692; 8,527,622; 8,533,758; 8,544,023; 8,547,875; 8,548,607; 8,553,688; 8,559,442; 8,560,274; 8,571,046; 8,571,518; 8,577,391; 8,578,015; 8,578,054; 8,583,671; 8,583,978; 8,587,427; 8,588,108; 8,593,419; 8,593,986; 8,595,359; 8,600,830; 8,612,583; 8,615,257; 8,619,576; 8,619,789; 8,620,772; 8,620,784; 8,621,577; 8,622,837; 8,624,771; 8,625,515; 8,626,344; 8,630,177; 8,630,291; 8,630,314; 8,631,101; 8,636,395; 8,638,667; 8,638,763; 8,652,038; 8,654,627; 8,654,649; 8,665,890; 8,667,084; 8,670,416; 8,675,678; 8,682,982; 8,693,322; 8,699,333; 8,699,368; 8,699,377; 8,700,301; 8,700,302; 8,700,536; 8,707,785; 8,712,711; 8,715,072; 8,718,055; 8,719,563; 8,725,274; 8,727,978; 8,730,047; 8,730,875; 8,732,454; 8,738,944; 8,743,750; 8,743,768; 8,743,866; 8,747,313; 8,751,063; 8,751,644; 8,755,763; 8,756,449; 8,760,339; 8,761,175; 8,761,285; 8,762,852; 8,769,442; 8,774,050; 8,774,946; 8,780,201; 8,780,953; 8,781,462; 8,787,392; 8,787,944; 8,788,516; 8,792,850; 8,792,880; 8,797,878; 8,798,094; 8,799,220; 8,799,510; 8,800,010; 8,804,603; 8,806,633; 8,812,419; 8,817,665; 8,818,522; 8,819,172; 8,819,191; 8,823,795; 8,824,471; 8,830,837; 8,831,279; 8,831,869; 8,832,428; 8,837,277; 8,842,180; 8,842,630; 8,843,156; 8,848,970; 8,855,794; 8,855,830; 8,856,323; 8,861,390; 8,862,774; 8,867,329; 8,868,374; 8,872,379; 8,872,767; 8,872,915; 8,873,391; 8,873,526; 8,874,477; 8,874,788; 8,879,604; 8,879,613; 8,880,060; 8,885,501; 8,885,630; 8,886,227; 8,891,534; 8,891,588; 8,892,271; 8,908,516; 8,908,536; 8,908,621; 8,908,626; 8,918,480; 8,923,186; 8,923,422; 8,930,361; 8,934,366; 8,934,496; 8,937,886; 8,938,270; 8,942,301; 8,948,046; 8,948,229; 8,949,959; 8,954,582; 8,959,539; 8,964,762; 8,964,787; 8,965,288; 8,970,392; 8,970,394; 8,971,188; 8,972,159; 8,976,007; 20020039357; 20020071160; 20020083316; 20030202468; 20030202469; 20030202476; 20030202512; 20030204587; 20030204616; 20040022223; 20040022224; 20040028000; 20040028016; 20040029553; 20040042417; 20040042434; 20040057409; 20040160943; 20040174900; 20040203385; 20040203820; 20040210657; 20040218548; 20040218582; 20040219909; 20040223497; 20040223498; 20040223499; 20040223500; 20040228343; 20040264466; 20050041591; 20050053003; 20050053004; 20050053005; 20050053007; 20050053094; 20050054346; 20050141706; 20050157661; 20050254473; 20050259588; 20050259595; 20050265259; 20050276608; 20060002328; 20060007863; 20060023632; 20060030318; 20060092043; 20060095199; 20060126535; 20060167784; 20060176829; 20060227724; 20060229090; 20060251115; 20060291404; 20060291485; 20060291864; 20070038743; 20070087756; 20070087758; 20070110024; 20070153737; 20070153764; 20070214046; 20070223436; 20070229231; 20070280174; 20070286097; 20070297808; 20080040507; 20080051036; 20080051099; 20080117896; 20080130640; 20080159151; 20080159358; 20080240050; 20080247353; 20080252485; 20080262893; 20080267116; 20080273487; 20080291843; 20080310390; 20090046688; 20090061835; 20090062887; 20090086663; 20090097490; 20090185508; 20090210495; 20090215411; 20090219194; 20090228575; 20090323519; 20100014444; 20100017045; 20100097957; 20100123572; 20100124196; 20100125671; 20100152619; 20100187832; 20100235285; 20100254309; 20100317420; 20100329274; 20110004513; 20110078461; 20110080853; 20110085530; 20110187527; 20110133924; 20110204720; 20110211534; 20110228696; 20110228788; 20110231573; 20110235550; 20110267981; 20110273568; 20110314504; 20120005041; 20120039186; 20120039190; 20120113807; 20120113863; 20120113986; 20120116559; 20120117208; 20120117213; 20120117268; 20120117438; 20120134548; 20120154633; 20120155260; 20120155276; 20120155284; 20120155329; 20120155397; 20120155463; 20120155475; 20120155511; 20120158933; 20120182867; 20120188968; 20120208592; 20120210233; 20120213124; 20120224743; 20120230204; 20120230222; 20120230370; 20120233326; 20120233485; 20120242501; 20120243621; 20120254338; 20120275642; 20120277893; 20120280908; 20120282905; 20120282911; 20120284012; 20120284122; 20120284339; 20120284593; 20120307624; 20120307629; 20120307652; 20120307653; 20120307825; 20120320768; 20120320790; 20120320923; 20120324273; 20130010590; 20130010615; 20130010798; 20130013806; 20130013809; 20130016612; 20130016757; 20130016758; 20130016759; 20130018993; 20130019005; 20130022042; 20130022046; 20130022053; 20130022083; 20130022084; 20130024149; 20130024560; 20130028095; 20130028103; 20130028104; 20130028140; 20130028143; 20130028295; 20130031253; 20130045759; 20130051250; 20130055383; 20130064072; 20130067063; 20130069780; 20130080307; 20130083658; 20130086601; 20130088999; 20130089011; 20130094536; 20130094537; 20130111038; 20130121331; 20130122807; 20130124883; 20130128773; 20130151563; 20130169838; 20130177025; 20130178718; 20130183952; 20130188471; 20130188513; 20130191688; 20130201891; 20130215739; 20130215942; 20130219045; 20130219046; 20130219478; 20130223218; 20130223225; 20130223229; 20130223237; 20130223275; 20130227055; 20130227114; 20130227336; 20130250754; 20130250808; 20130250809; 20130250811; 20130250866; 20130250945; 20130250953; 20130250969; 20130251053; 20130251054; 20130259096; 20130279365; 20130279540; 20130283347; 20130283360; 20130286942; 20130290560; 20130308495; 20130310896; 20130315131; 20130336316; 20140006893; 20140016643; 20140022906; 20140029432; 20140029445; 20140029603; 20140029610; 20140029624; 20140036912; 20140036925; 20140055284; 20140064172; 20140068105; 20140081793; 20140092752; 20140092753; 20140092769; 20140092905; 20140095864; 20140105015; 20140105027; 20140105033; 20140105211; 20140108643; 20140114554; 20140114555; 20140121476; 20140122673; 20140126348; 20140126354; 20140126423; 20140126426; 20140126431; 20140126610; 20140129734; 20140129876; 20140136881; 20140195668; 20140219078; 20140219103; 20140219114; 20140219133; 20140222725; 20140222726; 20140222727; 20140222728; 20140222729; 20140222730; 20140222731; 20140222748; 20140222975; 20140222983; 20140222996; 20140222997; 20140222998; 20140223155; 20140245055;

20140247726; 20140247804; 20140269402; 20140269413; 20140269592; 20140269759; 20140273920; 20140281670; 20140286377; 20140297206; 20140302774; 20140304427; 20140307614; 20140314096; 20140320021; 20140324596; 20140324833; 20140328346; 20140330947; 20140355425; 20140357295; 20140357312; 20140369550; 20140372577; 20140372585; 20140376361; 20140376427; 20140379896; 20140379900; 20150002336; 20150003251; 20150003428; 20150016688; 20150023174; 20150023363; 20150023369; 20150026268; 20150030033; 20150043384; 20150043519; 20150055650; 20150063365; 20150071295; 20150072728, each of which is expressly incorporated herein by reference in its entirety. A much older class of wireless communication technologies comprises voice communication on narrow-band analog radio channels, such as paired Walkie-Talkies and Citizens Band (CB) Radio. The set of Citizen's Band services defined by Federal Communications Commission regulations includes the Family Radio Service (FRS) and General Mobile Radio Service (GMRS) which operate at 462 and 467 MHz, Multi-Use Radio Service (MURS) which operates at 150 MHz, the original Citizens Band Radio (CB) which operates at 27 MHz and more recently at 49 MHz, Wireless Medical Telemetry Service (WTMS) at 610, 1400 and 1430 MHz, the Low Power Radio Service (LPRS) at 216-217 MHz, and the Medical Implant Communications Service (MICS) at 402 MHz which are in some cases unlicensed, or easy to obtain a license for the Multi-Use Radio Service, or MURS, is a low power, short range, unlicensed personal radio service in the 150 MHz band. MURS is intended for short-range local voice or data communications. Antenna height is limited to 20 feet above structure or 60 feet above ground, whichever is the greater. Narrow bandwidth transmissions (maximum 11.25 kHz channel bandwidth, with +/−2.5 kHz deviation) intended for voice communications are permissible on all five MURS channels. The older +/−5 kHz deviation signals (with a maximum 20 kHz channel bandwidth) are also permitted (but not required) on the two upper channels (in the 154 MHz band). The range at maximum permitted transmit power of 2 watts is 2-8 miles.

It is noted that certain restrictions on use may be different across the different channels; for example, the MURS is not permitted to communicate with the telephone network, while a licensee controlled band, generally does not have such restrictions. Therefore, the premium band may have qualitative differences in permitted use.

Typically, the highly regulated bands will be geographically licensed, and therefore the transceiver device may require a GPS receiver to determine what bands are available for use. An alternate, however, is to provide a radio frequency scan function to listen for characteristic control channel communications and geographic and/or licensing information, before any communications are sent. Typical rules for band use should not prohibit such automated scanning to determine permissible band usage within the region. A transceiver device may therefore conduct a handshake negotiation with a base station in a particular location to authorize its usage, and to the extent applicable, log usage and charge a prepaid or postpaid user account for the usage.

The wireless telephone system was of course initially developed for voice communications, but another form of communication that has become ubiquitous on SmartPhones is the exchange of brief text messages, which are sent in a "push" manner, and routed by telephone number. Another similar technology is "Instant Messaging", which sends alphanumeric communications typically over the Internet, to a destination defined by an Internet Protocol (IP) address, or routed by identifier (username) through a central server (similar in function to a domain name server [DNS]). These are small data packets that can be transmitted at low data rates, and sent to specific recipients. This is also somewhat similar to electronic mail between computers, though email routing requires, in addition to a DNS, a sendmail server and a receivemail server. As digital data, these messages can also be encrypted before transmitting and decrypted in the receiver SmartPhone or computer.

Most of the efforts in wireless technology in recent years have focused on maintaining highly reliable voice and data communication for a large number of simultaneous users over broadband channels, in a way that is largely invisible to the user of the wireless device. A typical SmartPhone may have access to both a long-distance cellular phone network, and a WLAN such as Wi-Fi or Bluetooth, as indicated in the Prior Art shown in FIG. 4. But what happens when neither network is available? This may be the case, for example, if a user is located in a wilderness location far from cell phone towers, or during an emergency when such towers are not fully functional. While satellite phone systems are commercially available, most mobile units are incapable of taking advantage of such systems, which requires expensive and high-power devices.

There are some more recent and earlier examples of prior art that address one or more of these issues. For example, see: U.S. Pub. App. Nos. 2010/0203878, 2008/0200165, 2012/0023171, 2010/0029216, 2009/0109898, U.S. Pat. Nos. 6,415,158, 8,503,934, 8,165,585, 7,127,250, 8,112,082, 7,512,094, 8,126,473, 2009/0286531, U.S. Pat. Nos. 7,400,903, 6,647,426, 8,248,947, and PCT App. Nos. WO2012/116489, WO2012/078565, each of which is expressly incorporated herein by reference. These citations deal with wireless communications systems with two available bands, which may comprise both licensed and unlicensed bands.

FRS and/or GMRS has been used for various types of data communications, for example, to communicate GPS coordinates between hand-held compatible receivers, such as various Garmin RINO® models. More generally, it is known to transmit digital data over voice channels in radio communications, though these communications are typically conducted between predetermined members of a network, and therefore typically employ in-channel signaling, i.e., a receiver listens on a single channel for both control information and communicated data. For example, the IDAS Digital radio systems (LMR, DroidCONX) employs licensed spectrum to support radio communications between computerized hosts.

SUMMARY AND OBJECTS OF THE INVENTION

The present technology provides a system and method for using a computerized host, such as a SmartPhone, mobile computer, or intelligent appliance or sensor/actuator system, together with an internal radio or external radio-frequency adaptor to enable secure digital message communication on a point-to-point basis via a licensed or unlicensed band, particularly for use when the licensed network is unavailable. Further, this technology, operating within Federal Communication Commission limits for various bands would generally have greater range than can be obtained using a built-in WLAN operating in the 900 MHz, 2.5 GHz or 5.8 GHz ISM bands, without excessive power consumption.

A preferred embodiment provides an external transceiver module which communicates with a smartphone, mobile computer or other computational device providing a human user interface or machine communication interface through a wired connection, such as USB or serial network (RS-232, RS-422, RS-423, RS-485, CAN (ISO 11898-1), J1850, FlexRay, IEEE-1905 (wireline), SPI, I²C, UNI/O, and 1-Wire) or low power, short range wireless communication technology such as Bluetooth, Zigbee or Insteon, Z-wave or the like. The transceiver module receives the data from the user interface device, and formats and retransmits the data, for example in the Multi Use Radio Service (MURS) at about 150 MHz with 500 mW-2 W transmit power, or likewise the interface device receives data from the transceiver device. The transceiver module may also receive all or a portion of the data from another transceiver module, store the received data and transmit a message comprising all or a portion of the data to another transceiver module. Of course, other technologies may be employed for the local communication with the user/machine interface device and the telecommunication with a remote system. Generally, the transceiver module is self-powered with an internal rechargeable or primary battery, fuel cell, energy harvesting generator/recharger, crank or kinetic generator, wireless induction, solar cell, power drawn from mobile phone's headphone audio jack, iOS Lightning port, supercapacitor, main line power (120 V plug), or USB power from a Smartphone (which can also provide a wired data connection. USB 2.0 provides limited power (5V, 500 mA), while USB 3.0 and 3.1 provide higher power limits (5V, 900 mA and 2100 mA).

According to one embodiment, the transceiver acts as an administrative channel facilitator for a multihop ad hoc network (MANET). According to this embodiment, all or a portion of the administrative data carried within a MANET is shifted to an out-of-band network, such as the transceiver module, which operates in a different frequency band than the normal data communications of the MANET. This presents the advantages that, if the transceiver has a longer range, then a fewer number of hops is necessary to convey the administrative information, including the routing information, around the network. Further, by employing a different band for distribution of the information, the number of hidden nodes can be reduced. In this case, the transceiver may operate autonomously, without a smartphone or associated user interface device, and may in certain cases be seeded around an environment to provide an emergency low-bandwidth, long range infrastructure to support wide bandwidth MANET communications.

Typically, the number of transceivers is fewer than the number of nodes in the MANET, and therefore a hybrid architecture is implemented. The transceivers act in one sense as a supernode, to which local administrative communications are targeted and redistributed to the larger network as a whole. According to this paradigm, MANET nodes do not seek to propagate routing information directly across the entire network. Rather, local nodes transmit information within a local community to a transceiver with longer range, and which forms part of a second-level MANET which distributes the information globally among the entire set of transceivers. Each transceiver integrates the received information with its local table or database, and redistributes the integrated information to its local set of nodes and to other nodes in the second level MANET seeking to achieve synchronization. As is generally known, complete global synchronization may not be effectively achievable, and efforts may be unduly expensive in terms of cost and adverse impact on network efficiency. Therefore, the respective local tables or databases of the transceivers may respectively differ, with emphasis on local relevance rather than comprehensiveness.

It is noted that it is likely that some nodes or supernodes will have Internet access, and this may be used to unburden the first and second level MANET from the need to carry all administrative information. The administrative information, in that case, can be communicated directly between the nodes or supernodes that have direct Internet access, such as using a TCP/IP protocol, broadcast to all nodes or supernodes that have direct Internet access, such as using a UDP protocol, or uploaded to a central coordination server, which itself would maintain a global network state. In known manner, the underlying protocols may be proactive (OSLR, OSPF, etc.), reactive (AODV, DSR, etc.), hybrid, or other available types. In proactive routing, connectivity is discovered and known prior to computing routes to any destination in the network, for example, using link state routing such as Open Shortest Path First (OSPF), Intermediate-System-to-Intermediate-System (ISIS), or Optimized Link State Routing (OLSR). Reactive routing, on the other hand, discovers neighbors (in other words, it does not presume an a priori knowledge of network topology) and, in response to a needed route to a destination, sends a route request into the network to determine which neighboring node may be used to reach the desired destination. Example reactive routing protocols may comprise Ad-hoc On-demand Distance Vector (AODV), Dynamic Source Routing (DSR), DYnamic MANET On-demand Routing (DYMO), etc.

The information stored in the table or database typically includes an address of a node or supernode, its location, relative location, or network topological location, optionally a reliability indicator (Is this a fixed node? Mobile node? Intermittent node? Etc.), optionally a mobility vector, optionally a capability indication (node, supernode, internet access, etc.), optionally a communication status (seeking to send communication, seeking to receive a communication, available to forward messages, temporarily or persistently unavailable, etc.), or other known type of pertinent information.

In a typical architecture, a transceiver device is associated with a WiFi router with DHCP server and network address translation, to support ad hoc networking over IEEE-802.11n of up to 255 nodes. The range of such communications is about 100 meters outdoors, but communications can hop through respective nodes to reach the controlling router. The transceiver communicates with the WiFi router over Bluetooth, WiFi, Ethernet (10/100 or 1G), USB 2.0 or 3.0, or the like. Preferably, the WiFi router is situated to have available Internet access, though in some cases this is unavailable, and in other cases, the network is deployed because of a failure of cellular network and/or Internet access. The transceiver, in this case, communicates through the local server of the router and is not per se a node on the IP network established by the WiFi router. Therefore, the firmware of the router can be programmed to communicate through the transceiver according to an arbitrary protocol, e.g., the normal transceiver protocol. It is noted that instead of a WiFi router, a smartphone may be employed, in which the control software for the transceiver may be provided as an app rather than firmware.

The transceiver communicates though Bluetooth or the like with a node of the network, e.g., a smartphone, as an interface with the first level of the network. Bluetooth 3.0 Class 1 has a maximum range of 100 m, similar to WiFi. In cases where the transceiver is out of range of a node, it acts to maintain the routing table or database for the network by receiving communications from other transceivers, integrating the received information, and transmitting revised information to other transceivers. When a node of the MANET comes into range, the routing information from the node and transceiver are exchanged through Bluetooth or the like. In addition, the transceiver can provide reactive routing services for the node, and thus facilitate or optimize communications.

The transceiver device provides a significant enhancement to traditional short-range mesh networks, by providing long range coordination/administration communications. Currently, mobile ad hoc networks (MANETs) employ protocols which are burdened by transporting routing information between nodes. The problem is, for a communication in a dense network that requires 10+ hops, the amount of information that must be communicated to permit nodes of the network to understand the network architecture may exceed the data payload, and will involve burdensome communications with nodes uninvolved in the propose communication; meanwhile, a "proactive" protocol (which sends out routing information before communications are made) in such a network consumes much bandwidth even when there is no data to convey, while a reactive protocol (which requests network state information when a communication is to be sent) can be slow to respond and require a large volume of communications before the first data can be sent. In a mobile network, it may take so long to transport the location and status of nodes, that the information is stale by the time it reaches a destination. Meanwhile, an originating node typically does not commence a multihop transmission unless it knows of a path that will reach the destination, but seeks to wait until it identifies the best path to the destination.

The transceiver can solve these problems by providing long-range proactive communications for administrative and routing information that both unburdens the data communications channels and increases communications reliability. Because the communications are proactive, they can decrease network activity during periods of congestion. In times of emergency, the transceiver can also indicate where nodes need to be established in order to maintain a reliable and complete network.

In this capacity, the transceiver does, to a small extent, store and forward received information, but typically any received data is merged with a local table which is then distributed to the network. Since the communications from the transceiver tend to be omnidirectional, the most efficient strategy is for the transceiver to communicate its entire table, except expired, unreliable or irrelevant data. A corresponding receiver that receives the data then filters that data and integrates it into its own table. This out-of-band communication of administrative information benefits public safety by making infrastructure-less mesh networking a viable option in case of emergencies or in remote locations where cellular services is unreliable.

The transceiver can also forward messages while appending path information, which can include location information. Therefore, in case of emergency, even one occurring after the communication, one can determine nearest nodes to the source node. The present technology therefore improves the probability of getting an emergency message from one party to another.

According to one embodiment, a transceiver stores in a table a received signal strength indicator associated with a signal received from another transceiver, and this information is stored and distributed as part of the table. This information permits inferences of distance between transceivers, and by triangulation in a network of transceivers, a map may be estimated. Therefore, even with partial GPS location information, the routing table can provide relatively complete locations, facilitating use of a geographic routing protocol.

The transceiver device may not be all the time connected to one or more cellular device, but is still required to maintain network intelligence on routing and connectivity information. In this way, information will be re-combined and simplified at each node. The information passed included the signal quality (RSSI), and GPS locations (where available). The combined intelligence information includes: a better forwarding Route Entry to and from the cellular device (the edge of the network). The transceiver network still operates well when it is completely isolated from the rest of the world, but it needs to maintain its networking routing and intelligence for continuing to provide emergency and public safety services such as situation awareness.

In another embodiment, the transceiver device acts as a cellular or internet network connected device, for the purpose extending its range, which can be by a few miles in a typical case of use of MURS, FRS, or GMRS. The system operates in this mode by extending and simplifying the routing information from the Internet-connected transceiver into the transceiver network. Similarly, the transceiver network will also bring back the routing information to the terminal device. In order to stretch the reach as far as possible, the routing information must be intelligently combined, simplified and forwarded. The information for the routing intelligence may include, for example, GPS coordinates, best routes, quality route paths, etc.

The terminal device may also provide a measurement of the quality of the Internet, which may in some cases be impaired or absent. This can help suggest the proper routes to an end device, which can be either through the transceiver network, or at least partially through the Internet.

The transceiver device does not typically act as a "repeater" for received information.

Rather, the information, especially routing information, is processed and analyzed, and modified before and relaying to another node. Even when data is conveyed, the transmission may be modified to include routing information or appended routing information as part of a proactive routing protocol.

For example, one use case provides multiple transceivers on a mountain. One person is in an emergency, and sends an emergency message out. It is passed from node to node through the transceiver network, with each node adding its own GPS or other location information. At some point, close or far, an emergency response team receives the signal and is able to not only see the originator's message, but also a small list of the nearest nodes to the source node of the emergency message. Those transceivers can them be contacted via the same system to ask them to provide assistance.

Another example provides for synchronization of data which is constantly circulated in the system in such a way to ensure that there is always some kind of open slot for emergency communications in an open RF ad-hoc uncoordinated system. This synchronization information can be efficiently passed through the system by piggybacking on other messages normally passing through the network. Thus, the multi-hop distribution of information maintains a significant emergency decentralized network capability, and incidentally can be used to convey messages over long distances.

According to one embodiment, the transceiver device is provided with various modes implemented under different environmental conditions. Due to the possible latency that could result from too many transceivers in an area (like a music festival), the transceiver devices may include a mode to detect high congestion, by monitoring the control channel traffic (and/or the data channel traffic or interference), to determine whether it exceeds a certain level, which may be a predetermined or adaptive threshold. Similarly, the transceiver device may determine the received signal strength of various units operating within range (and, if also available, compare the received signal strength with a reported broadcast signal strength), as well as possibly incorporating the average strength of the signals being received, to determine a density of transceiver devices within the environment. In the event that an ad hoc networking protocol is available, the routing data for that protocol may also provide useful information for mapping the radio frequency characteristics of the band, in the environment in which the transceiver device is operating. Based on this density, the transceiver may change a mode of operation to alter the modulation scheme, the protocol, the transmit power, or any combination or subcombination. An example would be switching to higher modulation (symbols per Hertz) to increase data throughput as well as reducing range, to reduce zones of interference. Another option is programmed deference or network splitting. For example, if each transceiver device has a numeric identifier, the group of transceiver devices may be split based on "odd" or "even" identification numbers, and on that basis, either one group be programmed to remain silent for a period, or for that group to switch to a different control channel or even a different band of operation.

The system may provide a range of packet sizes, and for example, may have uniform packet sizes, or packet sizes that change under different network usage conditions or for different applications. The protocol may have different sized packets for control messages, such as acknowledgements and retransmit requests, than for more complex messages. The packet size may also vary in accordance with channel conditions. For example, on a data channel, a low error rate channel may employ longer packets than a high error rate channel. For example, a basic packet size may be 160 bytes, inclusive or exclusive of header and error detection codes, which can provide 40 byte packets for simple control messages, and 1k byte packets for data streams in a low interference environment. In order to reduce data overhead, the data may be compressed or tokenized, for example, a network transaction ID may be used instead of full recipient IDs on each network packet after the initial one, since the proper recipient can thereafter be implied. Packets may be unique for certain features, like pinging a transceiver device with a RTS packet with minimized data (no channel reservation, public key hash, or other components) and instead only waiting for an immediate ACK on the control channel. This permits efficient determination if a target transceiver device is in range, while not using a full network transaction to do so.

According to one embodiment, the transceiver device is capable of operating in unlicensed or minimally licensed bands, and in highly regulated bands, based on a software control. If a user wishes to make use of operation in a highly regulated band, a code may be provided to permit the user to subscribe to the band. The subscription typically requires a payment to a licensee for the band, which can be a periodic (recurring) payment, a payment based on data usage, a payment based on time usage, or the like. The subscription may be prospective or retrospective; that is, a user may acquire license rights, typically in the form of a cryptographic key that unlocks the features. The key may be communicated over the Internet, to the application running on the smartphone or computer, or through the control channel. The key may also simply be a code that is entered, either directly into the transceiver device or into the applet which controls/communicates with it. A hardware key, also known as a "dongle" may be used to provide the authorization. Similarly, other known methods of providing and enforcing a prospective subscription may be implemented, either in the applet or control software, or in the firmware of the transceiver device, or both. In the case of a retrospective (post paid) subscription, the user is provided with an account, and typically, a "credit limit", such that protracted use of the services without paying is limited. The transceiver device, therefore, may have a secure non-volatile memory that monitors usage and required payments, which may be absolute or relative, e.g., tokens. The transceiver imposes a limit on the deficit or payment or tokens than can be accumulated, and will not operate in the highly regulated band after the limit is reached. Typically, the post-paid subscription is tightly coupled to a real time or near real-time accounting system. For example, in the highly regulated band, there may be a set of infrastructure base stations, with which most communications are conducted. Therefore, the base station can transact with the transceiver device immediately, to ensure compliance with the rules. As noted, the implementation may be in the firmware of a processor that controls the transceiver device, in an application program or applet that communicates with the transceiver device, within a dongle or specialized cable, or the like. Advantageously, if there is a highly regulated band available, the system may permit the control channel communications to occur on the highly regulated band, and charge premium fees for use of data channels within the highly regulated band, and otherwise permit free communications only on the "free" channels.

According to an embodiment, the transceiver devices operate within a proprietary band, i.e., a frequency band that is controlled by an entity and subject to use under terms and conditions imposed by that entity. In that case, there will generally be low interference on the operating frequencies, and perhaps more importantly, the protocol for operation of the transceiver devices may be engineered to follow a deterministic protocol, without significant consideration for non-cooperative devices operating on the same band. When operating in such a controlled band, cooperation and deference between transceiver devices may be enforced. In order to police usage of the band, the identification messages broadcast by each transceiver device may be filtered for authorization, either by a base station system, or by an authorization list/revocation list implemented by a distributed group of transceiver devices. If a transceiver device has an expired or invalid authorization or subscription, a base station may refuse to permit or facilitate operation, or broadcast a list of authorized/unauthorized transceiver devices which act as a filter for forwarding messages between transceiver devices in an ad hoc mode. The authorization may also be communicated through the Internet by way of smartphones or computers which interface with the transceiver devices.

According to one embodiment, a micropayment scheme is implemented to encourage users to permit usage of their transceiver devices as intermediate nodes in communications for other transceiver devices to use. Therefore, a transceiver device that uses another device may pay a small amount for that usage, which can then be used in the event that the transceiver device then needs to communicate on its own behalf. Likewise, use of the control channel and data channels may also be subject to monetary exchanges, which can be artificial currencies isolated from the real economy, or units of financial value. The rules for economic payments and compensation may differ for the various bands of operation, and a band licensee may receive payment according to the defined protocol. See, US Pub App. Nos. 2013/0080307; 2011/0004513; 2010/0317420; 2010/0235285; 2008/0262893; 2007/0087756; and 2006/0167784; expressly incorporated herein by reference. One issue for modern data communication is the availability of efficient encryption and decryption algorithms, which enable one to provide a significant degree of security and privacy for the communication. This was not available for the older analog voice communication, though in some cases an analog scrambling technology was employed which required special receivers, and in some cases, codes to decipher. Digital communication encryption is well known, however, providing private encrypted channels within a wireless ad hoc broadcast communication network with shared communication medium has unresolved issues, such as authentication of a new counterparty, and leakage of communication metadata over control channels.

The user/machine interface device, e.g., an Apple iPhone 5/iOS, Android 2.0-4.4, Windows Phone 8 device, BlackBerry/QNX, Linux or proprietary operating system, is preferably controlled through an "app", that is, a software program that generates a user interface and employs operating system facilities for controlling the hardware. The app in this case may provide a communication port for use by the operating system, and therefore can generally communicate data, though compliance with various FCC limits may require restricted usage, especially with respect to connection to the telephone network. Likewise, received data may also be restricted, e.g., retransmission. Alternately, the communications to the transceiver module may present as a service, and therefore available to other apps executing on the user/machine interface device. Because of the limited bandwidth available on the transceiver device, it is preferred not to present the transceiver module as a generic network communication device, that might trigger attempts at mass network data transfers.

The technology preferably provides a hardware and software bundle that can enable computers and mobile phones to communicate data packets with a relatively small data payload, without relying on the Internet or the central cellular network infrastructure. This may be referred to as user-to-user communications (U2U), point-to-point (P2P), vehicle to infrastructure (V2I) or vehicle to vehicle (V2V). Computers and mobile phones enable users to send much more than text messages. For example, GPS coordinates, multimedia from the situation, accelerometer and other sensor data can all be sent over a decentralized network, enabling enhanced communication and situation response when the central grid is unavailable.

FIG. 1 shows a generalized conceptual picture of the system. Here two mobile computing devices (or SmartPhones) are designed for communication via an external centralized network (indicated in FIG. 1 by a cloud). An external adaptor (the P2P adaptor) is also present close to each computer. These P2P adaptors provide a means for direct communication, permitting an alternative communication channel between the two computers if the primary network is unavailable or non-functional. This alternative channel need not provide all of the capabilities of the primary network. For example, the primary network may typically permit broadband access to the Internet, while the secondary link may be limited to relatively small data packages such as text messages, and may fail to reach the Internet. Still, if the primary network is unavailable, a more limited service is provided.

The wireless network capabilities of a conventional mobile computing device of the prior art are indicated in the block diagram of FIG. 4. Such a device may have two (or more) alternative channels to access the Network. One is a long-range link via a cellular phone network, while the other is a short-range wireless local area network (WLAN) such as those based on standard Wi-Fi or Bluetooth protocols. If the users are located in a remote region without cell phone access, the WLAN could in principle be used to communicate directly between users in an ad hoc network mode, but only for very limited distances of less than 100 m.

The present technology provides P2P adaptors to enable an extended range of much greater than 100 m, for example up to several km or more, for low data rate, generally short messages. A further characteristic of these P2P adaptors in a preferred embodiment is that they are configured to operate in an unlicensed radio band using narrow channels, or in a public band that may be lightly regulated. While such a band may in general exhibit substantial radio interference, this is unlikely to be a problem in a remote location for which use of the P2P adaptor will be most directly applicable. The system may implement a band management protocol to gracefully select the communication channel to minimize interference, provide retransmission as appropriate, and to overall provide the optimum performance of the system, including establishing a collision-sensing and/or or token passing protocol. Preferably, channel assignments and communication system control employs a control channel, while communications themselves employs other channels. As available, the control channel may also be used to communicate data.

The system may implement an ad hoc network architecture and/or a mobile ad hoc network (MANET) architecture.

A memory in the device may comprise a plurality of storage locations that are addressable by the microprocessor(s) and the network interfaces for storing software programs and data structures associated with the embodiments described herein. The microprocessors may comprise necessary elements or logic adapted to execute the software programs and manipulate the data structures, such as a routing table/cache, and a topology configuration. An operating system may optionally be provided, which interacts with the hardware and provide application programming interfaces, though in simple embodiments, an operating system is not required. For example, an embedded Linux, such as BusyBox, may be provided, which provides various functions and extensible software interfaces, portions of which are typically resident in memory and executed by the microprocessor(s). The software, including the optional operating system if present, functionally organizes the node by, inter alia, invoking network operations in support of software processes and/or services executing on the device. These software processes and/or services may comprise routing services, disjoint path process, and a timer. It will be apparent to those skilled in the art that various processor and memory types, including computer-readable media, may be used to store and execute program instructions pertaining to the techniques described herein.

The communication functions, including routing services as may be necessary, are preferably implemented by computer executable instructions executed by the microprocessor(s) to perform functions provided by one or more routing protocols, such as reactive routing protocols (and, e.g., may thus be referred to as "reactive routing services") as will be understood by those skilled in the art. These functions may be configured to manage a routing table/cache containing, e.g., data used to make routing decisions. In particular, as opposed to proactive routing, where connectivity is discovered and known prior to computing routes to any destination in the network (e.g., Optimized Link State Routing, "OLSR", see U.S. Pat. Nos. 7,027,409, 8,483,192 and 8,488,589, expressly incorporated herein by reference, Request for Comment (RFC) 3626 by the Internet Society Network working group), reactive routing (or ad-hoc routing) discovers neighbors (i.e., does not have an a priori knowledge of network topology), and in response to a needed route to a destination, sends a route request into the network to determine which neighboring node may be used to reach the desired destination. Illustrative reactive routing protocols may comprise, inter alia, Ad-hoc On-demand Distance Vector (AODV), Dynamic Source Routing (DSR), DYnamic MANET On-demand Routing (DYMO), etc. Generally, reactive routing protocols may be used to reduce storage and processing requirements on the nodes (e.g., small, distributed, low-power devices, such as sensors), and to limit the number of updates to stored topologies due to the adhoc changing nature of the network (e.g., MANETs).

For example, AODV is a reactive routing protocol (establishes a route to a destination only on demand) that is a distance-vector routing protocol (and uses sequence numbers on route updates to avoid various known problems with distance-vector protocols). In AODV, the network is silent until a connection is needed to transmit data packets to a destination, at which time the node requiring a connection broadcasts a request for connection (a route request, or "RREQ" message). Other nodes forward this request, recording the node from which the request was received, until the destination is reached, or until a node is reached that has a previously learned route to the destination. At that time, a reply (a route reply, or "RREP" message) is returned to the requesting source node backwards along the recorded route, and the requesting node (and any intermediate node) thus learns a route (i.e., the next hop node) to the destination, and stores this information (the next-hop node) in routing table. (Notably, a plurality of routes is often learned, and the requesting node is configured to select a "best" route, such as based on a hop count, cost, etc.). When a link in the network fails, a routing error is passed back to a transmitting node, and the process to learn a route to the destination repeats. Sequence numbers may be used to determine a most recently route, as ad-hoc networks tend to change topology often.

DSR, on the other hand, is another reactive routing protocol that is similar to AODV, however, DSR uses source routing instead of relying on the routing table at each intermediate device. A similar technique using route requests and replies are again used, but now the source node includes the entire path within data packets sent to the destination. In this manner, the intermediate nodes need not store (or update) information in routing tables. Note that each intermediate node may still cache the entire path to the destination (in routing cache), which may be used to reply to a route request quickly, as the intermediate node is aware (at least temporarily) of a path to the requested destination.

A multi-hop, ad-hoc wireless data communications network transmits a packet among different intermediate nodes using multiple hops as it traverses the network from a source node to a destination node. In a TDMA mesh network, the channel time slot can be allocated before the node data is transmitted. The channel transmit time is typically allocated in a recurring slot. The channel time typically is segmented into blocks as an epoch and blocks are divided into slots used by nodes to transmit data. If the data is an isochronous stream, the data can be repeatedly generated and presented at the source node for delivery to a destination node. The data is time dependent and is delivered by a specified time.

When multiple waveforms having different range characteristics are used to transfer data in the network, the OLSR routing mechanism breaks down. This occurs because, in general, each different waveform will result in different network connectivity, i.e., which nodes can receive a particular node's transmissions when using that waveform. For example, if node X and node Y establish a link transmitting on waveforms A and B respectively, those waveforms are an intrinsic characteristic of the link. If node X sends a packet to node Y, but uses waveform C to transmit, the OLSR discovered link may not exist using waveform C, possibly due to range or interference differences between waveforms A and C.

Other protocols include Open Shortest Path First (OSPF), Intermediate-System-to-Intermediate-System (ISIS), Temporally Ordered Routing Algorithm (TORA), Topology Dissemination Based on Reverse-Path Forwarding (TBRPF), Destination Sequenced Distance-Vector (DSDV) (see U.S. Pat. No. 5,412,654, expressly incorporated herein by reference), and Zone Routing Protocol (ZRP) (U.S. Pat. No. 6,304,556, expressly incorporated herein by reference), B.A.T.M.A.N. (Better Approach To Mobile Adhoc Networking), PWRP (Predictive Wireless Routing Protocol), OORP (OrderOne Routing Protocol), (OrderOne Networks Routing Protocol), HSLS (Hazy-Sighted Link State), and IWMP (Infrastructured Wireless Mesh Protocol) for Infrastructured Mesh Networks by UFPB-Brazil. See, U.S. Pat. Nos. 8,578, 015, 8,576,831, expressly incorporated herein by reference.

On devices not capable or configured to store routing entries, the routing process may consist solely of providing mechanisms necessary for source routing techniques. That is, for source routing, other devices in the network can tell the less capable devices exactly where to send the packets, and the less capable devices simply forward the packets as directed. See, U.S. Pat. Nos. 8,630,177, 8,538,458, and 8,619,789, expressly incorporated herein by reference.

In addition, DYMO is a successor to AODV, which shares many of AODV's benefits, but which may be more efficient to implement. DYMO may be a proactive routing protocol and/or a reactive routing protocol. Similarly to AODV (and DSR), DYMO discovers routes as they are needed through two steps: 1. A "Route Request" (RREQ) message is broadcast through the MANET. Each RREQ message maintains an ordered list of all nodes it has passed through, so every node receiving an RREQ message can record a route back to the origin of this message; and 2. When an RREQ message arrives at its destination (or a node aware of a route to the destination), a "Routing Reply" (RREP) message is returned back to the origin, indicating that a route to the destination was found. On its way back to the source, an RREP message can simply backtrack the path of the RREQ message and may allow all nodes through which it passes to record a complementary route back to where it came from. Once the RREP message reaches its destination (i.e., the requesting source node), a two-way route has been successfully recorded by all intermediate nodes, and the exchange of data packets (traffic) may begin.

In other words, regardless of the specific protocol used for reactive routing (AODV, DSR, DYMO), a similar technique may be used to obtain routes to a particular destination, whether that route is stored locally on the intermediate nodes or is transmitted with the data packet. Specifically, the use of general "route request" messages and "route reply" messages may be used, accordingly, to obtain the desired paths through the network.

See, U.S. Pat. Nos. 8,661,500, 8,661,144, 8,661,081, 8,660,139, 8,660,047, 8,655,395, 8,655,369, 8,654,782, 8,654,698, 8,578,054, 8,452,895, 8,441,994, 8,432,820, 8,427,957, 8,392,607, 8,374,165, 8,341,289, 8,335,207, 8,335,164, 8,255,469, 8,238,319, 8,223,710, 8,213,409, 8,203,990, 8,194,541, 8,144,619, 8,121,629, 8,059,578, 8,050,196, 8,041,377, 8,031,720, 8,014,329, 8,009,615, 7,996,558, 7,974,402, 7,969,914, 7,924,796, 7,890,112, 7,886,075, 7,814,322, 7,792,050, 7,742,399, 7,697,459, 7,656,851, 7,626,967, 7,616,961, 7,602,738, 7,590,589, 7,567,547, 7,453,864, 7,346,167, 7,330,694, 7,266,085, 7,251,238, 7,184,421, expressly incorporated herein by reference in their its entirety. See also, Request For Comments 3626: Optimized Link State Routing Protocol (OLSR); Request For Comments 3684: Topology Dissemination Based on Reverse-Path Forwarding (TBRPF); Request For Comments 3561: Ad hoc On-Demand Distance Vector (AODV) Routing; and Request For Comments 4728: The Dynamic Source Routing Protocol (DSR) for Mobile Ad Hoc Networks for IPv4.

In proactive routing, each node stores and updates routing information constantly. The routing tables can be updated based on perceived changes in the network topology.

Therefore, a new transmission can start immediately without a route discovery delay. However, the constant exchange of routing information adds overhead to the protocol. OLSR and TBRPF protocols use proactive routing. The overhead traffic of a proactive routing protocol increases as the mobility of the nodes increases, since the routing information needs to be updated in shorter intervals.

In reactive routing, when a node wishes to transmit, it starts a route discovery process in order to find a path to the receiver. The routes remain valid until the route is no longer needed. AODV and DSR protocols use reactive routing. In the AODV protocol, to find a route to a receiver, a terminal broadcasts a route request message containing the address of the receiver and the lifespan of the message. Terminals receiving the message add their address to the packet and forward it if the lifespan is not exhausted. If a receiver or a terminal knowing the route to the receiver receives the route request message, it sends a route reply back to the requester. If the sender does not receive a route reply before a timeout occurs, it sends another route request with a longer lifespan. The use of sequential route requests with incremental increases in timeout allows a mapping of the network by hop count. See, U.S. Pat. No. 8,600,830, expressly incorporated herein by reference.

FIGS. 5 and 6 illustrate two alternative embodiments for linking the mobile computer to the proximate P2P adaptor. FIG. 5 illustrates a wired connection, while FIG. 6 illustrates a short-range radio connection. FIG. 2 shows a detailed embodiment of a method for a wired connection, whereby the wired connection is made via built-in audio ports of the mobile computer or SmartPhone. Thus, the Smartphone acts as a modem to create and receive analog signals that convey digital data, with only limited control information. Infrared and near-field communication technologies may also be employed.

FIG. 9 represents a more detailed embodiment of a short-range radio connection between a mobile computer and its proximate P2P adaptor, whereby the short-range radio connection is enabled via a Bluetooth (BT) wireless capability that is already built into the mobile computer/SmartPhone. Note that the two users are assumed to be located far apart, so that direct communication between the two users via Bluetooth or WiFi is not feasible. The P2P units enable direct communication between the two computers over an extended range.

A further object is to provide an entire communications system which is compatible with modern data security techniques, including data encryption and user identification. These aspects are included in the method flowcharts for embodiments in FIGS. 2, 7, and 8. The connection may be encrypted end-to-end, for example employing virtual private network (VPN) technology, and/or each link may be separately encrypted or secured based on pre-established encryption keys. More generally, a certificate infrastructure may be implemented, though this typically requires access to an on-line database for authenticating new contacts, and therefore in an ad hoc network with new contacts, a presumption of available Internet connectivity may be false. Absent an on-line authentication, a key exchange protocol may be provided, however, this does not provide authentication of new users. One way to address this problem is to include in each adaptor a private key signed by a trusted entity, such as the manufacturer. While this does not provide affirmative authentication of the corresponding device, it does limit communications to authorized devices, and permits retroactive determination of the identity of the communication correspondent.

Because the data packets may be short, i.e., ~160 characters, Global System for Mobility (GSM) security techniques may also be employed, including but not limited to use of SIM modules. An advantage of conforming to the GSM text message limits is that protocols adhering to those limits may be compatible, and that a store-and-forward protocol may be provided if a communications partner does have cellular service where the originator does not.

A final aspect is that while the specific embodiments presented focus on just two users, the system and method are extendible to more than two users. At least two options for expansion of the network are possible. First, the transmission may be broadcast or multicast, with a plurality of recipients receiving a single communication. The communication in that case may be unencrypted and/or unsecured, or secured and/or encrypted using a multiparty protocol. For example, at commencement of a session, a common encryption key may be negotiated on a control channel, and thereafter, an encrypted broadcast sent over the communication channel. Another option is a store-and-forward architecture resembling a multihop mobile ad hoc network (MANET). However, repeater networks or store-and-forward technologies are limited or prohibited in some circumstances, including the MURS band by FCC regulation, e.g., FCC 47 C.F.R. § 95.1311. Likewise, image communication and bridging to the public telephone network are also prohibited by regulation. However, bridging with a GPRS radio system or other radio band communication, does not appear to be prohibited, and therefore a multiband, multihop communication network may be provided. A particular advantage of alternate band bridging is that the intermediate nodes do not interfere with the primary nodes, providing concurrent communications and full-duplex capability.

A preferred frequency range for operation is in the VHF bands at about 150 MHz-175 MHz. However, the technology is not so limited. For example, the band usage may include 25-50 MHz; 72-76 MHz; 150-174 MHz; 216-220 MHz; 406-413 MHz; 421-430 MHz; 450-470 MHz; 470-512 MHz; 800 MHz; 806-821/851-866 MHz; 900 MHz (896-901/935-940 MHz), which may be used single or concurrently. In one embodiment, the same information is transmitted concurrently on multiple channels in multiple bands; in other cases, different information may be communicated in the different bands. Each band may have different federal licensing issues. Preferably, the processor has a database of the various restrictions, and implements these restrictions automatically. In some cases, this may require location information, and in such case, the transceiver device may comprise a GPS (global positioning system) receiver device. For example, in the "whitespace" vacated by prior incumbent analog television broadcasters, unlicensed use is subject to geographic restrictions. Use of these bands is subject to regulation in the US under parts 90, 91 and 95 of the FCC rules, 47 C.F.R., which are expressly incorporated herein by reference.

FIGS. 10 and 11 illustrate two possible methods for further extending the effective range of sending messages from user 1 to user 2. In FIG. 10, user 3 receives a message from user 1 and relays it to user 2 using its own P2P adaptor, without necessarily saving or reading the message. This represents the concept of a distributed mesh communication network. In FIG. 11, user 3 may be within range of the cell phone network, and transmits the message to user 2 via this network, e.g., by text message, Internet instant messaging, or the like. It should be clear that this can easily be extended to additional users, both with and without access to conventional networks.

The P2P approach presented here represents a backup RF system with performance that may be inferior (in terms of bandwidth and data rate) to that of the primary RF system associated with the device. Further, by offloading communications from the cellular network, privacy may be improved with respect to government and industry eavesdropping, e.g., U.S. National Security Agency, British Intelligence, etc. Because the short-range communications can be fully "off the grid", eavesdropping would require local receivers, necessitating significant infrastructure.

The required hardware is relatively compact and inexpensive, though an external antenna is preferably employed. The device may have great utility during emergency situations where the infrastructure becomes unavailable or overloaded.

For example, the Analog Devices ADF7021-N provides a narrowband transceiver IC which supports digital communications in various bands, including the GMRS, FRS and MURS bands. See Analog Devices Application Note AN1285. Baseband radio devices are also available, e.g., CMX882 (CML Micro), which is a full-function half-duplex audio and signaling processor IC for FRS and PMR446 type facilities. For advanced and enhanced radio operation the CMX882 embodies a 1200/2400 bps free-format and formatable packet data FFSK/MSK modem (compatible with NMEA 0183) for Global Positioning by Satellite (GPS) operations. In the Rx path a 1200/2400 bps data packet decoder with automatic bit-rate recognition, 16-bit framesync detector, error correction, data de-scrambling and packet disassembly is available. The CMX838 and CMX7031/CMX7041 also supports communications over FRS and MURS. See also, CMX7131 and CMX7141 (Digital PMR (DPMR) Processors), CMX7161 (TDMA Digital Radio Processor), CMX7861 (Programmable Baseband Interface), CMX8341 (Dual-mode Analogue PMR and Digital PMR (dPMR®) Baseband Processor), CMX981 (Advanced Digital Radio Baseband Processor).

A preferred embodiment of the technology provides a self-contained device having a local, short range wireless (e.g., Bluetooth or WiFi) or wired link (USB 2.0 or 3.0), which communicates a data stream, as well as high level control information, such as destination, mode (point-to-point communication, multicast, broadcast, emergency, etc.), and other information. The device typically includes a battery, for example to power the device even in event of an emergency. The device includes a long range (e.g., up to 8-20 miles), relatively low data rate transceiver and associated antenna and/or antenna coupler. A modem circuit is provided to convert a data stream into a modulated radio frequency signal, and to demodulate a received modulated radio frequency signal into a data stream. A processor is provided to create and receive the data stream, as well as provide low level control to the modem circuit and radio frequency transmitter, such as to autonomously communicate over a control channel, packetize the data to include identifying, routing and control headers. The device may also include one or more sensors, such as GPS, temperature, pressure, seismology (vibration), movement, etc. Typically, the device will have a simple user interface, such as an on-off switch, and micro-USB data/charging port.

The device uses a proprietary protocol for managing the band(s) and channel usage. Preferably, the protocol requires only a single concurrent radio channel, and thus a radio communicates over a common control channel until data communications are initiated, and then the radio switches to another channel in the band for data communications, and thereafter switches back to the control channel.

Thus, a preferred one of the channels in the band is used as a control channel. On this channel, each device listens for data packets that reference it, either individually or as part of a defined group, or in cases of multihop mesh network, packets which the respective node could forward. The device also maintains a table of all nodes in communication range and/or a full or partial history of prior contacts, based on a proactive (transmission of information before a need arises) and/or reactive (transmission of information on an as-needed basis) protocol. The device may broadcast transmit a packet periodically to other devices, to help establish their respective tables, or seek to establish a network at the time a communication is required. The system may conserve power by powering down for most of the time, and activating the radio functions in a predetermined and predictable window of time. For example, if GPS is provided, a common window of 1 millisecond per 10 seconds may be provided for signaling. (Though the GPS receiver may consume some amount of power). Other types of synchronization are possible, such as a broadcast time signal with micropower receiver. If a signal is present during a predetermined window, the radio remains on to listen for the entire message or set of messages. This permits a low duty cycle, and therefore reduced power consumption.

The processor within the device controls all communications on the control channel, and typically does so autonomously, without express control or intervention by the control signals received through the short range communication link, e.g., from the smartphone app. If communications on the preferred control channel are subject to interference, a secondary control channel may be used. In some cases, a separate control channel or algorithm for switching to other control channels may be provided for each communication band.

Typically, the control channel initially communicates a request to send (RTS) message. Routing information is communicated in response to the RTS, and thus the protocol acts in a responsive manner. A clear-to-send (CTS) response from a target is used to acknowledge the RTS. The receiver is preferably a hybrid system where the channel has both contention and non-contention periods. Non-contention periods are established once a RTS/CTS handshake is completed between the sending and receiving nodes, and the amount of time the medium will be busy is specified. During this period, there is no need for non-involved modules to actively monitor the channel. At the expiration of this time period, each user wanting to send a packet executes a back-off counter, such that the immediate contention for the channel once free is limited. Monitoring of the channel can occur beginning right after the expiration of the specified "busy period" of the RTS/CTS or sometime prior to the back-off counter decrementing to zero. Since the system operates without a centralized entity, a timeslot allocation protocol, if employed, must be decentralized. Because such decentralized coordination protocols may consume significant bandwidth on the control channel, they are disfavored. After a packet is successfully received, an acknowledgement (ACK) packet is sent, and/or after a corrupt packet is received, an Automatic Repeat reQuest (ARQ) is sent. Note that the RTS, CTS, ACK, and ARQ packets may include less information than that available within the packet by protocol; therefore other information may piggyback on these packets. Each packet preferably uses a Reed Solomon cyclic redundancy check (CRC) to detect errors, though more complex error checking and error correction may be employed. A hybrid ARQ with retransmission and possibly incremental redundancy with soft combining may also be used. If operation is on multi-bands, then frequency-hopping and possibly some time-hopping may be employed, depending on the nature of the interference and the traffic. The forward error code (Reed Solomon CRC) will also provide some robustness to interference.

A collision sensing technology may also be provided, with random delay retransmit in case of collision, and a confirmation packet sent to confirm receipt. In such a scenario, predetermined timeslots would be disrupted, but in cases of interference, such presumption of regularity is violated in any case. In some cases, the confirmation packet may include an embedded response, such as routing information. The basic protocol may include not only error detection and correction encoding, but also redundant transmission, over time, especially when impaired channel conditions are detected. That is, the data communications and control channel communications may include an adaptive protocol which optimizes the throughput with respect to channel conditions, communications community, and/or network topology, and therefore adopt different strategies for balancing efficient channel usage and reliability. It is generally preferred that the control channel have a range and reliability in excess of normal communication channels, and thus may operate at a higher power, lower modulation rate (in order to provide a more robust signal), or with enhanced error detection and correction, and perhaps redundancy.

In some cases, such as in a densely populated region with multiple operative nodes, it may be desirable to limit (restrict) effective communication range and therefore have greater spatial channel reuse and reduced mutual interference. In such cases, the system may be operated using aggressive modulation schemes, such as 16-QAM, 64-QAM or 256-QAM, which would provide limited range and therefore higher spatial channel reuse. Another aspect of the technology is the effective use of a shared channel subject to interference by non-cooperate users as an automated digital communication command and control channel. In such an environment, each node of the network should listen to the channel for digital communications, analog (voice) communications, and various types of interference, before transmitting. In a network subject to competing non-cooperative use, it is often a better strategy to cease competing usage (back off) and permit the non-cooperative use to complete successfully, than to interfere with that usage while not successfully achieving efficient communications. In some cases, if competition for channel usage is significant and enduring, then an alternate control channel may be used instead of a preferred one. Further, by employing a predetermined and shared algorithm between devices, complex interference mitigation schemes, such as band-switching.

It is therefore an object to provide a radio frequency digital communication system, comprising: a power supply; a communication port configured to communicate first digital data with a computational device proximate to the radio frequency digital communication system; at least one automated processor configured to communicate the first digital data through the first communication port; and a radio frequency transceiver configured to communicate with at least one corresponding radio frequency digital communication system, under control of the at least one automated processor, according to a protocol which comprises: selecting a radio frequency control channel; at least one of listening for and broadcasting a message comprising at least one radio frequency digital communication system identifier on the radio frequency control channel; at least one of sending to and receiving from the at least one corresponding radio frequency digital communication system, an acknowledgement of receipt of the message on the control channel, and further selecting a data communication channel distinct from the control channel for further communication of second digital data between the radio frequency digital communication system and the at least one corresponding radio frequency digital communication system, the second digital data corresponding to the first digital data; and communicating the second digital data between the radio frequency digital communication system and the at least one corresponding radio frequency digital communication system over the selected data communication channel.

The power supply may comprise a rechargeable battery, and a battery charging control circuit. The battery charging circuit may comprise an inductively coupled battery charger. The communication port may comprise at least one of a low energy Bluetooth 4.0 communication port, a universal serial bus port, a Zigbee communication port (IEEE 802.15.4), a Z-wave communication port, a WiFi communication port (IEEE 802.11x), and an Insteon communication port.

The at least one processor may have an associated non-volatile reprogrammable memory, and wherein the protocol is defined in accordance with instructions stored in the non-volatile reprogrammable memory.

The radio frequency transceiver may communicate in a band selected from the group consisting of the Multiple-Use Radio Service band (151 MHz, 154 MMz), Family Radio Service (FRS) band (462 MHz, 467 MHz), General Mobile Radio Service (GMRS) band (462 MHz, 467 MHz), PMR446, band, LPD433 band, Citizens Radio band (CB 27 MHz, 49 MHz), and 900 MHz band (902-928 MHz ISM). The radio frequency transceiver may be configured to operate in at least two different bands, either at different times, or concurrently.

The control channel may be a dedicated channel, and the selected data communications channel is selected from a plurality of available data communications channels. The protocol may further employ communication on the control channel for defining a cryptography employed in communications on the selected data communication channel.

Communications on the control channel and/or the data communication channel may comprise packetized digital data having a predetermined maximum length. The message and/or packetized digital data may comprise at least one error detection code or an error detection and correction code. The protocol may further comprise analyzing of a received packet for presence of errors at least in dependence on the at least one error detection code, sending a request for retransmission of the packetized digital data if the packetized digital data is not successfully received, and upon receipt of the request for retransmission, retransmitting the packetized digital data. The protocol may further comprise counting a number of transmissions of a packet of packetized digital data, and in dependence on the number, switching to a different data communication channel and/or changing at least one parameter of the radio frequency transceiver to improve data communication reliability. In case of a high reliability with a low number of errors, the protocol may adapt at least one parameter of the radio frequency transceiver to improve a data communication speed or efficiency.

The protocol may further comprise storing received second digital data and retransmitting the received second digital data on a selected data communication channel. The protocol may be adapted to control communications through a mesh network.

The radio frequency transceiver may be configured to determine a time of arrival of packetized digital data or a time difference of arrival of packetized digital data from different sources, and the at least one processor may be configured to determine location information in dependence on the determined time of arrival or time difference of arrival. Communicated information, e.g., the message and/or the digital data may comprise location information, for example a location of the transmitter or origin of the communication.

The communication port may be configured to communicate with a computing device configured to define a text message and an identification of a corresponding radio frequency digital communication system intended as a recipient of the text message.

The first digital data may comprise a Transmission Control Protocol of the Internet Protocol (TCP/IP) packet stream, and the second digital data may comprises encapsulated Transmission Control Protocol of the Internet Protocol (TCP/IP) communications, thus permitting, e.g., bridging of networks.

The at least one processor may be associated with program instructions which enforce compliance with U.S. Federal Communication Commission rules for use of the radio frequency control channel and the data communication channel, for example MURS rules prohibit store and forward operation, repeaters, and connection to the public telephone network.

The at least one automated processor may be provided with an emergency mode of operation which communicates autonomously without continued dependence on receipt the first digital data. Likewise, the at least one automated processor may be configured to detect emergency mode transmissions from the corresponding radio frequency digital communication system, and to produce an output without dependence on receipt of the at least one radio frequency digital communication system identifier.

Another object provides a communication system, comprising: two radio frequency transceivers, each transceiver comprising a transmitter, a receiver, and an antenna, each radio frequency transceiver being proximate to a digital computer, wherein the two radio frequency transceivers bidirectionally communicate digital data; each transceiver being configured to: receive a digital signal from the respective proximate digital computer, modulate the digital signal onto a radio frequency carrier signal, and transmit the modulated radio frequency signal through the respective antennas to the other transceiver; and each transceiver being further configured to: receive the modulated radio frequency signal from its respective antenna, demodulate the radio frequency signal to recover the digital signal, and to send the recovered digital signal to the respective proximate digital computer.

A still further object provides a radio frequency digital communication method, comprising: communicating first digital data between a memory and a proximate computational device; and communicating with at least one corresponding radio frequency digital communication system, under control of the at least one automated processor, according to a protocol which comprises: selecting a radio frequency control channel; at least one of listening for and broadcasting a message comprising at least one radio frequency digital communication system identifier on the radio frequency control channel; at least one of sending to and receiving from the at least one corresponding radio frequency digital communication system, an acknowledgement of receipt of the message on the control channel, and further selecting a data communication channel distinct from the control channel for further communication of second digital data between the radio frequency digital communication system and the at least one corresponding radio frequency digital communication system, the second digital data corresponding to the first digital data; and communicating the second digital data between the radio frequency digital communication system and the at least one corresponding radio frequency digital communication system over the selected data communication channel.

Another object provides a method for communicating a digital message from a first computer to a second computer, the distance between the first computer and the second computer being at least 200 meters, comprising: receiving and encoding the digital message from the first computer via a first radio frequency path; attaching an identification tag to the encoded digital message to form a formatted message; modulating the formatted message onto a radio frequency carrier within a radio band shared with non-cooperative users; transmitting the modulated formatted message from an antenna through the air via a second radio frequency path; receiving the transmitted modulated formatted message at a second antenna; demodulating the modulated formatted message and recovering the identification tag; determining if the identification tag corresponds to predetermined targeting information, and if it does not correspond discarding the formatted message, and if it does correspond decoding the encoded message; and communicating the decoded message to the second computer via a third radio frequency path.

A further object provides a communication system, comprising: (a) a communication device, comprising: (1) a digital radio frequency communication system configured to wirelessly transmit messages comprising first digital data addressed based on targeting information in a first mode of operation, and to wirelessly receive messages comprising second digital data in a second mode of operation; (2) an automated processor, configured to: (i) receive the first digital data and targeting information in the first mode of operation, control the digital radio frequency communication system to establish a first communication session with a target corresponding to the targeting information, and to transmit the first digital data to the target; and (ii) control the digital radio frequency communication system in a second mode of operation to establish a second communication session with a source, and to receive second digital data from the source; and (b) a computer readable medium, configured to store therein computer executable program instructions, which cause an automated programmable device to: (1) generate a user interface for interaction with a human user; (2) control communication of the first digital data to the communication device; (3) define the transmission targeting information, having at least one mode of operation in which the transmission targeting information is derived by a user selection, through the generated user interface, of an entry from an address book containing at least telephone numbers, and in which a human editable label comprises the transmission targeting information communicated to the communication device; and (4) present the second digital data received from the communication device to the human user.

The communication device may further comprise a communication port configured to transfer at least the first digital data, the second digital data, and the targeting information between the automated programmable processor and the communication device, wherein the communication port employs a distinct physical communication channel from the digital radio frequency communication system. The communication port comprises a communication port selected from the group consisting of a Bluetooth communication port, a Universal Serial Bus port, a Zigbee communication port, a Z-wave communication port, a WiFi communication port, and an Insteon communication port.

The communication device may be further configured to receive reception addressing information from the automated programmable device under control of the computer executable program instructions, which represents an address of the communication device to which communications may be targeted; and the automated processor may be further configured, in the second mode of operation, to selectively receive or filter the second digital data based on whether the second communication session comprises second digital data targeted to the communication device and having an address representing the reception addressing information.

The communication device may be further configured, in the first mode of operation, to announce, on a shared control channel, information corresponding to the targeting information, to establish the first communication session, and to transmit the first digital data over a first data communication channel distinct from the shared control channel.

The communication device may be further configured, in the second mode of operation, to listen, on a shared control channel, for information corresponding to an address of the communication device, to establish the second communication session, and to receive the second digital data over a second data communication channel distinct from the shared control channel.

The communication device may be further configured to: in the first mode of operation, announce, on a shared control channel, information corresponding to the targeting information, establish the first communication session, and transmit the first digital data over a first data communication channel distinct from the shared control channel; and in the second mode of operation, listen, on a shared control channel, for information corresponding to an address of the communication device, to establish the second communication session, and receive the second digital data over a second data communication channel distinct from the shared control channel, wherein the first and second data communication channels may be the same or different.

The communication device may be further configured to at least one of persistently store the second digital data and retransmit the second digital data.

The automated processor of the communication device may be configured to operate according to firmware stored in rewritable memory, the firmware being updatable by rewriting the rewritable memory.

The firmware may control a communication protocol employed in the first mode of operation and the second mode of operation, and the computer executable program instructions may further cause the automated programmable device to control a transfer of updated firmware for storage in the rewritable memory, received from a central server communicating with the automated programmable device through a physical communication channel distinct from the digital radio frequency communication system.

The communication device may comprise a power supply configured to receive power from a battery and to power the radio frequency communication system and the automated processor; and a housing, configured to surround and protect at least the radio frequency communication system, the automated processor, and the battery.

The first mode of operation may further comprise: selecting a radio frequency control channel; broadcasting a message comprising the targeting information on the radio frequency control channel and information defining a radio frequency data communication channel distinct from the radio frequency control channel; transmitting the first digital data over the radio frequency data communication channel; receiving an acknowledgment of receipt of the first digital data.

The digital radio frequency communication system may communicate in at least one band selected from the group consisting of the Multiple-Use Radio Service (MURS) band (151 MHz, 154 MHz), Family Radio Service (FRS) band (462 MHz, 467 MHz), General Mobile Radio Service (GMRS) band (462 MHz, 467 MHz), PMR446, band, LPD433 band, Citizens Radio band (CB 27 MHz, 49 MHz), and 900 MHz band (902-928 MHz ISM).

The digital radio frequency communication system may be further configured to employ a cryptographic security algorithm to encrypt communications.

The first communication session and the second communication session each communicate through packetized digital data, and support retransmission of. packetized digital data if not correctly received.

The second digital data may comprise location information, the automated processor being further configured to adapt the first communication session in dependence on received location information.

The automated processor may be controlled in accordance with program instructions which enforce compliance with government regulatory authority rules dependent on a location of the communication device.

The automated processor may be further configured to bridge the first communication session and the second communication session according to a mesh network communication protocol.

It is another object to provide a communication system, comprising: (a) a communication device, comprising: (1) a communication port configured to receive first digital data and transmission targeting information in a first mode of operation, to transmit second digital data in a second mode of operation, and to receive a firmware update in a third mode of operation, through a communication link adapted to communicate with an automated programmable device; (2) a digital radio frequency communication system configured to wirelessly transmit messages comprising the first digital data addressed based on the targeting information in the first mode of operation; (3) a reprogrammable memory configured to persistently store firmware; (4) at least one automated processor, operating according to updatable firmware, configured to: (i) control the communication port to receive the first digital data and targeting information in the first mode of operation; (ii) control the communication port to transmit the second digital data in a second mode of operation; (iii) control the communication port to receive the firmware update in the third mode of operation, and to store the firmware update in the reprogrammable memory; (iv) control the digital radio frequency communication system to: (I) communicate according to a communication protocol defined by the firmware stored in the reprogrammable memory, (II) to transmit information over a shared control channel to establish a first communication session, and (III) to transmit the first digital data addressed based on the targeting information over a first data communication channel distinct from the shared control channel, to transmit the first digital data; and (v) control the digital radio frequency communication system to: (I) communicate according to the communication protocol defined by the firmware stored in the reprogrammable memory, (II) receive information over the shared control channel, to establish a second communication session, (III) receive the second digital data over a second data communication channel distinct from the shared control channel, wherein the first and second data communication channels may be the same or different, and (IV) persistently store a plurality of received second data in the reprogrammable memory, and (b) a computer readable medium, which stores therein computer executable program instructions, which cause the automated programmable device to: (1) generate a user interface for interaction with a human user to: (i) define the first digital data for communication through the communication port to the communication device; (ii) define the transmission targeting information, having at least one mode of operation in which the transmission targeting information may be derived by a user selection of an entry from an address book containing at least telephone numbers, and in which a respective telephone number comprises the transmission targeting information communicated through the communication port to the communication device; and (iii) present the second digital data received through the communication port from the communication device to the human user; (2) communicate the defined first digital data and the defined transmission targeting information through the communication link to the communication device; and (3) communicate the second digital data through the communication link from the communication device.

The communication port may be further configured to receive reception addressing information; the at least one automated processor may be further configured to receive information over the shared control channel, having an address corresponding to the reception addressing information, to establish a second communication session, and persistently store the reception targeting information in the reprogrammable memory; and the computer executable program instructions may further cause the automated programmable device to generate the user interface to define the reception addressing information, having at least one mode of operation in which the reception targeting information represents a telephone number of the automated programmable device, and communicate the reception targeting information through the communication link to the communication device.

A still further object provides a communication method, comprising: (a) receiving first digital data and targeting information; (b) controlling, with an automated processor, a digital radio frequency communication system to establish a first communication session with a target corresponding to the targeting information in a first mode of operation; (c) wirelessly transmitting messages comprising the first digital data addressed based on the targeting information in the first mode of operation; (d) controlling, with the automated processor, the digital radio frequency communication system in a second mode of operation to establish a second communication session with a source; (e) wirelessly receiving second digital data from the source in the second mode of operation through the digital radio frequency communication system; (f) providing a computer readable medium, configured to store therein computer executable program instructions, which control an automated programmable device for: (1) generating a user interface for interaction with a human user; (2) controlling communication of the first digital data to from the automated programmable device to the digital radio communication system; (3) providing at least one mode of operation in which the transmission targeting information is defined by receiving a user selection, through the generated user interface, of an entry from an address book containing at least telephone numbers, and in which a human editable label comprises the transmission targeting information communicated to the digital radio frequency communication system; and (4) presenting the second digital data received from the digital radio frequency communication system to the human user.

The method may further comprise providing a communication port configured to transfer at least the first digital data, the second digital data, and the targeting information between the automated programmable processor and the automated processor, wherein the communication port employs a distinct physical communication channel from the digital radio frequency communication system.

The method may further comprise receiving, by the automated processor, reception addressing information from the automated programmable device under control of the computer executable program instructions, which represents an address of the communication device to which communications may be targeted; and selectively receiving or filtering the second digital data by the automated processor, based on whether the second communication session comprises second digital data targeted to the communication device and having an address representing the reception addressing information.

The method may further comprise in the first mode of operation, announcing, on a shared control channel, information corresponding to the targeting information, to establish the first communication session, and transmitting the first digital data over a first data communication channel distinct from the shared control channel. The method may further comprise, in the second mode of operation, listening, on a shared control channel, for information corresponding to an address of the digital radio frequency communication system, to establish the second communication session, and receiving the second digital data over a second data communication channel distinct from the shared control channel. The method may further comprise in the first mode of operation, announcing, on a shared control channel, information corresponding to the targeting information, establishing the first communication session, and transmitting the first digital data over a first data communication channel distinct from the shared control channel; and in the second mode of operation, listening, on a shared control channel, for information corresponding to an address of the communication device, establishing the second communication session in dependence on the listening, and receiving the second digital data over a second data communication channel distinct from the shared control channel, wherein the first and second data communication channels may be the same or different.

The method may further comprise at least one of persistently storing the second digital data and retransmitting the second digital data.

The automated processor may be configured to operate according to firmware stored in rewritable memory, further comprising updating the firmware by rewriting the rewritable memory. The firmware may control a communication protocol employed in the first mode of operation and the second mode of operation, further comprising: receiving updated firmware from a central server through a physical communication channel distinct from the digital radio frequency communication system, defining an updated protocol; controlling a transfer of the received updated firmware for storage in the rewritable memory; and operating the first mode of operation and second mode of operation according to the updated protocol.

According to various embodiments of the technology, a smartphone or other telephony communication device, having an address book storing contact information, including telephone contact information for other people and their telephone device, is provided with an "app", i.e., a narrow purpose program designed to operate within the limited environment of the smartphone. The "app" accesses the address book, and uses relatively arbitrary strings of information from the telephone address book, as address/targeting information for non-telephone purposes. For example, a telephone number is relatively unique, and has large consistency. Therefore, a North American Numbering Plan (NANP) telephone number may be borrowed from the address book to define the address of the separate communication device according to the present technology, thus provided a consisting contacting scheme. In that case, the telephone number, or in other cases, email address or name, for example, are broadcast as a station identifier. Each device, in turn, is programmed by the respective owner/user to respond to a respective string, such as the associated telephone number of the smartphone which operates the transceiver. A two factor or out of band scheme may be employed to pair communication devices, for example security codes transmitted in a different communication modality., such as SMS text message, voice telephone, email, IP packet communication to the "app", etc. Therefore, after communications between respective pairs of communication devices are authorized (or open/unrestricted communications are authorized), a user may conveniently select a respective contact from a pre-existing address book of the smartphone, and "dial" the number in the control "app", which then uses the telephone number of the proposed counterparty as a transmitted address. The receiving party listens for its own telephone number to be broadcast, and upon receiving a control channel broadcast of the number, responds to the communication.

The address book may be used to look up a station identifier, to reveal various stored information about the corresponding network node. Therefore, when a communication is received from a remote transmitter with its identifier, such as an NANP telephone number, which can then be relatively uniquely looked up on an address book, or perhaps searched through an external database (such as Google).

In some cases, two parties to a communication are previously unknown to each other, or otherwise prefer to remain anonymous. In that case, the address/targeting information is typically not derived from an address book, though an identifier for the communication counterparty may be stored in the address book with a user-created identification or label. In that case, the address/targeting information will be a random code or perhaps a user-defined alias. However, the address/targeting information in that case need not be editable or even human comprehensible (unless and until the anonymity is breached or relinquished). In order to establish an anonymous or new contact, a number of schemes are provided. In one case, a mode of broadcast is provided in which an unaddressed or open addressed communication is sent, and willing recipients are free to respond. In another case, a cellular network or the Internet may be used to locate communication devices (or their respective associated smartphones) which are within communication range. A central network resource may then pass communication details or coordinates to the smartphone, which ca be used to control the communication device to establish the commmunication. Again, in that mode of operation, the address book of the smartphone is not or need not be particularly involved in establishing the communication. However, a particular advantage of the communication device is that it permits operation of the system when cellular networks or the Internet is unavailable, and therefore a decentralized protocol for finding neighboring communication devices and establishing communications with them is provided. In the anonymous mode, a communication device broadcasts its availability and identifier, which in that case is non-identifying. In other cases, the broadcast identity is identifying, such as a NANP telephone number, IP4 or IP6 address, email address, or the like. It is noted that in an off-the-grid mode, a new telephone number is essentially anonymous; however, after grid communications are reestablished, the identifiers may be looked up, thus de-anonymizing the prior communication.

The system can also support group communications. In that case, the communication device is set to a mode where it responds to communications not intended for a single communications target and transmissions are broadcast for multiple intended recipients. Typically, group communications are unencrypted, though secure key distribution schemes may be used to distribute secret keys to members of a group, with subsequent encrypted broadcast communications.

According to another embodiment, the address/targeting information is fixed or non-human editable, arbitrarily or randomly assigned. For example, each communication device may be factory programmed with a global identification number (GID) or the GID may be implemented in the firmware, which can be customized for each respective communication device. For example, each communication device may have a secure memory such as a "trusted platform module" (TPM), that manages cryptographic keys, which are in turn preassigned or generated according to various known types of cryptographic schemes. In that case, the address/targeting information may correspond to the public key of an asymmetric key pair, and that same key pair may be used to implement secure communications. Typically, a full suite of SSL/TLS cryptographic functions is not required, though this can be implemented either wholly within the communication device, or with assistance of the smartphone device.

In order to prevent or detect spoofing (false reporting of address), cryptographic protocols may be employed. For example, a label assumed by a user for his own smartphone/communication device may be signed by a central authority, with the self-authentication code communicated with the label. A recipient of the communication can verify, offline, the authenticity of a label by verifying the label against the digital signature. This scheme requires that labels be established or changed while the smartphone (or the communication device, in some cases) has Internet or other connectivity to a central authority. Where users are known to each other, they may have already exchanged public keys, and therefore central involvement in spoofing detection would not be necessary.

In one mode of operation, a communication device ignores or simply does not listen to or receive communications not targeted to it. In another mode, streams of packet communications are received, and buffered. This facilitates a repeater/mesh network mode of operation (which may be restricted by regulation), to extend the range of the devices. The filtering may be performed within the communication device, or the received data transferred to the smartphone and the filtering/processing performed in the "app". It is noted that as used herein, an "app" may be a service, or embedded within the smartphone operating system, and therefore the technology is not limited to lowest privilege level user interface applets.

The communication device typically has electrically reprogrammable (flash) memory to store packets before transmission, received packets, address and targeting information, and firmware providing instructions including protocol definition for the automated processor in the communication device. Advantageously, all communication devices employ updated and consistent firmware, though custom devices may be provided. The app, as part of a smartphone environment, can download the latest firmware, and automatically update the communication device, so that all communication devices support interoperable protocols, and the number of versions of the protocol that need to be concurrently supported is limited. In some cases, there may be alternate firmwares and associated protocols, which may be selected by a user according to need and environment. For example, a GPS derived location in the smartphone can inform the "app" which protocol is most appropriate for the operating environment (e.g., city, suburban, rural, mountain, ocean, lake, weather effects, emergency conditions, user density, etc.). In order to limit the required storage for various protocols within the communication device, these may be loaded as needed from the smartphone.

The communication device may be part of, or linked to, the "Internet of Things" (IoT). Typically, in an IoT implementation, the goal is to provide communications for automated devices. According to one embodiment, the communication device may be the same hardware as described in prior embodiments. However, in that case, the firmware may provide a different communication protocol and other aspects of operation, and instead of a smartphone-type control device, the data source or sink may or may not have a human user interface, and typically controls the data communications in an autonomous manner. The system may incorporate energy harvesting, especially when transmissions are bursty with low duty cycle, i.e., less than 0.1%, with a 2 watt output (average 2 mW).

The IoT control device or smartphone can, in addition to communicating data and address information, can also manage power (read battery level, control transmission power, manage duty cycles and listening periods, etc.). Based on estimated power remaining and predicted charging cycles, the system can optimize consumption and usage to achieve continuous operation. The control device can also warn the user through the user interface when a recharge cycle is required.

It is another object to provide a communication device, comprising a communication port, a non-volatile rewritable memory, a digital radio frequency transceiver, and an automated processor, the automated processor controlling the device and being configured to: control the communication port to at least receive a device identifier; an operating mode, and data defining an outbound message; and to transmit data defining a received inbound message; store and retrieve from the memory at least the device identifier; the operating mode, the data defining the outbound message; and data defining the received inbound message; analyze the received inbound message to extract routing data comprising location and identity of each respective forwarding transceiver and storing the locations and identities in the rewritable memory; store information in the rewritable memory comprising at least one of a signature of the received inbound message, a content of the received inbound message, and the received inbound message; compare the stored information with information derived from a prior received inbound message to determine whether the prior received inbound message represents the same message as the received inbound message; and control the digital radio frequency transceiver to transmit a modified version of the received inbound message having appended a geographic location and identifying information of the communication device, selectively in dependence on at least: the extracted routing data comprising location and identity of each respective forwarding transceiver, the comparing, and an operating mode.

It is also an object to provide a communication method, comprising: providing a communication port, a non-volatile rewritable memory, a digital radio frequency transceiver, and an automated processor; controlling the communication port to at least receive a device identifier; an operating mode, and data defining an outbound message; and to transmit data defining a received inbound message; storing in and retrieving from the memory at least the device identifier; the operating mode, the data defining the outbound message; and data defining the received inbound message; analyzing the received inbound message to extract routing data comprising location and identity of each respective forwarding transceiver and storing the locations and identities in the rewritable memory; storing information in the rewritable memory comprising at least one of a signature of the received inbound message, a content of the received inbound message, and the received inbound message; comparing the stored information with information derived from a prior received inbound message to determine whether the prior received inbound message represents the same message as the received inbound message; and controlling the digital radio frequency transceiver to transmit a modified version of the received inbound message having appended a geographic location and identifying information of the communication device, selectively in dependence on at least: the extracted routing data comprising location and identity of each respective forwarding transceiver, the comparing, and an operating mode.

The rewritable memory may be configured to store an ad hoc network routing table derived from at least the location and identity of each respective forwarding transceiver, a time of receipt, and embedded routing information for a plurality of received messages.

The automated processor may be further configured to determine a route to a destination for the modified version of the received inbound message based on at least the ad hoc network routing table, and to include within the transmitted modified version the route.

The automated processor may be configured to determine that a route to a destination of the modified version of the received inbound message is unknown based on at least the ad hoc network routing table, and to include an unknown route indicator within the transmitted modified version the route.

The automated processor may be configured to include at least a portion of the ad hoc network routing table in the transmitted modified version.

The automated processor may be configured to determine a size of the modified version of the received inbound message, and to include at least a portion of the ad hoc network routing table in the transmitted modified version in dependence on the determined size.

The automated processor may be further configured to control the digital radio frequency transceiver to transmit at least a portion of the ad hoc network routing table and the location and identification of the communication device.

The transmission of the at least a portion of the ad hoc network routing table and the location and identification of the communication device may be based on at least one of: a time since last transmission, a demand for use of a communication channel, at least one of a change and a predicted change in a state of an ad hoc network described by the ad hoc networking table.

Further details of these and other embodiments are presented below.

BRIEF DESCRIPTION OF THE DRAWINGS

The present disclosure will be more readily understood from the detailed description of exemplary embodiments presented below considered in conjunction with the attached drawings, of which:

FIG. 13 shows a schematic diagram of the communication device.

FIG. 14 shows a schematic diagram of the telephony device and the communication device.

FIG. 16A shows a flowchart for operation of the communication device.

It is to be understood that the attached drawings are for purposes of illustrating the concepts of the invention.

DETAILED DESCRIPTION OF THE PREFERRED EMBODIMENTS

Software packages can be added to users' existing computers and mobile phones and enable them to transmit small data packages (text, GPS coordinates, sensor data, asynchronous voice, multimedia, or any other digital data hereafter referred to as "messages"). A transceiver module is further provided to receive the small data packages (packets) to directly communicate them to each other through a direct connection or indirectly through a mesh network (multihop network or multihop ad hoc network), without reliance on external infrastructure.

Figure 1:
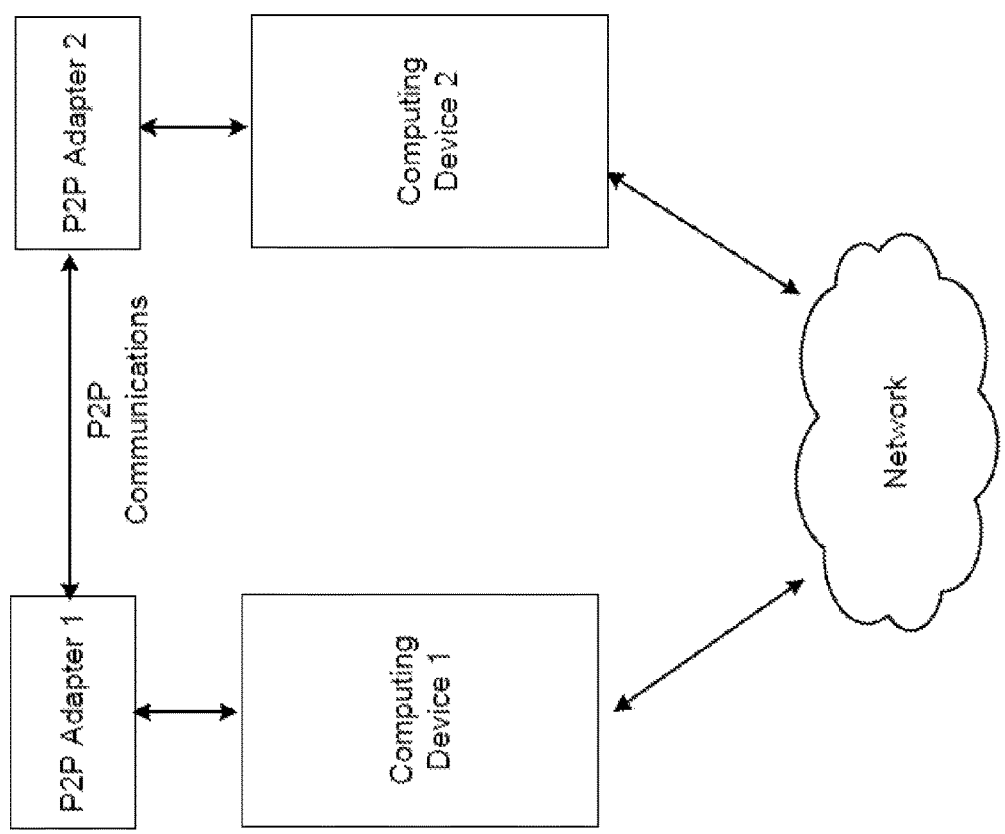
FIG. 1 is an example block diagram of systems for enabling private and point-to-point communication between computing devices in accordance with embodiments of the present invention.

FIG. 1 is an example block diagram of systems for enabling computers and mobile phones to communicate data packages in accordance with embodiments of the present invention. FIG. 1 includes a network (indicated in the figure by a cloud), computing devices 1 and 2, and P2P adapters 1 and 2. The network may be, for example, the Internet, a cellular telephone network, a metropolitan area network (MAN), a Wide area network (WAN), a wireless local area network, a local area network (LAN), personal area network (PAN), campus area network (CAN), or the like. Computing devices 1 and 2 may be a communication endpoint such as a consumer workstation, a server, a computer, a portable electronic device, an entertainment system configured to communicate over a network, such as a set-top box, a digital receiver, a digital television, a mobile phone, or other electronic devices. For example, portable electronic devices may include, but are not limited to, cellular phones, portable gaming systems, portable computing devices, or the like.

The P2P adapters 1 and 2 may include software and hardware packages for enabling private and point-to-point (P2P) communication between computing devices. As used herein, the P2P adapters 1 and 2 may also be referred to as the "device." Also, as used herein, P2P communications refers to a communications connection between two endpoints or computing devices.

As shown in FIG. 1, the computing devices 1 and 2 may communicate with each other via the public network. The P2P adapters 1 and 2 may enable the computing devices 1 and 2 to communicate with each other via P2P or via a private network.

In a preferred embodiment, the P2P adaptors may be of particular use when the public network is unavailable or ineffective. For example, computing devices 1 and 2 may both be located in a remote location that is too far from a cell tower or other central router, yet within range of each other. Alternatively, the external infrastructure may be impaired due to a power outage or a widespread disaster. In these cases, direct P2P communication may provide the only practical method of communication between computing devices 1 and 2.

It is to be assumed in FIG. 1 that computing devices 1 and 2 may be relatively far from each other, at distances greater than about 100 m, so that they are not directly linked by a local-area network technology such as WiFi, 802.11 a/b/g/n. It is further assumed that computing device 1 is close to P2P adaptor 1 (and similarly for device 2 and adaptor 2), and that they may be linked by a short-range wired or wireless connection. Therefore, the P2P communications must cover a distance of greater than about 100 m, without a direct wired connection. Similarly, the connection of each computer to the network may comprise, at least in part, a long-distance wireless link.

It is not required that P2P communication between computing devices 1 and 2 maintains all of the functionality of communication via the regular communication network. For example, communication via the network typically comprises signals with data rates in excess of 1 Mb/s, suitable for transmission of large data files, streaming video, and the like. In contrast, communication via the P2P adaptors may in some cases be limited to low data rates of order 100 kb/s or 9.6 kb/s, or even less, suitable for small data packages such as messages. However, if communication via the regular communication network is not functioning, then a reduced data rate via the P2P adaptors may be acceptable as a temporary backup system, or otherwise when use of the regular communication network is unavailable or undesired.

Functional Characteristics for establishing P2P communication between computing devices can include, for example, the following:

Send data from one computer or mobile phone to another computer or mobile phone without using the internet or the central cellular infrastructure;

Establish a system where messages can be sent to specific targeted users, i.e., by name, address, code or broadcast;

Establish manual "channels" (typically virtual channels not tied to a particular physical channel) where pairs or groups of people can chat;

Operate on shared or unlicensed FCC spectrum;

Be compatible with leading computers and mobile phones, i.e., by using standardized application programming interfaces (APIs) for software, and industry standard hardware and protocols for communication;

Permit use of public/private key encryption to ensure privacy, within an open communication network that permits communications between new devices.

In an example, a device for radio communication can be paired with a computer or mobile phone to leverage the ease of use and power of users' existing computer or mobile phones.

The device can handle sending and receipt of small messages via radio, and can interface with the computer or mobile phone to display and input new messages.

The device can remain active even when not directly communicating with the computer or mobile phone, and can continue to receive and send messages, attempt retries if the recipient is not in range, and forward messages to other participants within a mesh network. A mesh network protocol may provide end-to-end confirmation of delivery for each packet, and/or confirmation when the entire message is delivered to the recipient. On the other hand, in some cases, especially in broadcast or real-time streaming modes, no confirmation (ACK, ARQ) is sent. For example, where packet loss is a factor, retransmissions may actually reduce effective network throughput.

According to one use case, a user composes a new message for transmission to a recipient in his contact list. The functionality may be partitioned between the user's Smartphone or computing device and the transceiver device as desired. Typically, the transceiver device is responsible for control of communications, and the Smartphone or computing device is responsible for defining the content of a communication and defining the recipient(s). However, in some cases, some or all of these functions may be transferred to one or the other system. For example, in an emergency communication, the recipient would generally be defined as any available recipient that makes itself available for such communications, and perhaps all available nodes in the mesh network for store as forward or retransmission use. In some cases, control over channel usage is complex, and control at an application level rather than transceiver device level is preferred; for example, a mesh network routing table may exceed the memory available in the transceiver device, and preferred routing through the mesh network may involve complex considerations. Thus, such computations may be better handled at the application level than the intelligent communication appliance (e.g., transceiver device) level. Software operations can compress the message into as small a data packet as possible.

Software operations can create the message, including the unencrypted recipient ID and checksum (or error detection and correction codes), and encrypted payload (e.g., sender ID, timestamp, and message). Devices that receive the message can verify the completeness and accuracy of the transmission, but not read the contents, as the message payload can be encrypted so that only the intended recipient can decrypt it. Between users known to each other, a certificate exchange may precede the communication (e.g., similar to x.509), and thus the encryption may be conducted according to known protocols, however, the level of security required may be less than traditional standards, and the network overhead to support such standards may be inappropriately high. Therefore, modified standards or less secure protocols may be employed that optimize security and overhead. For example, 64-128 bit keys may be employed, rather than high security 2048-4096 bit keys. Between new communication counterparties that have no prior communication history, an El-Gamal type key exchange may occur, which ensures that the communication is private, but does not authenticate the parties or prevent man-in-the-middle attacks at the inception of the communication. Assuming that the communication is based on an address book entry, the sender will have advance knowledge of the recipient, and therefore a private key associated with the recipient used to secure the communication. The user's device therefore communicates the communication security information to the transceiver device. In other cases, the communication security can be managed directly by the transceiver device, and involvement of the computational device would not be required.

In a "chat" application, a user selects one or more recipients of a communication, and perhaps has the option of open broadcast and emergency communication. For identified communications targets, an address and/or security key is provided, and this information used to define the communication on the control channel. For transceiver devices that listen on the communication channel directed by the control channel (typically only the intended recipient transceiver device(s), but not restricted), the packets also include address information, since in an unrestricted network, it is possible for competing control channel communications to create contending communications on the same communication channel (or spatial portions thereof). A transceiver device that detects a packet including address information to which it is programmed to respond, will store that packet and further process it. Generally, if the address information does not correspond to an address to which the transceiver device is programmed to respond, then the packet is deleted.

Software operations then transmit the message to the device for sending. Transmission to the device may be handled through headphone-jack audio coupling, Bluetooth, NFC, USB, custom short-range radio, shared network WiFi communication, or other means. Preferably, Bluetooth or USB is employed, though NFC/ISO-14443 or ISO 18092 communications may also be employed.

The transceiver device receives the message from the computer or mobile phone. Typically, before the message is formatted within the transceiver device as one or more packets with header information, communications over the control channel determine availability of the recipient and determine channel conditions. These conditions, in turn, may control packet length and encoding, though typically, the packets will include 160 characters along with a header, that may increase the packet to 168-192 bytes. After the control channel communications define the communication channel, the transceiver device attempts to broadcast it directly to the recipient device, or indirectly through other nearby devices, over unlicensed or shared radio spectrum.

After packets are sent, an acknowledgement packet may be returned confirming receipt of that message, or requesting retransmission automatically as appropriate. If neither acknowledgement ACK or retransmission ARQ packets are received, the transceiver device may automatically try again, or conduct further communications over the control channel to determine the nature of the impediment. In some cases, retransmission is repeated periodically until the recipient is in range and is able to successful return a receipt signal.

The transceiver device is functional as both the transmitter hardware and receiver hardware. However, in special cases, a device may have limited functionality. For example, a smartmeter device may have limited reception capability. Likewise, a data sink device may have limited transmission capability. In general, however, such limitations would be implemented as firmware modifications of a fully functional device, since the preferred protocol is in any case bidirectional.

The transceiver device listens to the control channel for communications targeted specifically for it, or for which its profile defines it as a generic recipient, or for communications it is enable to act as an intermediary node in a mesh network for. When the transceiver device determines that a message is appropriate for reception, it switches to the data communication channel defined by the control channel, and listens for the message. Note that, due to e.g., piggyback data payloads on the control channel, some portion of the data may be communicated on the control channel. On the data communication channel, the transceiver device receives messages having a header corresponding to the targeted message, and such received incoming messages are stored, decoded as appropriate, and the data communicated to the user computing device or retransmitted consistent with the mesh network architecture.

Because the control channel and data communications channel are on different frequencies, these can transmit data concurrently, and the control channel can develop and define a queue of permitted communications.

The receiving hardware firmware first checks if the target ID matches the ID of the computer or phone it is paired with or another computer or phone in its approved network. If there is no match, the message can be discarded (or forwarded in a store-and-forward network). If matched, the software can continue to next steps.

Hardware or software may check the checksum to confirm successful receipt of the full data package. If an error detection and correction (EDC) scheme is employed, the EDC algorithm not only detects errors, but is capable or correcting some errors. If communication is not successful, the architecture can continue to communicate or seek to communicate data packets as the message is retried until the full message is received. Partial correct information may be stored in the transceiver device until complete packets or messages are available. In some cases, a partial retransmit request may be issued, seeking part(s) of one of more packets.

Preferably, when interference or failure to communicate is persistent, the devices release the channel for a period and try again later, and thus do not monopolize the channel in event of persistent failures. Likewise, a renegotiation of the communication on the control channel may permit alternate communication with different risk factors, such as a different data communication channel, different radio modulation or data encoding, or switch from direct communication to indirect mesh network communication.

If and when the packet is successfully received, the transceiver device can send an ACK signal with the message ID# in the same way or in a similar way as original messages are sent. Typically, the arbitration signals are sent over the data communication channel, however, in cases of persistent failure, communication over the control channel may be employed.

Immediately, or when next paired with the computer or mobile phone, the device can deliver stored messages to the computer or phone for decryption and display. In some cases, where actual delivery of a message rather than receipt needs to be confirmed, a delivery message may be communicated from the computer or mobile phone, through the transceiver device, to the originating user.

When the device's software is opened on the user's computer or mobile phone, it can pair with the device and receive stored messages. If the message is encrypted transparent to the transceiver devices, the user's computer or mobile phone can then decrypt the messages and display them to the user. Otherwise, the encryption/decryption may be performed in the transceiver devices.

The receiver can then choose to respond and this process can repeat in similar manner. In some cases, and automated response may be generated, or an automated interactive protocol is used.

According to one embodiment, the transceiver device is provide as an "external dongle", i.e., a self-contained hardware module that acts as an interface accessory to the computer or mobile phone, and which exists not as an integrated part of a phone or computer, but which still relies on a phone or computer to operate.

According to another embodiment, the external transceiver is partially or fully built into the phone or computer.

For example, the external transceiver hardware is integrated into a consumer phone or computer which enables User-to-User (U2U) communications in addition to regular phone or cell phone operations. Conversely, smartphone technology may be integrated into a GMRS or MURS type device.

Another embodiment or type of implementation provides a standalone device, in which a completely independent device that enables U2U communications is provided without reliance on a phone or computer. For example, if a phone or computer does not pair with the transceiver device, it may operate in an autonomous mode. Similarly, the transceiver device itself may have a rudimentary user interface, that permits limited user inputs and outputs, such as a simple LCD display with a limited number of interface buttons.

A further option is integration with an eyeglass display, such as Google® Glass. In such as device, the U2U communications capabilities are built into, or work with, an integrated eyeglass display.

The transceiver device will typically employ an antenna which is 2-6 inches long, and is typically external to an electronic module package. The antenna typically is removable through a coaxial or twin-lead connector (through a balun). The antenna is responsible for both the receipt and broadcasting of signals, though more than one antenna may be provided. The antenna works together with the radio chipset, e.g., ADF-7021N, to transmit and receive the radio frequency signals. The antenna may come in a variety of shapes and sizes depending on final form factor as well as the section of spectrum a particular device model might be designed to operate on.

An integrated transceiver device may be provided by accessing the firmware/software on a computer or mobile phone's existing antennas (any of them) and modifying the settings to allow the antennas to broadcast on new frequencies, or on the same frequencies but operating in an U2U manner. The existing cellular antenna/radios firmware/software can be modified to allow them to communicate with each other directly over their normal frequencies. This may require updating programming controls so that the phones did not attempt to connect to a cellular base station tower, but instead connected to another phone with similar customizations active.

A Radio Chipset is provided to receive digital data, generate radio communications, receive radio communications, and to output received digital data. The Analog Devices Inc. and CML micro devices discussed above provide significant integrated functionality.

The ADF7021-N is a high performance, low power, narrow-band transceiver which has IF filter bandwidths of 9 kHz, 13.5 kHz, and 18.5 kHz, making it suited to worldwide narrowband standards and particularly those that stipulate 12.5 kHz channel separation. It is designed to operate in the narrow-band, license-free ISM bands and in the licensed bands with frequency ranges of 80 MHz to 650 MHz and 842 MHz to 916 MHz. The device has both Gaussian and raised cosine transmit data filtering options to improve spectral efficiency for narrow-band applications. It is suitable for circuit applications targeted at the Japanese ARIB STD-T67, the European ETSI EN 300 220, the Korean short range device regulations, the Chinese short range device regulations, and the North American FCC Part 15, Part 90, and Part 95 regulatory standards. The on-chip FSK modulation and data filtering options allows flexibility in choice of modulation schemes while meeting the tight spectral efficiency requirements. The ADF7021-N also supports protocols that dynamically switch among 2FSK, 3FSK, and 4FSK to maximize communication range and data throughput. The transmit section contains two voltage controlled oscillators (VCOs) and a low noise fractional-N PLL. The dual VCO design allows dual-band operation. The frequency-agile PLL allows the ADF7021-N to be used in frequency-hopping, spread spectrum (FHSS) systems. The transmitter output power is programmable in 63 steps from −16 dBm to +13 dBm and has an automatic power ramp control to prevent spectral splatter and help meet regulatory standards. The transceiver RF frequency, channel spacing, and modulation are programmable using a simple 3-wire serial interface. The device operates with a power supply range of 2.3 V to 3.6 V and can be powered down when not in use.

Error-correction, as discussed above, may be implemented within the transceiver device, or in some cases within the smartphone or computer.

According to a further embodiment of the technology, the device acts as a picocell device, within the licensed cellular bands, for example as authorized by the incumbent cellular carrier. Therefore, when regular cellular service is unavailable, a Smartphone device reconfigures itself to act as a picocell base station. For example, the picocell could use the same frequencies and protocols (GSM/CDMA/etc) as major cell carriers to become a de facto "Roaming" network which other users could connect to with their regular cellphones without any device hardware or other customization. This essentially emulates a cell tower which a user can choose to "Roam" onto and then send messages via that connection to that single connection or as part of a larger mesh network.

Most mobile phones have Tip-Ring-Ring-Sleeve (TRRS) headphone jacks. These jacks allow for both the output and input of audio signals. The output is the regular port one uses for audio, but there is also a port for a microphone which allows data to come back in to the phone. However, this arrangement tends to presume that the transceiver device is a relatively passive device that does not reformat the data, and therefore is merely an analog transmitter for signals modulated in an audio band. In contrast, most smartphones have Bluetooth communications capability, and the preferred transceiver device receives a digital signal, and provides control over the transmission protocol within the transceiver device.

According to one embodiment, a user's public/private key paid may be created based on sensor data from the computer or mobile phone (accelerometer, random screen movement input, etc.). Based on this unique information, the smartphone or computer device software can create a public/private key pair, and the public key can then be shared with users they want to communicate with privately.

According to one embodiment of the technology, messages, and other data stored in the transceiver device may be tagged with a timestamp, and in some or all cases, purged or deleted after a period of time. This period may be set by the sender. Likewise, the data may be deleted after it is transferred to the smartphone or computing device. In other cases, all data received by the transceiver device is stored in a memory, e.g., 16 Gbit or larger flash memory.

According to one embodiment, security is provided between the user and app, smartphone and/or computing device and transceiver device For example, access to the app may require a password, fingerprint or the like. In pairing between the smartphone or computing device and the transceiver device, typical Bluetooth security may be employed, or a more robust scheme, such as 128 bit AES, or other symmetric or asymmetric encryption algorithm. In a multi-hop or mesh network, communications may be encrypted end-to-end, and an additional option called "proxy key cryptography" is available to alter the cryptographic signature with each (or a number of) hops. Therefore, it is possible to provide private key encryption where the sender does not have the public key of the recipient. An end-to-end multihop or mesh network resembles a virtual private network (VPN), and may employ VPN technologies as are well known. In a mesh network, all nodes may be peers, or preferences may be afforded to certain communications, based on importance, payments, reputation, quid pro quo exchange, predetermined relationships (groups), or other factors.

In some cases, especially where permitted by law or regulation, repeater nodes may be provided, which may have a relatively higher power or better antenna, to extend the range of all device units as a high-power general store-and-forward point.

In many cases, it is desirable to communicate location coordinates. In some cases, the transceiver device includes a GPS receiver, and thus can supply this information intrinsically. In other cases, the smartphone or computing device supplies this information, based on GPS, triangulation, hard encoded location, or the like. The receiving computer or phone could use the coordinates to display sender's location on Google® Maps or in a device proximal display (display showing location relative to own GPS coordinates). Further, in mesh networks, location information may be used to route packets toward their destination. The transceiver device may include a "ping" mode in which it transmits packets periodically, to allow other units searching for its particular signal to triangulate its position based on other device units rebroadcasting. Results could be shown in a proximal display (display relative to own position, i.e., 50 feet away, North) in a graphic on the smartphone or computing device. When triangulation is not possible, a "rough pinging" mode may be used. A user being located enters the "ping" mode, and distance determined based on a rough measurement of signal strength. A display may be provided to the user through the app on the smartphone or computing device showing rough distance without direction. In the rough pinging mode, the ping communications, and timing and received signal strength indicator (RSSI) are generated by the transceiver device and processed information passed as a control message to the smartphone or computing device.

In another mode, a "4D base station triangulation" mode is provided, in which four device rebroadcast points are set up around a location, e.g., a building (three outside on same level, fourth elevated above others) to penetrate building walls and display a three dimensional map of any device units inside and their movements. A potential application for this technology is to track the location of fire fighters inside a building and relay both the positions of other firefighters as well as which areas have already been checked by them back over device devices. Likewise, consumers within a store or mall may be tracked.

An API (application programming interface) may be provided to permit development of new uses of the device hardware. An emergency mode may be provided, in which transceiver devices have the ability to broadcast with over-power on emergency frequencies as dictated by the FCC.

The transceiver device may have a standby E-ink display (a "zero power" display which can display static messages without consuming power). For example, transceiver devices may include a screen displaying a number of messages being held locally by the device hardware while not actively exchanging data with a phone/computer. Such a display may indeed permit full interaction with the communication network, for example, providing an interactive display for defining text messages, and for displaying received text messages.

According to one embodiment, the app provides a speech input, that for example includes speech-to-text functionality or a speech-to-phoneme code functionality. The text or codes are communicated to the recipient, where a text-to-speech or phoneme-to-speech converter can resynthesize speech.

The transceiver device, where connected to the self-organizing network and (through the short range link to the smartphone or computing device) another network such as the Internet, may act as a network bridge. This transceiver device bridge may be for direct communications or for mesh network communications, as a termination from, or origination into the self-organizing network.

Figure 2:
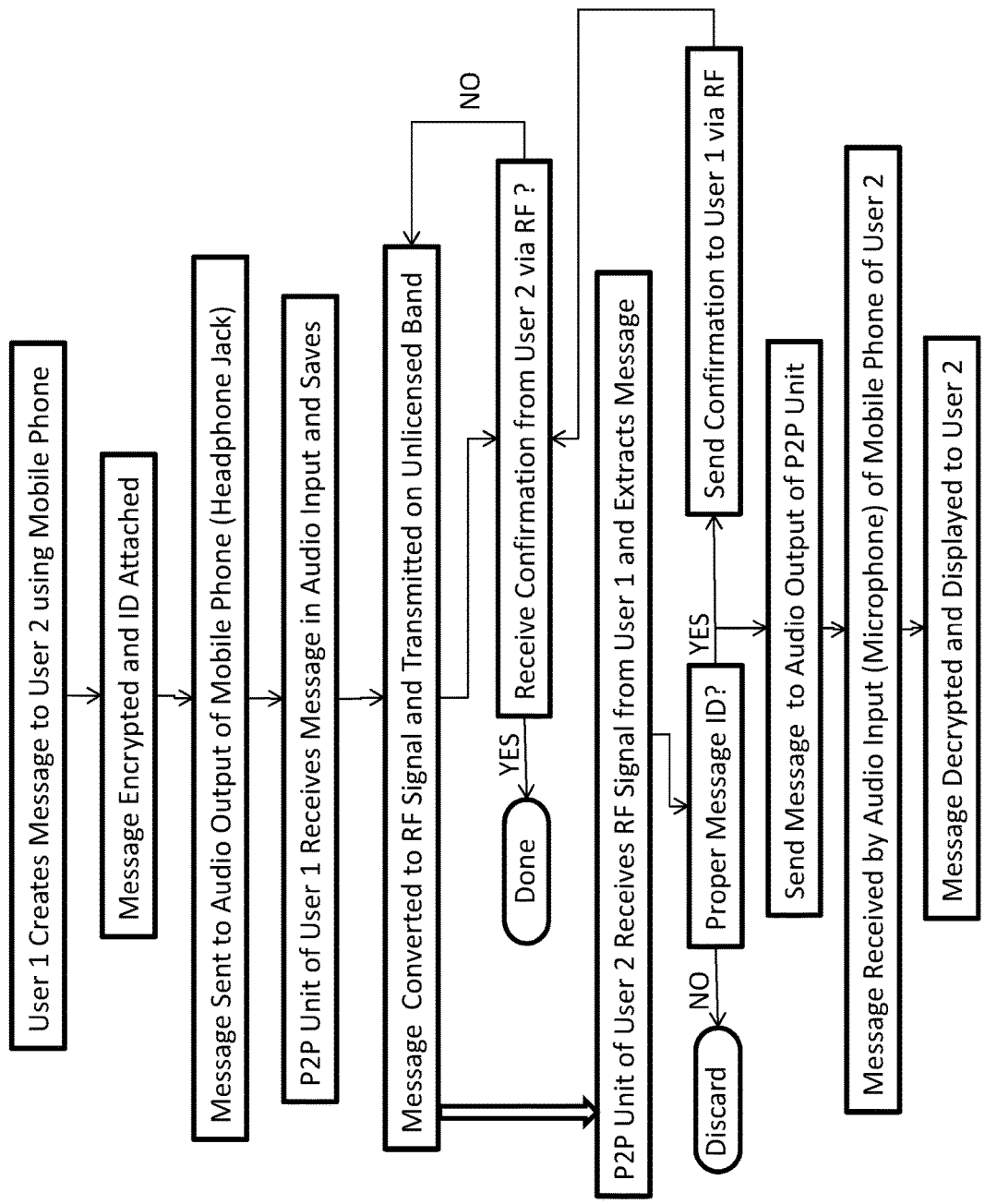
FIG. 2 is a flow diagram of an example method for enabling private and point-to-point communication between computing devices in accordance with embodiments of the present invention.

FIG. 2 shows a flow diagram of an example method for enabling private and point-to-point communication between computing devices in accordance with embodiments of the present invention. The method begins with a first user (User 1) who may wish to transmit a message to a second user (User 2). User 1 may use the computing device or phone software to create a message. The data may be encrypted and encoded for transmission by, for example, Bluetooth. The device (e.g., goTenna®) hardware may receive and decode the data, prepare the data for transmission, and transmit the signal. A reliable protocol may be employed to ensure complete reception of the data by the intended recipient, in appropriate cases.

The message from User 1 to User 2 may be transmitted via the unlicensed or shared radio spectrum. The device hardware of User 2 may receive the radio transmission signal and check if a message ID is paired with the computing device of User 2. If the message ID is not paired with the computing device of User 2, then the message may be discarded. If the message ID is paired with the computing device of User 2, then the message may be saved for transmission to User 2's computing device for processing. The message data stream may be decrypted and displayed to User 2.

The method presented in FIG. 2 represents only one example of a method for connecting a P2P adaptor to a computing device. Other wired or short-range wireless connections (such as optical, infrared, microwave, or radio links) are also possible, and are described in other figures below.

Figure 3:
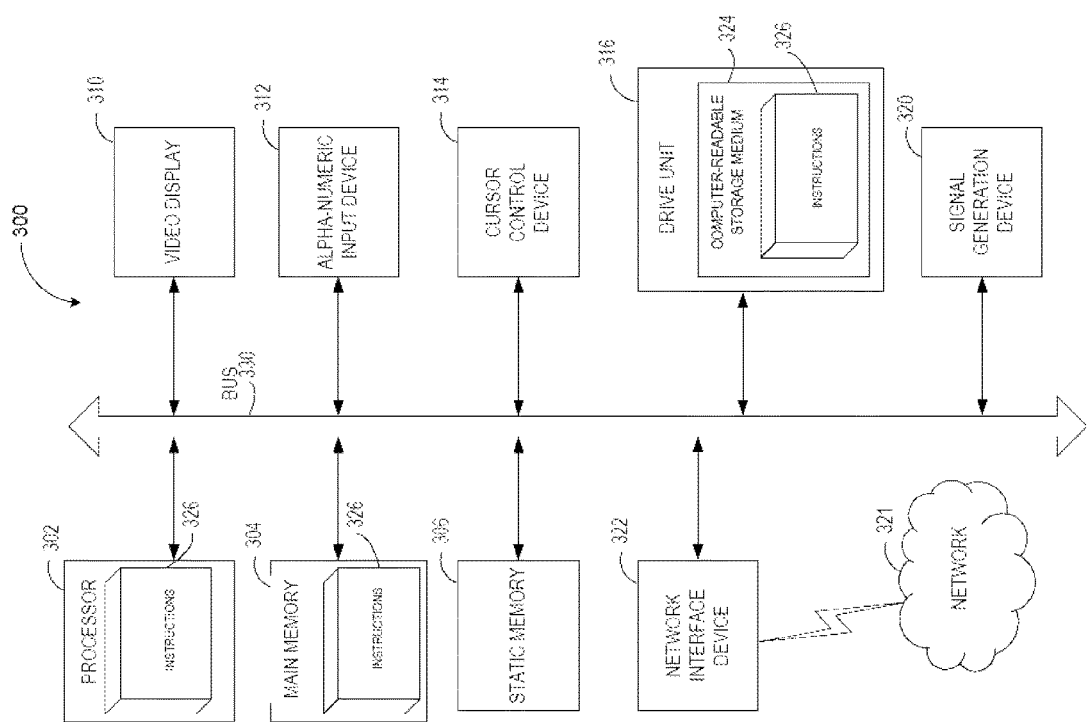
FIG. 3 is a block diagram of an exemplary computer system that may perform one or more of the operations described herein for enabling private and point-to-point communication between computing devices.

FIG. 3 illustrates a diagrammatic representation of a machine in the form of a computer system, in accordance with one example, having a microprocessor controlled in accordance with a set of instructions stored in a non-transitory computer readable medium, such as flash memory. The computing system may include a set of instructions 326, for causing the machine to perform any one or more of the methodologies discussed herein. In alternative examples, the machine may be connected (e.g., networked) to other machines in a Local Area Network (LAN), an intranet, an extranet, or the Internet. The machine may operate in the capacity of a server or a client machine in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while a single machine is illustrated, the term "machine" shall also be taken to include any collection of machines (e.g., computers) that individually or jointly execute a set (or multiple sets) of instructions to perform any one or more of the methodologies discussed herein.

The computer system 300 includes a processing device 302, a main memory 304 (e.g., read-only memory (ROM), flash memory, dynamic random access memory (DRAM) such as synchronous DRAM (SDRAM), etc.), a static memory 306 (e.g., flash memory, static random access memory (SRAM), etc.), and a secondary memory 316 (e.g., a data storage device), which communicate with each other via a bus 330.

The processing device 302 represents one or more general-purpose processing devices such as a microprocessor, central processing unit, or the like. More particularly, the processing device 302 may be a complex instruction set computing (CISC) microprocessor, reduced instruction set computing (RISC) microprocessor, very long instruction word (VLIW) microprocessor, processor implementing other instruction sets, or processors implementing a combination of instruction sets. The processing device 302 may also be one or more special-purpose processing devices such as an application specific integrated circuit (ASIC), a field programmable gate array (FPGA), a digital signal processor (DSP), network processor, or the like. The processing device 302 is configured to execute the operations for private point-to-point communication between computing devices for performing steps discussed herein.

The computer system 300 may further include a network interface device 322. The network interface device may be in communication with a network 321. The computer system 300 also may include a video display unit 310 (e.g., a liquid crystal display (LCD)), a touch screen, an alphanumeric input device 312 (e.g., a keyboard), a graphic manipulation control device 314 (e.g., a mouse), a sensor input (e.g., a microphone) and a signal generation device 320 (e.g., a speaker).

The secondary memory 316 may include a computer-readable storage medium (or more specifically a non-transitory computer-readable storage medium) 324 on which is stored one or more sets of instructions 326 (e.g., instructions executed by private point-to-point communication between computing devices) for the computer system 300 representing any one or more of the methodologies or functions described herein. The instructions 326 for the computer system 300 may also reside, completely or at least partially, within the main memory 304 and/or within the processing device 302 during execution thereof by the computer system 300, the main memory 304 and the processing device 302 also constituting computer-readable storage media. The instructions 326 for the computer system 300 may further be transmitted or received over a network via the network interface device 322.

While the computer-readable storage medium 324 is shown in an example to be a single medium, the term "computer-readable storage medium" should be taken to include a single medium or multiple media (e.g., a centralized or distributed database, and/or associated caches and servers) that store the one or more sets of instructions 326. The term "computer-readable storage medium" shall also be taken to include any medium that is capable of storing or encoding a set of instructions for execution by the machine that cause the machine to perform any one or more of the methodologies of the disclosure. The term "computer-readable storage medium" shall accordingly be taken to include, but not be limited to, solid-state memories, and optical and magnetic media.

Some portions of the detailed descriptions above are presented in terms of symbolic representations of operations on data bits within a computer memory. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "configuring," "associating," "executing," "adjusting," "sending," "receiving," "determining," "transmitting," "identifying," "specifying," "granting," "accessing," "assigning," "detecting," and "requesting," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The disclosure also relates to an apparatus for performing the operations herein. This apparatus may be specially constructed for the required purposes, or it may be a general purpose computer system selectively programmed by a computer program stored in the computer system. Such a computer program may be stored in a computer readable storage medium, such as, but not limited to, any type of disk including optical disks, CD-ROMs, and magnetic-optical disks, read-only memories (ROMs), random access memories (RAMs), EPROMs, EEPROMs, magnetic disk storage media, optical storage media, flash memory devices, other type of machine-accessible storage media, or any type of media suitable for storing electronic instructions, each coupled to a computer system bus.

The descriptions and displays presented herein are not inherently related to any particular computer or other apparatus. Various general purpose systems may be used with programs in accordance with the teachings herein, or it may prove convenient to construct a more specialized apparatus to perform the required method steps. The required structure for a variety of these systems will appear as set forth in the description below. In addition, the disclosure is not described with reference to any particular programming language. It will be appreciated that a variety of programming languages may be used to implement the teachings of the disclosure as described herein.

Figure 4:
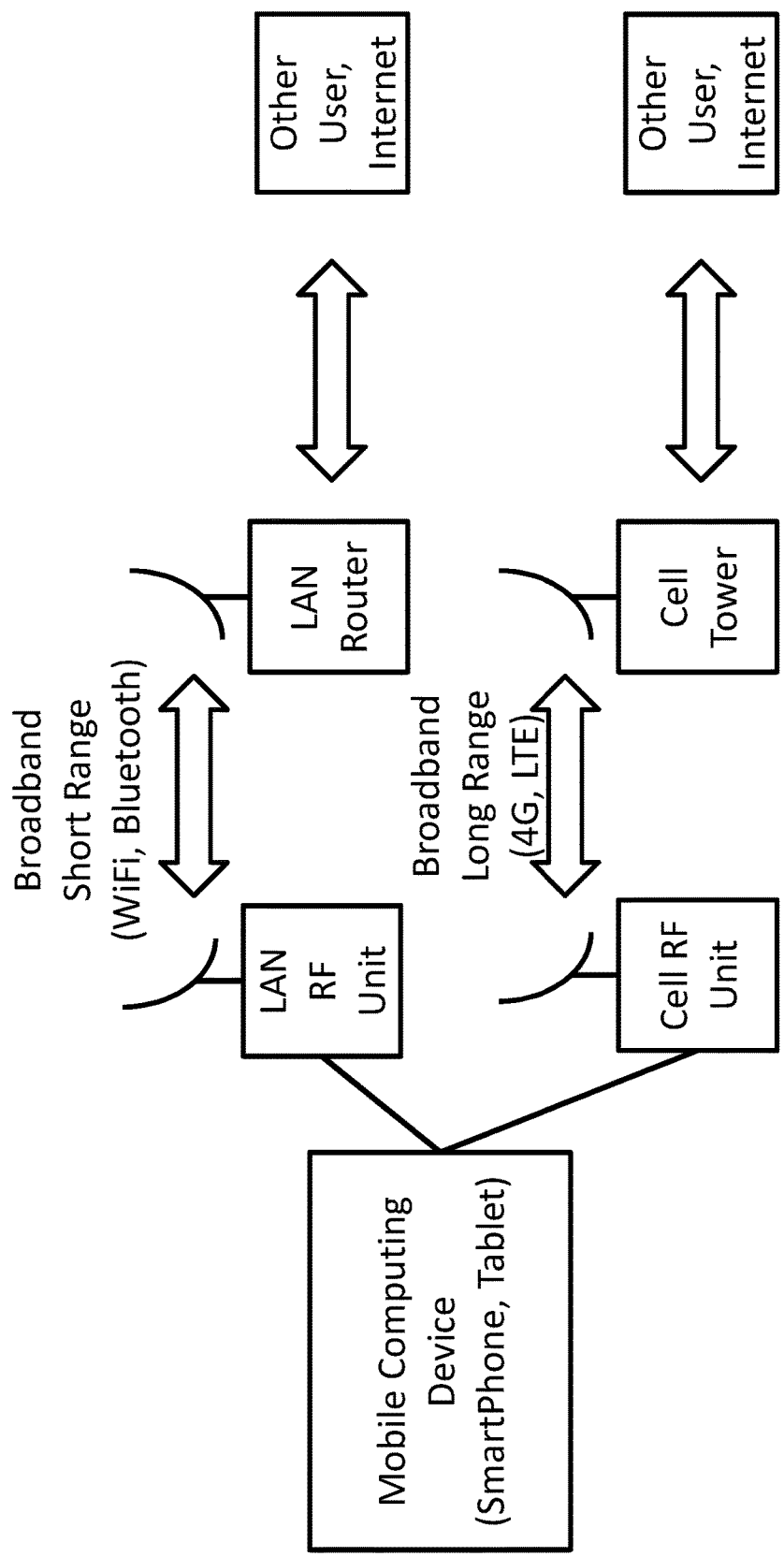
FIG. 4 is a block diagram of a computing device of the prior art, showing both short-range and long-range wireless links to larger networks.

FIG. 4 shows a block diagram representing a prior-art system for communication between a computing device and an external network or other computing device. The computing device, which may comprise a mobile computing device such as a SmartPhone or a tablet computer, may further comprise devices for input and output of data via short-range and long-range radio communication. For example, a long-range radio communication device may comprise a cellular RF unit, with a transmitter, receiver, and antenna, suitable for communication of a broadband data signal (with a bandwidth of order 1 Mb/s or greater) on a licensed band, compatible for example with protocols such as 2G/GSM, 3G, 4G, and LTE. The antenna is symbolized here by a dish symbol, but this is not intended to restrict the form of the antenna. This broadband data signal is designed to communicate with a cell tower with its own antenna, and to a cellular base station, which may connect the computing device to the internet and to other users (which represent the network of FIG. 1). An alternative route for connection to the network may comprise a short-range local area network (LAN), which may also communicate via radio frequency signals, but to a LAN router that is nearby (typically much less than 100 m away from the computing device). This LAN router, in turn, may be connected via long-range wired or wireless links to the internet and other non-local users (the network). Some common RF LAN systems of the prior art are known as Wi-Fi, Bluetooth, and ZigBee. These wireless LANs (or WLANs) are typically assigned to unlicensed RF bands, where interference may be present. In many cases, both the Cellular RF Unit and the LAN RF Unit are standard components that are included in the same package with the mobile computing device itself.

Figure 5:
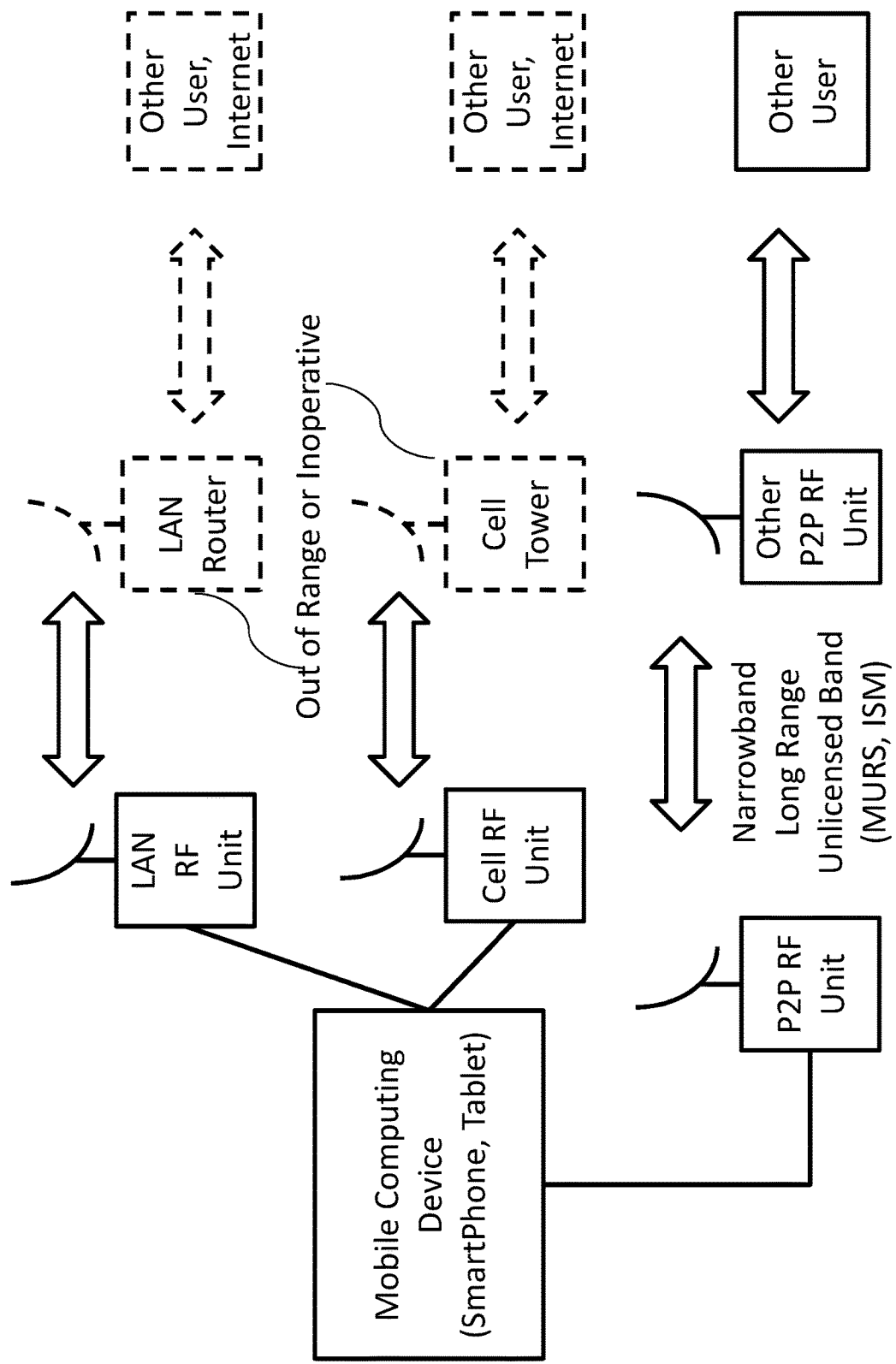
FIG. 5 is an example block diagram of a computing device with a link (wired or wireless) to a point-to-point (P2P) radio unit for communication with another computing device, when network access is unavailable.

FIG. 5 represents a block diagram of one embodiment of the invention, which comprises a P2P RF Unit linked to a prior-art mobile computer system. It is assumed that the standard network connections are not available, for example due to the remote location of the mobile computer. The P2P RF Unit comprises a transmitter, receiver, and antenna, capable of communicating at least a low-data-rate signal over a relatively long range (typically greater than 100 m), to a similarly configured P2P RF unit associated with another mobile computing device of another user. The P2P RF unit may comprise a package that is physically distinct from the standard package of the mobile computing device itself. The P2P RF Unit may be a small compact mobile unit, with its own battery power, which is configured to exchange a data signal with a nearby mobile computing device via a wired or wireless connection. In one embodiment, a wired connection between the computing device and the P2P adaptor unit may comprise connections to the standard audio input and output ports of the computing device, as described in the flow diagram in FIG. 2. The P2P RF Unit may be configured to exchange data via signals modulated onto a radio frequency carrier in an unlicensed radio band, such as the MURS band (Multi-Use Radio Service, 150 MHz) or one of several ISM bands (Industrial, Scientific, and Medical, for example near 900 MHz). This data transfer may be under the control of a software application package (an "app") loaded onto the mobile computing device. The signal sent via the P2P RF Unit may comprise a small data package such as a text message, which may be transmitted at a low data rate, which may typically be of order 100 kb/s.

Figure 6:
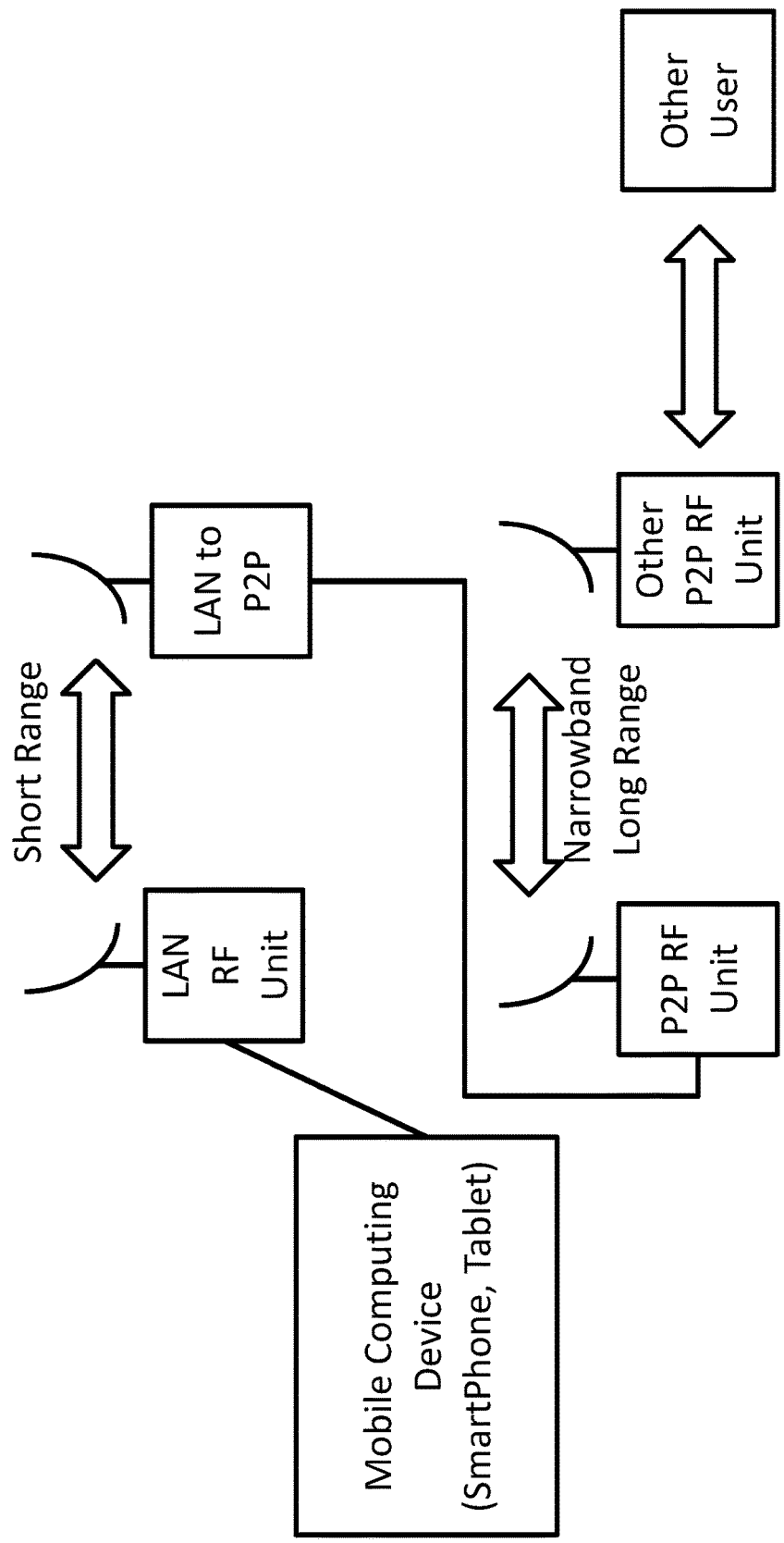
FIG. 6 is an example block diagram of a computing device with a short-range wireless link to a P2P radio unit for communication with another computing device.
Figure 7:
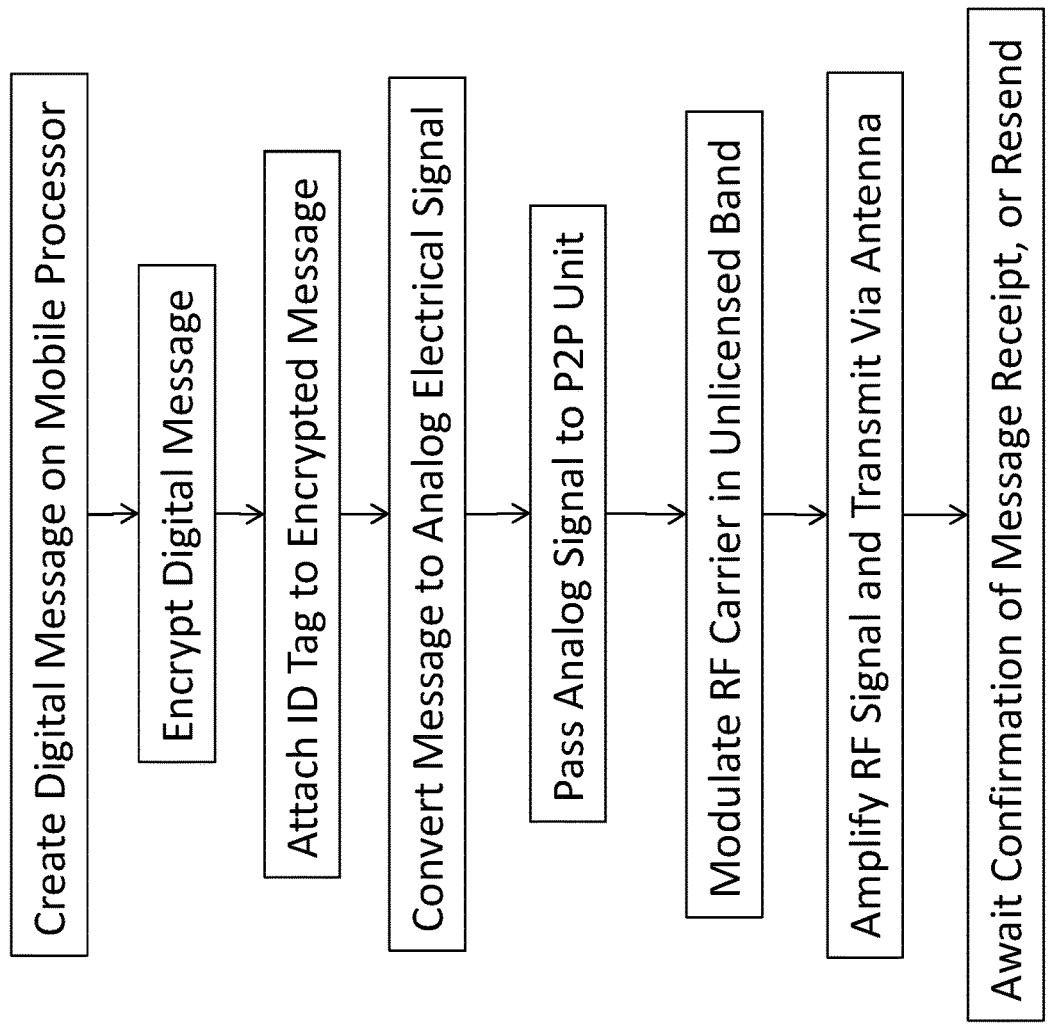
FIG. 7 is a flow diagram of an example method for transmitting a message from one computer to another using a P2P radio unit.
Figure 8:
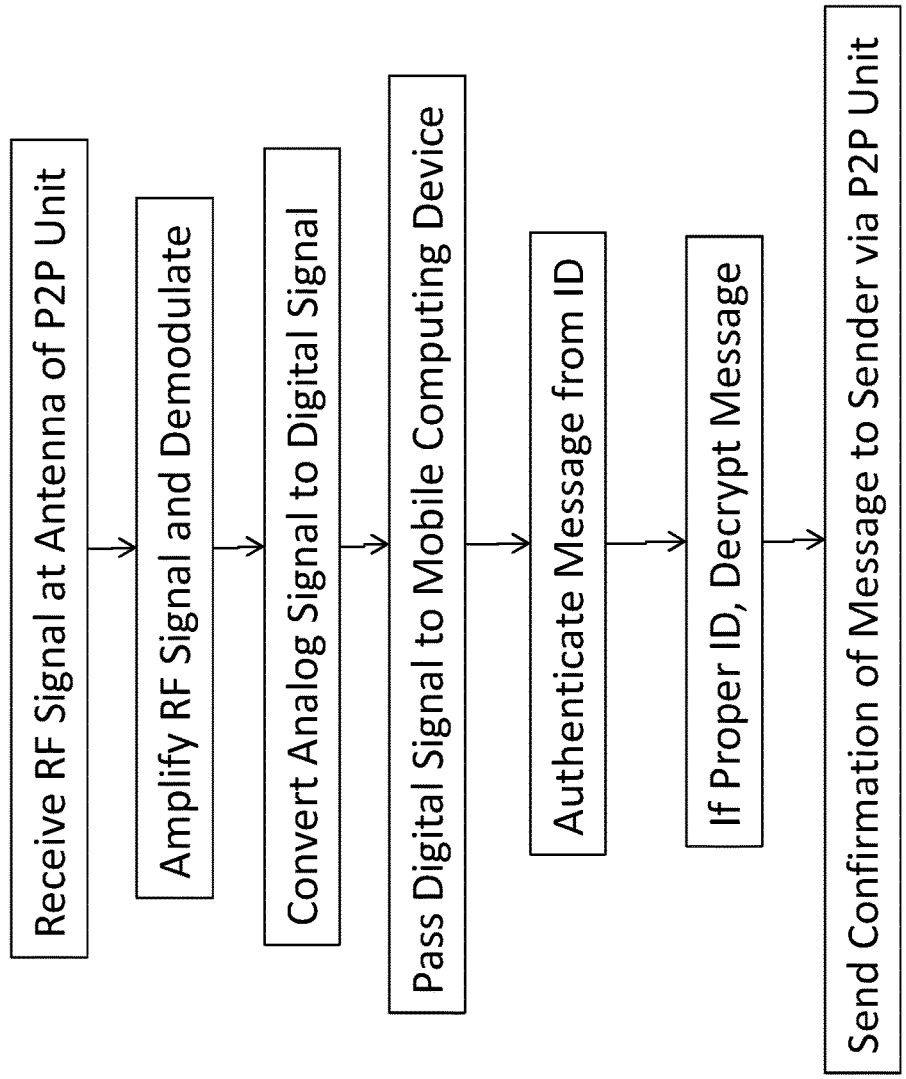
FIG. 8 is a flow diagram of an example method for receiving a message by a computer using a P2P radio unit.

FIG. 6 represents a block diagram of an embodiment in which the link between the computing device and the P2P adaptor unit is not a wired connection, but rather takes advantage of the short-range wireless system already built into the package of the computing device, such as a Bluetooth or a Wi-Fi system. In this case, the P2P unit includes its own wireless LAN module for the same band, enabling effective data exchange with the computing device over a short range. The P2P unit can receive a message from the computing device over the WLAN, and rebroadcast it with higher power over an appropriate band for long-range communication. In this way, another user with a similar P2P unit may receive the message at a distance that is much greater than could be sent directly using the WLAN. FIG. 7 and FIG. 8 represent flow diagrams for the method for transmitting and receiving messages using the P2P Units, with either a wired or a wireless link between a given computing device and its proximate P2P Unit. FIG. 7 describes the creation of a digital message on a mobile processor, which can then be encrypted in accordance with standard public-key or private-key encryption methods. An ID tag that represents both the sender and the intended receiver can then be attached to this encrypted digital message. This combined data package can then be converted into an analog electrical signal, and then transmitted to the P2P Unit. This transmission can comprise the direct transmission of the electrical signal on a wire or cable, or alternatively the conversion of this electrical signal into an appropriate wireless signal (carried on, e.g., an electromagnetic wave through space), and then converted back to an electrical signal at the P2P Unit. The P2P Unit then prepares to broadcast this data by modulating an RF carrier which may be in an unlicensed band, amplifying this signal to boost the signal power, and transmitting it via an antenna over a distance that may reach the receiver of a similar second P2P Unit. Finally, the first P2P Unit then waits for a brief acknowledgment signal that the message has been received by the second P2P unit. If the acknowledgment message is not received in a predetermined time, the message is then resent. If there is still no acknowledgment, a message is returned to the mobile processor that the data package was undeliverable.

FIG. 8 represents a flow diagram for the method of reception of a signal by a second P2P Unit, following a transmission according to the flow diagram of FIG. 7. Here a weak RF signal is received by an antenna and amplified by a low-noise amplifier. The signal is then typically demodulated by mixing with a local RF oscillator in a conventional heterodyne receiver, to recover the baseband signal. It is then converted to a digital signal and passed along to the mobile computing device, again using either a wired or a wireless connection. The message ID is then examined to determine if this computing device is the intended recipient, and if the message is from an allowed sender. If these are not a match, the message is discarded. On the contrary, if these are a match, an acknowledgment is sent back to the sender via the P2P Unit. Then the received message is decrypted and either saved or displayed for the user.

Figure 9:
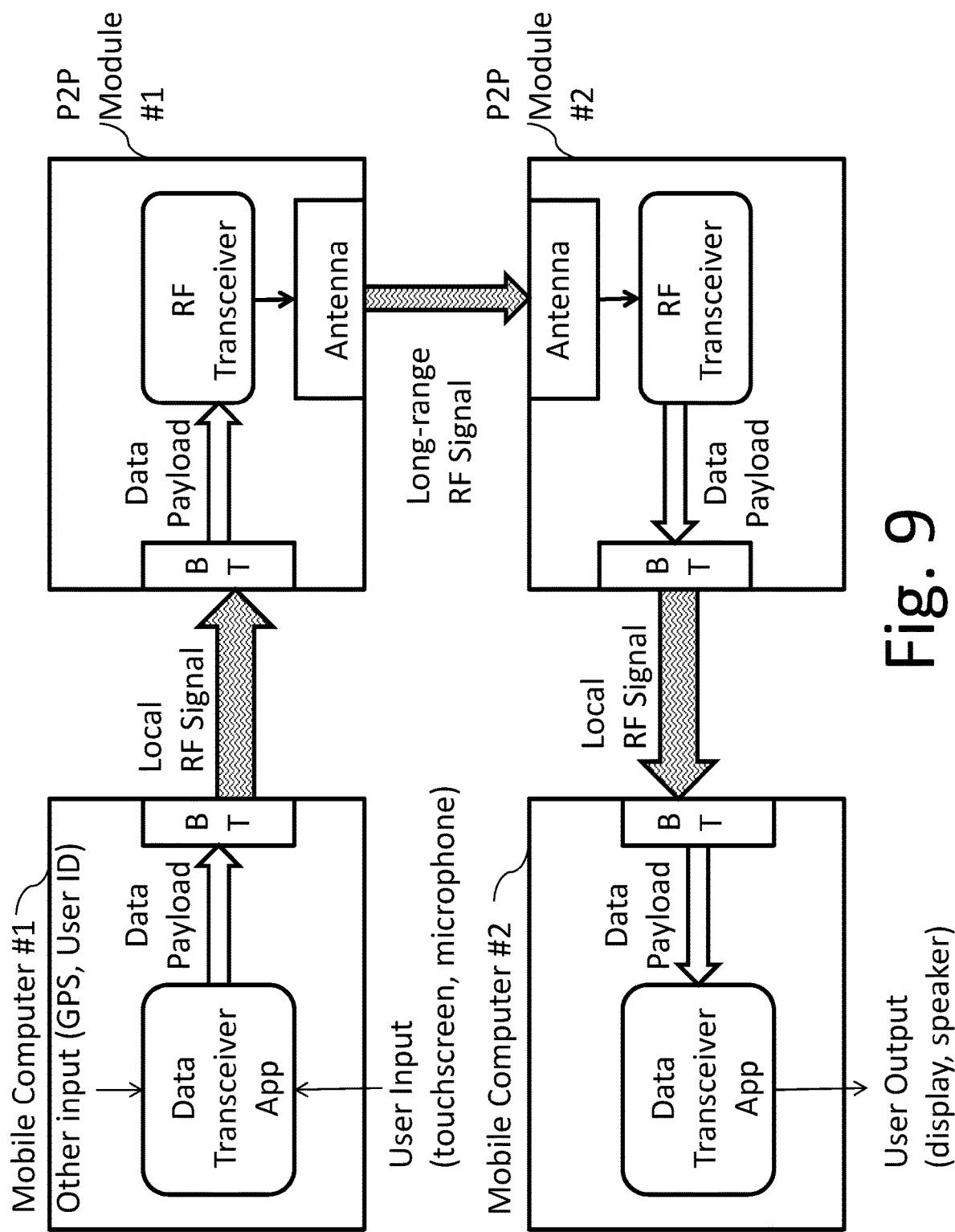
FIG. 9 is an example block diagram of a communication system between two computers whereby each computer is linked to its P2P module via a short-range Bluetooth (BT) radio link.

FIG. 9 is a block diagram showing the communication from User 1 to User 2, using two P2P Units, via a short-range Bluetooth signal and a longer-range RF signal. This shows that the message is initially created by a Data Transceiver App (a software package operating on the mobile computing device) based on user input into the mobile computer or SmartPhone. This user input may comprise text input from a touchscreen, or alternative audio input from a microphone. This may be encrypted and attached to other data, such as GPS location information and user ID. Together these create the data payload, which is passed to a Bluetooth module in the mobile computer, for local transmission to a nearby P2P unit, which has its own Bluetooth module. This recovers the data payload and sends it the RF transceiver to be amplified and broadcast on an antenna to a second, distant P2P Unit. The antenna of the second P2P Unit receives the signal, and passes it to the receiver portion of an RF transceiver, which in turn recovers the data payload, and sends it to a Bluetooth module. This passes the signal to the Bluetooth module of a local mobile computing device, which passes the Data Payload to the Data Transceiver App of the receiving computing device for decryption, saving to memory, and output to the user.

Figure 10:
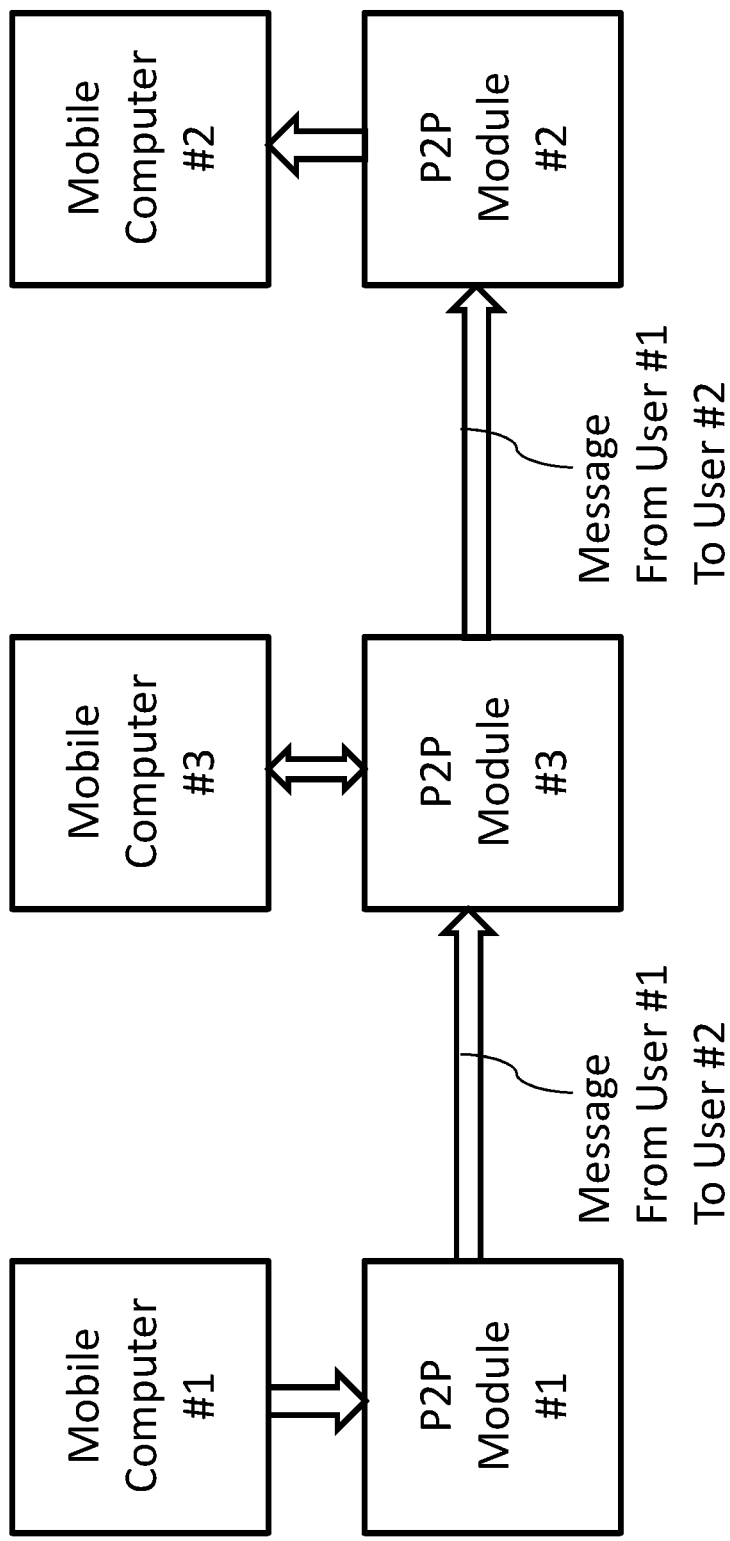
FIG. 10 is an example block diagram of communication between two computers that is relayed by a third computer using a P2P module.
Figure 11:
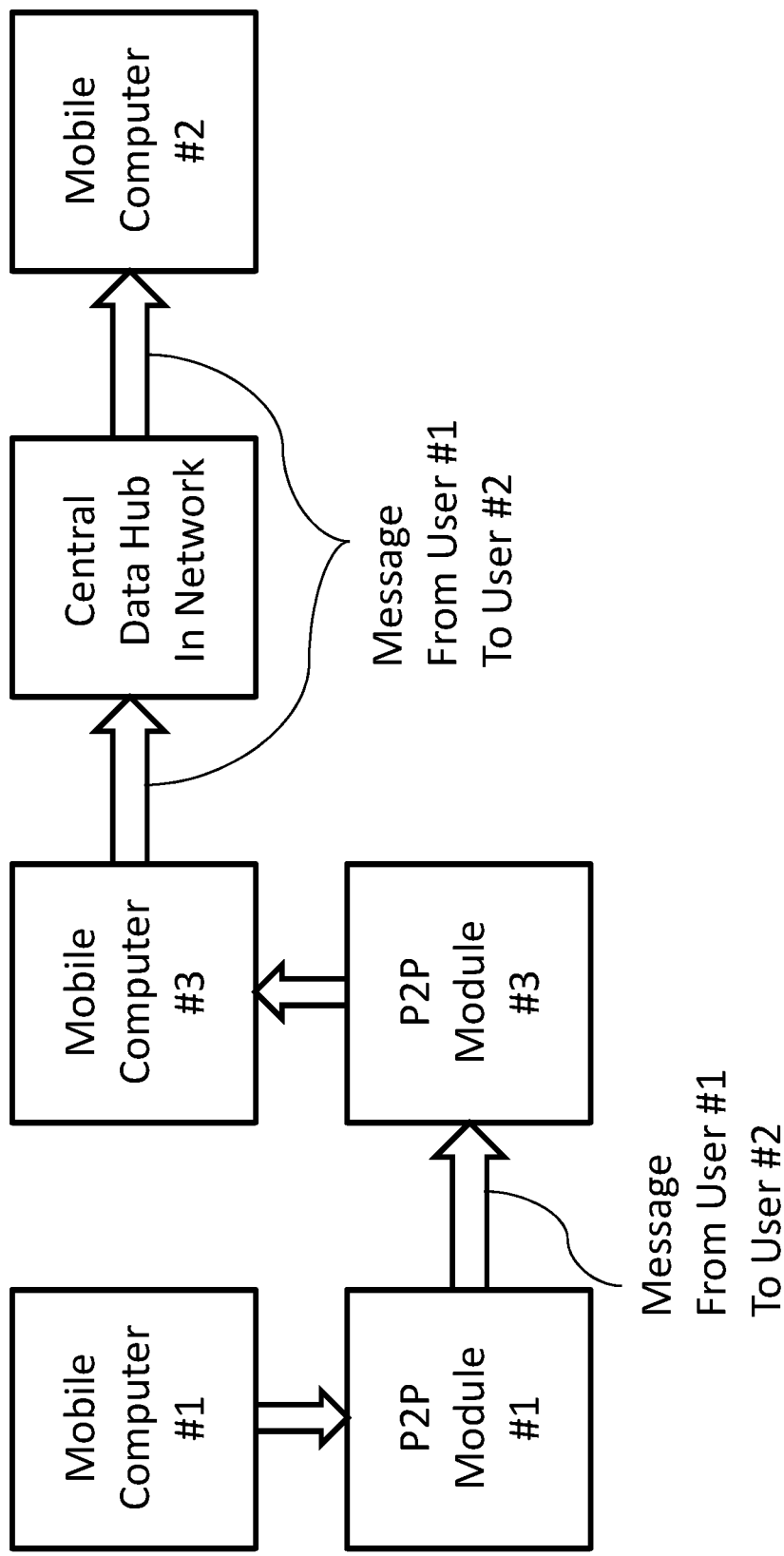
FIG. 11 is an example block diagram of communication between two computers that is relayed by a third computer connected to the network.

FIGS. 10 and 11 represent simplified block diagrams that show how additional P2P Units may be used to create a system of message relays or even a mesh communication network. In FIG. 10, User 1 intends to send a message to User 2, but User 2 may be out of range. User 3 is within range of both User 1 and User 2, but is not the intended recipient. In this case, the system is configured so that instead of discarding the encrypted message, User 3 rebroadcasts the message, boosting its power and range so that it may then be received by User 2.

FIG. 11 shows a different situation, whereby User 2 has access to a network (such as the cellular phone network), but User 1 does not. But User 3 is within range of the P2P Unit, and is also within range of the network. In this case, the encrypted signal from User 1 is received by the P2P Unit of User 3, and then automatically transferred via mobile computer 3 to the network, where it can be sent along to User 2. These examples involve only a single intermediary, but this concept can be generalized to multiple intermediary RF Units, which can act as amplifying relays or mesh networks.

Figure 12:
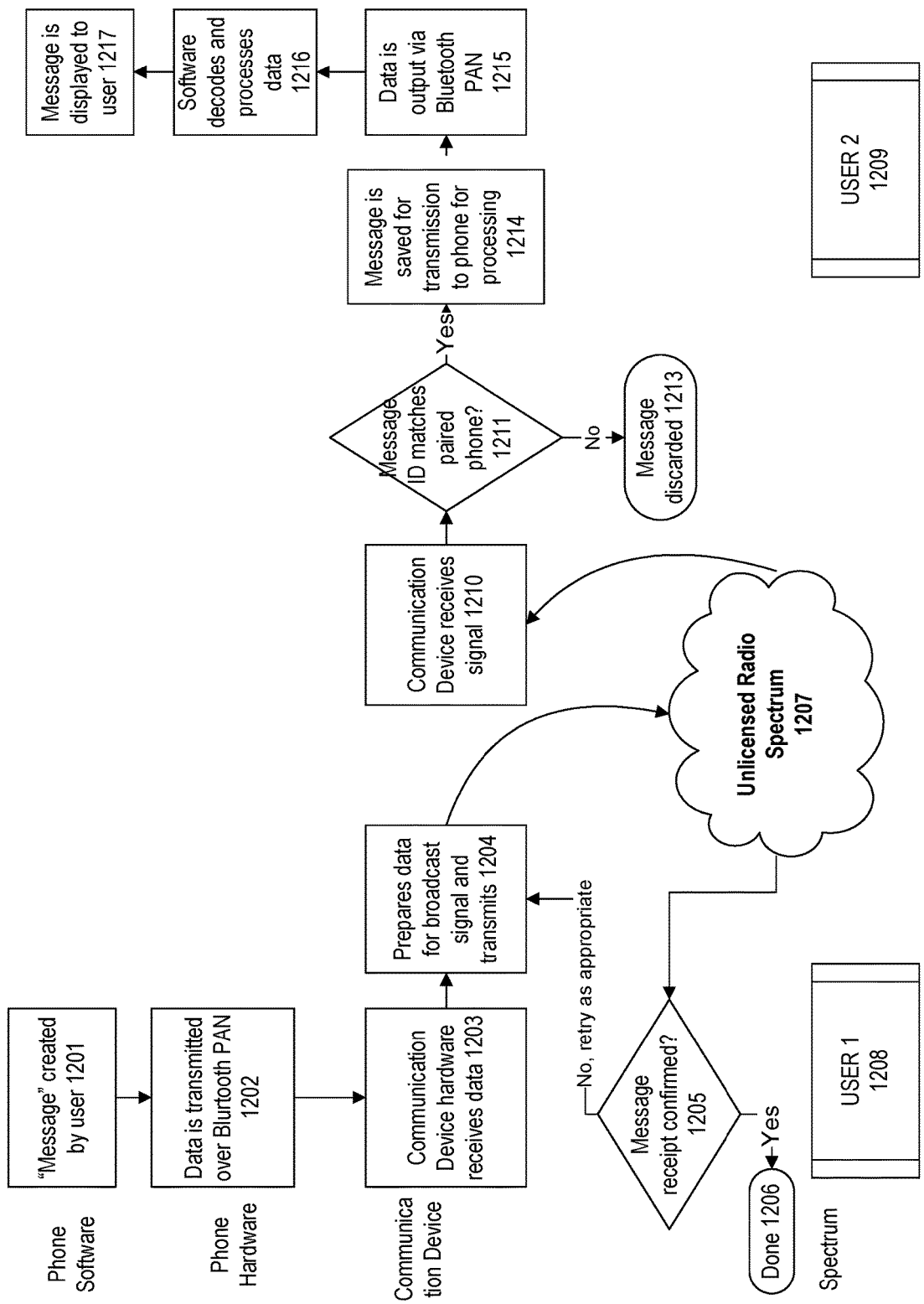
FIG. 12 is a schematic system diagram showing functions of different layers of the architecture.

FIG. 12 shows a schematic of operation of the system. A message is created 1201 by a user 1208, within a smartphone. The smartphone sends the message via Bluetooth PAN 1202 to the communication device, where it is received 1203. The communication device prepares the data for broadcast 1204, and transmits the data over a long-range wireless communication link 1204. The radio is monitored for a message receipt confirmation 1205, and retried as necessary, until done 1206. After transmission, the communication device receives the signal 1210, and typically generates a confirmation signal, except in non-urgent broadcasts, for example. The message is analyzed to determine whether the Message ID included in the transmission marches with address data provided by the paired smartphone 1211. If it does not match, it is discarded 1213, otherwise it is saved, and sent to the smartphone for processing 1214. The stored message is sent by Bluetooth to the smartphone, 1215, and the software app in the smartphone decodes and processes the data as necessary, to for example decrypt the message 1216. The decoded message is then displayed or otherwise presented 1217 to the user 1209 through the smartphone user interface.

FIG. 13 shows an example physical layout of an embodiment of the communication device technology known as a goTenna™. Note that added hardware and features may be added as desired, but an advantage of the technology is that the design itself can remain simple. A battery 1301 is provided to power the system. This may be, for example, 1350 mAH lithium ion battery, or a standard type 1350 mAH cylindrical cell. A micro USB connector (e.g., USB 2.0) is provided for charging and communications. The device has a circuit board or boards 1303 which hold the processor, memory and radio, for example. A Bluetooth radio 1304 is provided for wireless communication with a smartphone. The MURS, GPRS, or other type radio transceiver broadcasts and receives through the antenna 1302, which may be internal, or provided externally through an SMA connector.

FIG. 14 schematically shows the hardware architecture in more detail. The smartphone, of typical design, has a processor 1406, WiFi radio 1412, Cellular radio 1407, Bluetooth module 1409 (which may be integrated with other components), and an address book 1410. The WiFi radio 1412 communicates though antenna 1413 with a wireless local area network, and can ultimately reach the Internet 1414. The Cellular radio 1407 communicates though antenna 1408 with a cellular network 1411, which can also ultimately reach the Internet 1414.

Figure 15:
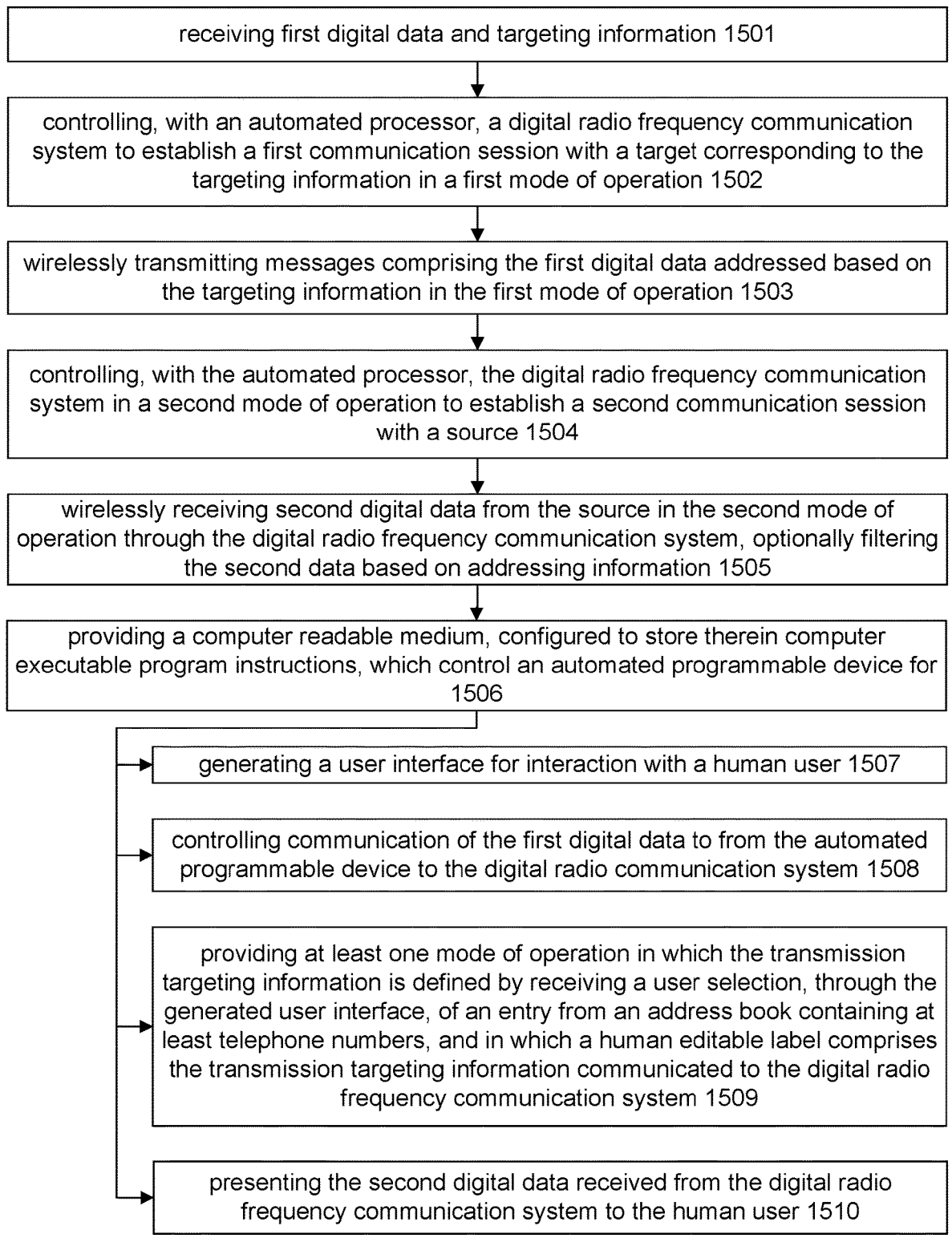
FIG. 15 shows a flowchart for a first embodiment of the method.

FIG. 15 shows a flowchart of a first embodiment of the method. A communication device is provided, comprising: a digital radio frequency communication system configured to wirelessly transmit messages comprising first digital data addressed based on targeting information in a first mode of operation 1503, and to wirelessly receive messages comprising second digital data in a second mode of operation 1505; and an automated processor. The automated processor is configured to control the digital radio frequency communication system to establish a first communication session with a target corresponding to the targeting information in a first mode of operation 1502. The system receives the first digital data and targeting information in the first mode of operation 1501, control the digital radio frequency communication system to establish a first communication session with a target corresponding to the targeting information, and to transmit the first digital data to the target 1503; and (ii) control the digital radio frequency communication system in a second mode of operation to establish a second communication session with a source, and to receive second digital data from the source 1504. A computer readable medium is provided 1506, i.e., flash memory within a smartphone, configured to store therein computer executable program instructions, which cause an automated programmable device to: (1) generate a user interface for interaction with a human user 1507; (2) control communication of the first digital data to the communication device 1508; (3) define the transmission targeting information, having at least one mode of operation in which the transmission targeting information is derived by a user selection, through the generated user interface, of an entry from an address book containing at least telephone numbers, and in which a human editable label comprises the transmission targeting information communicated to the communication device 1509; and (4) present the second digital data received from the communication device to the human user 1510.

FIG. 16A shows a flowchart of the method of operating the communication device. A communication device is provided, comprising: a communication port configured to receive first digital data and transmission targeting information in a first mode of operation, to transmit second digital data in a second mode of operation, and to receive a firmware update in a third mode of operation, through a communication link adapted to communicate with an automated programmable device, and a reprogrammable memory configured to persistently store firmware 1601. A digital radio frequency communication system is provided configured to wirelessly transmit messages comprising the first digital data addressed based on the targeting information in the first mode of operation 1602. The at least one automated processor is provided, operating according to updatable firmware, configured to: (i) control the communication port to receive the first digital data and targeting information in the first mode of operation; (ii) control the communication port to transmit the second digital data in a second mode of operation; and (iii) control the communication port to receive the firmware update in the third mode of operation, and to store the firmware update in the reprogrammable memory 1603. The at least one automated processor also controls the digital radio frequency communication system to: (I) communicate according to a communication protocol defined by the firmware stored in the reprogrammable memory, (II) to transmit information over a shared control channel to establish a first communication session, and (III) to transmit the first digital data addressed based on the targeting information over a first data communication channel distinct from the shared control channel, to transmit the first digital data 1605. The at least one automated processor further controls the digital radio frequency communication system to: (I) communicate according to the communication protocol defined by the firmware stored in the reprogrammable memory, (II) receive information over the shared control channel, to establish a second communication session, (III) receive the second digital data over a second data communication channel distinct from the shared control channel, wherein the first and second data communication channels may be the same or different, and (IV) persistently store a plurality of received second data in the reprogrammable memory 1606.

Figure 16B:
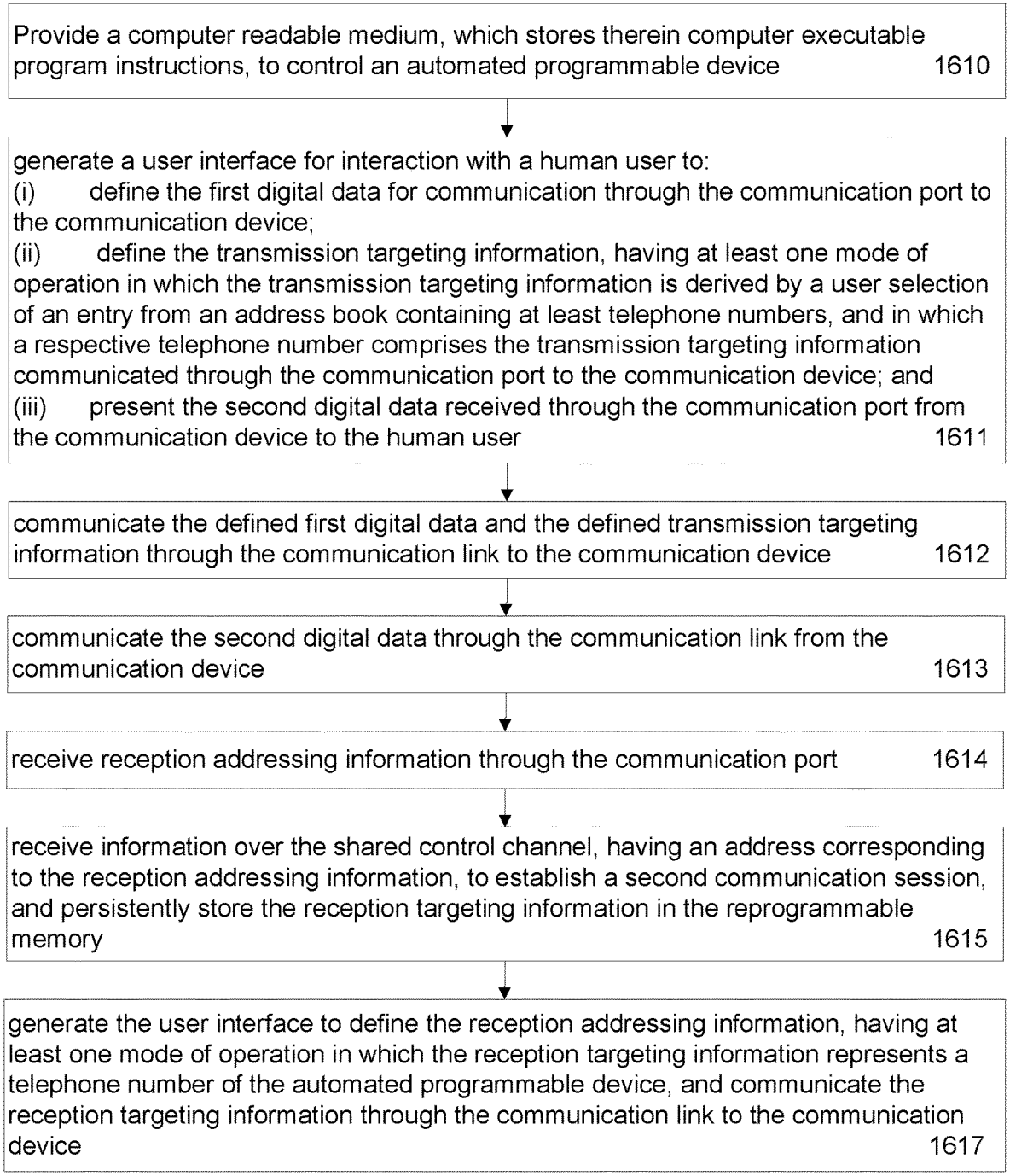
FIG. 16B shows a flowchart for operation of the automated programmable device, e.g., smartphone.

FIG. 16B shows a flowchart of operation of the automated programmable device. A computer readable medium is provided, which stores therein computer executable program instructions, for control of an automated programmable device 1610. The automated programmable device generates a user interface for interaction with a human user to: (i) define the first digital data for communication through the communication port to the communication device; (ii) define the transmission targeting information, having at least one mode of operation in which the transmission targeting information may be derived by a user selection of an entry from an address book containing at least telephone numbers, and in which a respective telephone number comprises the transmission targeting information communicated through the communication port to the communication device; and (iii) present the second digital data received through the communication port from the communication device to the human user 1611. The automated programmable device communicates the defined first digital data and the defined transmission targeting information through the communication link to the communication device 1612. The automated programmable device communicates the second digital data through the communication link from the communication device 1613.

The automated programmable device receives reception addressing information through the communication port 1614, receives information over the shared control channel, having an address corresponding to the reception addressing information, to establish a second communication session, and persistently store the reception targeting information in the reprogrammable memory 1615, and generates the user interface to define the reception addressing information, having at least one mode of operation in which the reception targeting information represents a telephone number of the automated programmable device, and communicate the reception targeting information through the communication link to the communication device 1617.

It is to be understood that the above description is intended to be illustrative, and not restrictive. Many other examples will be apparent to those of skill in the art upon reading and understanding the above description. Although the disclosure has been described with reference to specific examples, it will be recognized that the disclosure is not limited to the examples described, but can be practiced with modification and alteration within the spirit and scope of the appended claims. Accordingly, the specification and drawings are to be regarded in an illustrative sense rather than a restrictive sense. The scope of the disclosure should, therefore, be determined with reference to the appended claims, along with the full scope of equivalents to which such claims are entitled.

What is claimed is:

1. A communication system contained within a portable housing and powered by a self-contained electrical power source within the portable housing, comprising:
a short range radio frequency transceiver operating in a first frequency range, configured to wirelessly communicate first digital packets of information with a portable user interface device;
a long range radio frequency transceiver operating in a second frequency range non-overlapping with the first frequency range, configured to wirelessly communicate second digital packets of information having a different size from the first digital packets of information, with another long range radio frequency transceiver, the long range radio frequency transceiver having a plurality of distinct communication channels within the second frequency range comprising a control channel for group communication, and a plurality of independent private channels for point-to-point communications between different endpoints, which permit multiple wireless communications within the plurality of distinct communication channels in the second frequency range to proceed concurrently with the wireless communication of the first digital packets of information in the first frequency range, without mutual interference;
a memory, contained within the portable housing; and
at least one automated processor, configured to:
receive a transmitter identifier, a destination identifier, and a message through the short range radio frequency transceiver within the first digital packets;
store the transmitter identifier, the destination identifier, and the message in the memory;
wirelessly transmit the transmitter identifier, the destination identifier, and the message through the long range radio frequency transceiver within a stream of the second digital packets of information with overhead data, in the second frequency range, the overhead data of an initial second digital packet of information of the stream of packets comprising the transmitter identifier and the destination identifier, and at least one subsequent second digital packet of information of the stream of packets having overhead data comprising a network transaction identifier and lacking the transmitter identifier and the destination identifier;
prior to receipt of acknowledgement through the long range radio transceiver, repeatedly wirelessly transmit the message through the long range radio frequency transceiver in the second frequency range; and
after receipt of an acknowledgement of receipt of the message from the other long range radio frequency transceiver corresponding to the destination in the second frequency range, cease repeated wireless transmission of the message through the long range radio transceiver and wirelessly communicate a confirmation of message receipt in the first digital packets of information through the short range radio frequency transceiver in the first frequency range.

2. The communication system according to claim 1, wherein the short range radio frequency transceiver comprises a Bluetooth radio or a WiFi radio.

3. The communication system according to claim 1, wherein the long range radio frequency transceiver comprises a 900 MHz ISM band radio.

4. The communication system according to claim 1, wherein the long range radio frequency transceiver comprises a MURS radio, a FRS radio, or a GMRS radio.

5. The communication system according to claim 1, wherein the long range radio frequency transceiver has an active/inactive duty cycle of 0.1%.

6. The communication system according to claim 1, wherein the message comprises GPS location information.

7. The communication system according to claim 1, wherein the self-contained electrical power source within the portable housing comprises a rechargeable battery, further comprising an energy harvesting generator configured to recharge the rechargeable battery.

8. The communication system according to claim 1, wherein the message communicated within the second digital packets of information is encrypted, and the destination identifier is unencrypted.

9. The communication system according to claim 1, wherein the second digital packets of information are received through the short range radio frequency transceiver in the first frequency range encrypted with an encryption key dependent on the destination identifier.

10. The communication system according to claim 1, wherein the long range radio transceiver is configured to receive the acknowledgement through the control channel for the message communicated through the plurality of private channels.

11. A communication method, comprising:
providing a portable housing, and within the portable housing, a self-contained electrical power source within the portable housing, a short range wireless radio frequency transceiver operating in a first frequency range, a long range wireless radio frequency transceiver operating in a second frequency range non-overlapping with the first frequency range, a memory, and at least one automated processor;
wirelessly communicating first digital packets of information with a portable user interface device through the short range wireless radio frequency transceiver in the first frequency range;
wirelessly communicating second digital packets of information having a different size from the first digital packets of information, with another long range wireless radio frequency transceiver, through the long range wireless radio frequency transceiver, the long range wireless radio frequency transceiver having a plurality of distinct communication channels within the second frequency range comprising a control channel for group communication, and a plurality of private channels for point-to-point communications, which permit multiple communications within the plurality of distinct communication channels in the second communication channel and the communication of the first digital packets in the first communication channel to proceed concurrently without mutual interference;
receiving a transmitter identifier, a destination identifier, and a message through the short range wireless radio frequency transceiver within the first digital packets under control of the at least one processor;
storing the transmitter identifier, the destination identifier, and the message in the memory under control of the at least one processor;
wirelessly transmitting a transmitter identifier, a destination identifier, and the message through the long range wireless radio frequency transceiver in the second frequency range as a stream of the second digital packets with overhead data under control of the at least one processor, the overhead data of an initial second digital packet of the stream of packets comprising a transmitter identifier and a destination identifier, and the overhead data of at least one subsequent second digital packet of the stream of packets comprising a network transaction identifier and lacking the transmitter identifier and the destination identifier;
repeatedly wirelessly transmitting the message through the long range wireless radio frequency transceiver in the second frequency range prior to receipt of acknowledgement through the long range wireless radio transceiver; and
ceasing repeated wirelessly transmitting of the message through the long range wireless radio frequency transceiver and wirelessly communicating a confirmation of message receipt in the first digital packets of information through the short range wireless radio frequency transceiver in the first frequency range after receipt of an acknowledgement of receipt from the other long range wireless radio frequency transceiver in the second frequency range corresponding to the destination.

12. The method according to claim 11, wherein the short range wireless radio frequency transceiver comprises a Bluetooth radio or a WiFi radio.

13. The method according to claim 11, wherein the long range wireless radio frequency transceiver comprises a 900 MHz ISM band radio, a MURS radio, a FRS radio, or a GMRS radio.

14. The method according to claim 11, wherein the long range wireless radio frequency transceiver has an active/inactive duty cycle of 0.1%.

15. The method according to claim 1, wherein the message comprises GPS location information.

16. The method according to claim 11, wherein the self-contained electrical power source within the portable housing comprises a rechargeable battery, further comprising harvesting energy with an energy harvesting generator to recharge the rechargeable battery.

17. The method according to claim 11, further comprising receiving the acknowledgement by the long range wireless radio transceiver through the control channel for the message communicated through the plurality of private channels.

18. A communication system contained within a portable housing and powered by a self-contained electrical power source within the portable housing, comprising:
a short range radio frequency transceiver operating in a first frequency range, configured to wirelessly communicate first digital packets of information with a portable user interface device in the first frequency range;
a long range radio frequency transceiver operating in a second frequency range non-overlapping with the first frequency range, configured to wirelessly communicate second digital packets of information having a different size from the first digital packets of information, between other long range radio frequency transceivers in the second frequency range, the long range radio frequency transceiver having a plurality of distinct communication channels within the second frequency range comprising a control channel for group communication, and a plurality of private channels for point-to-point communications, which permit multiple wireless communications within the plurality of distinct communication channels in the second frequency range and the wireless communication of the first digital packets in the first frequency range to proceed concurrently without mutual interference;
a memory, contained within the portable housing; and
at least one automated processor, configured to:
wirelessly receive a device identifier through the short range radio frequency transceiver in the first frequency range within the first digital packets;
wirelessly receive overhead data comprising a transmitter identifier, a destination identifier, and data comprising an initial portion of a message through the long range radio frequency transceiver in the second frequency range within an initial packet of a stream of the second digital packets;
wirelessly receive overhead data comprising a network transaction identifier and lacking at least one of the transmitter identifier and the destination identifier, and data comprising a subsequent portion of the message through the long range radio frequency transceiver in the second frequency range within a subsequent packet of a stream of the second digital packets;
store the transmitter identifier, the destination identifier, and the message comprising the initial portion and the subsequent portion in the memory; and
compare the stored destination identifier with the device identifier, and
   if a match, wirelessly transmit an acknowledgement through the long range radio frequency transceiver in the second frequency range, and wirelessly transmit the message through the short range radio frequency transceiver to the portable user interface device in the first frequency range; and
   if not a match, wirelessly forward the stored transmitter identifier, destination identifier, and message to another long range radio frequency transceiver in the second frequency range after negotiating access to a private channel through the control channel.

19. The communication system according to claim 18, wherein the long range radio frequency transceiver comprises a 900 MHz ISM band radio, a MURS radio, a FRS radio, or a GMRS radio.

20. The communication system according to claim 18, wherein message in the stream of second digital packets comprises encrypted information, at least one processor is configured to decrypt the encrypted information if the destination identifier matches the device identifier.

\* \* \* \* \*